Jan. 8, 1946.    W. H. ROBERTSON    2,392,550
ACCOUNTING MACHINE
Filed Jan. 22, 1943    15 Sheets-Sheet 1
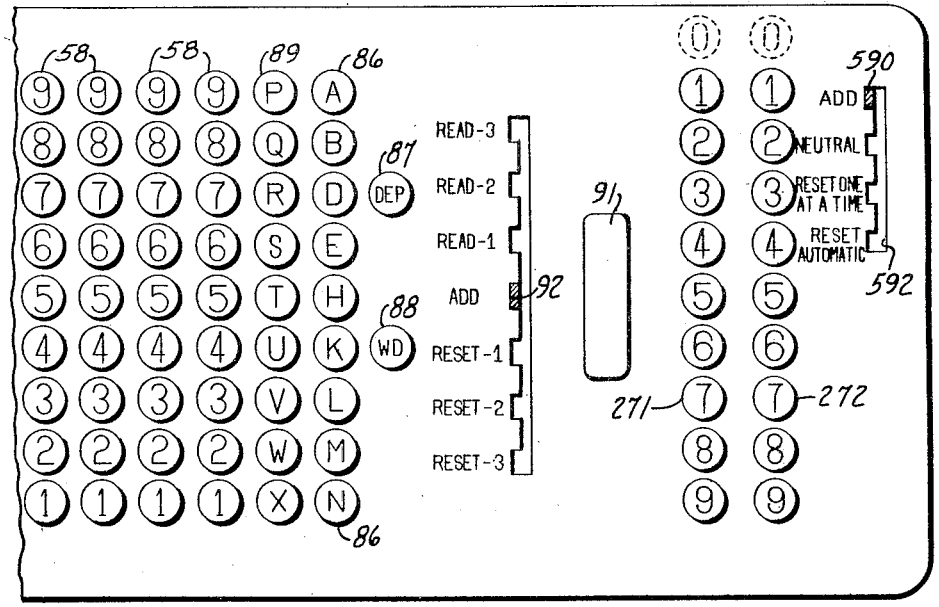
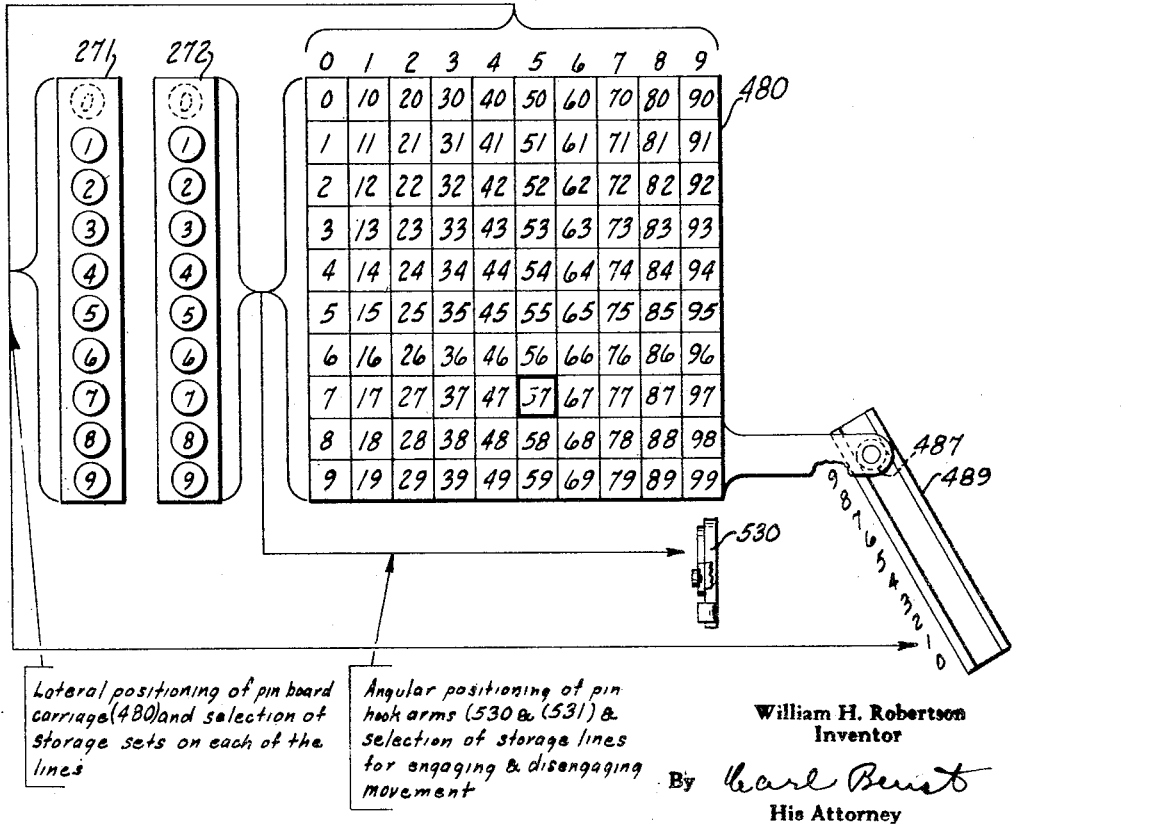
William H. Robertson
Inventor
His Attorney

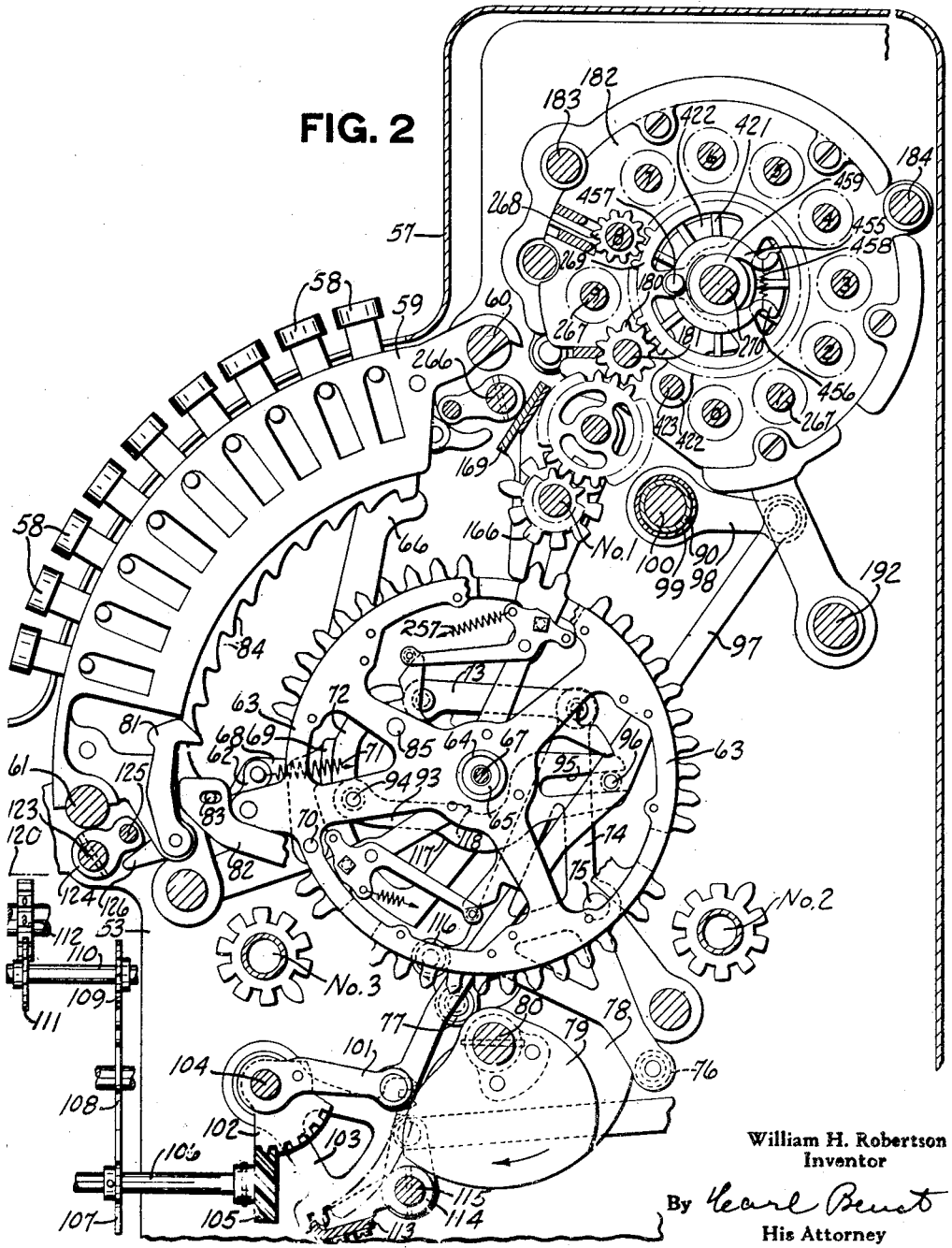

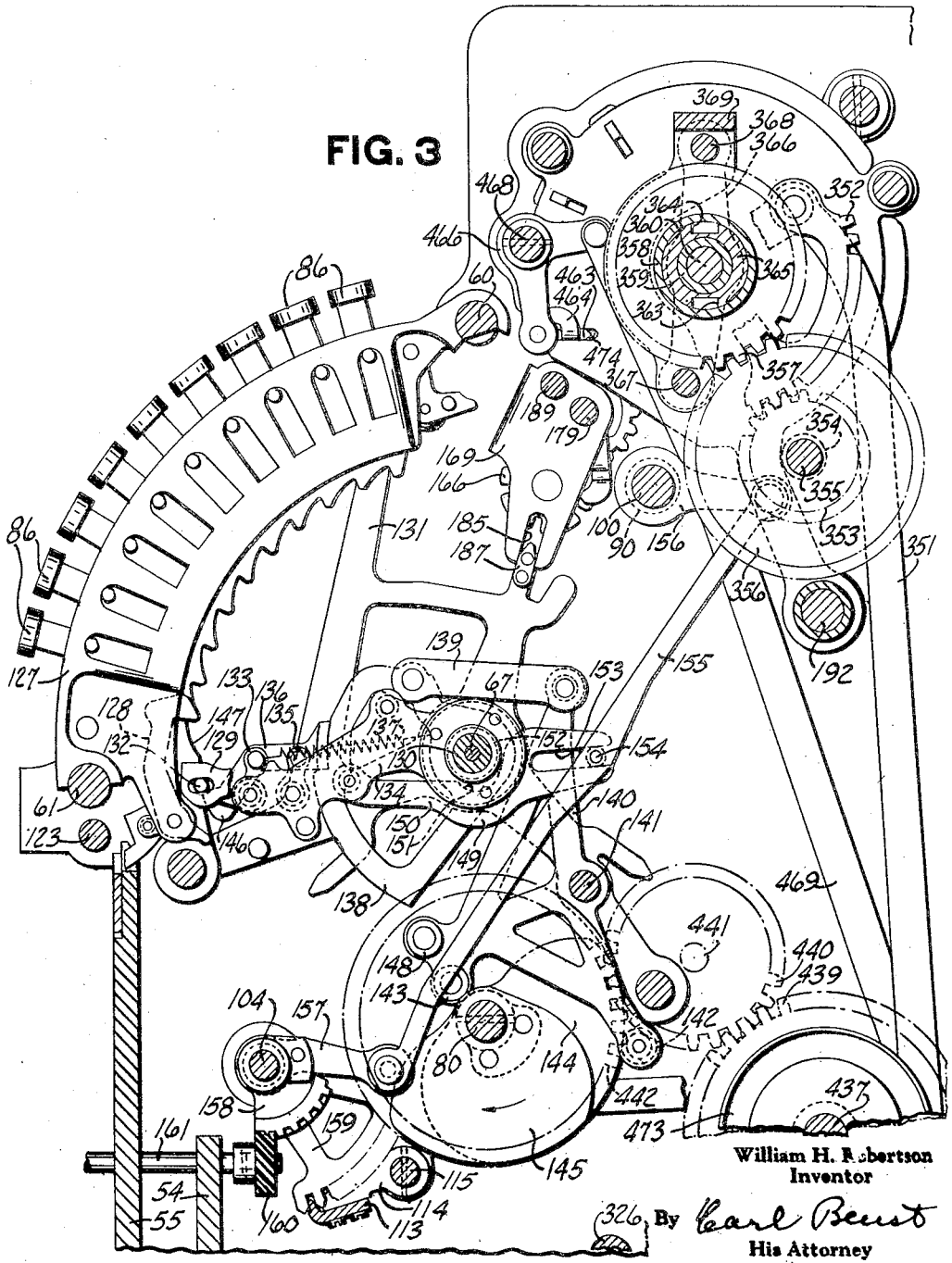

Jan. 8, 1946. W. H. ROBERTSON 2,392,550
ACCOUNTING MACHINE
Filed Jan. 22, 1943 15 Sheets-Sheet 4

William H. Robertson
Inventor
By Earl Benst
His Attorney

Jan. 8, 1946. W. H. ROBERTSON 2,392,550
ACCOUNTING MACHINE
Filed Jan. 22, 1943 15 Sheets-Sheet 5
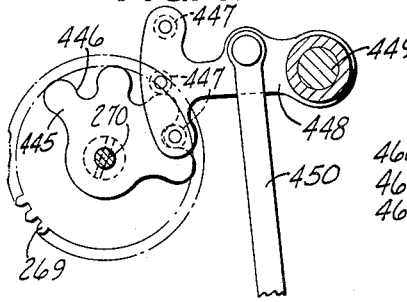
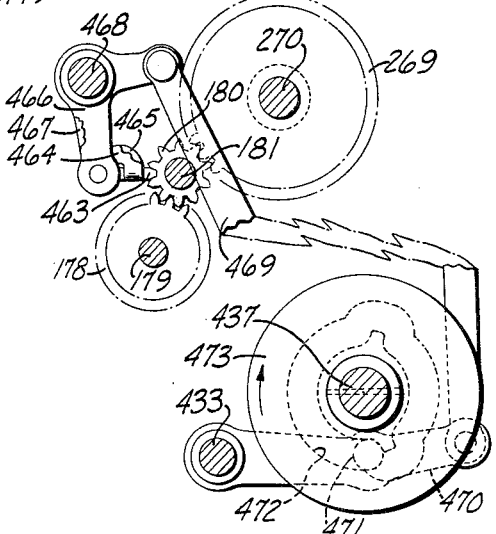
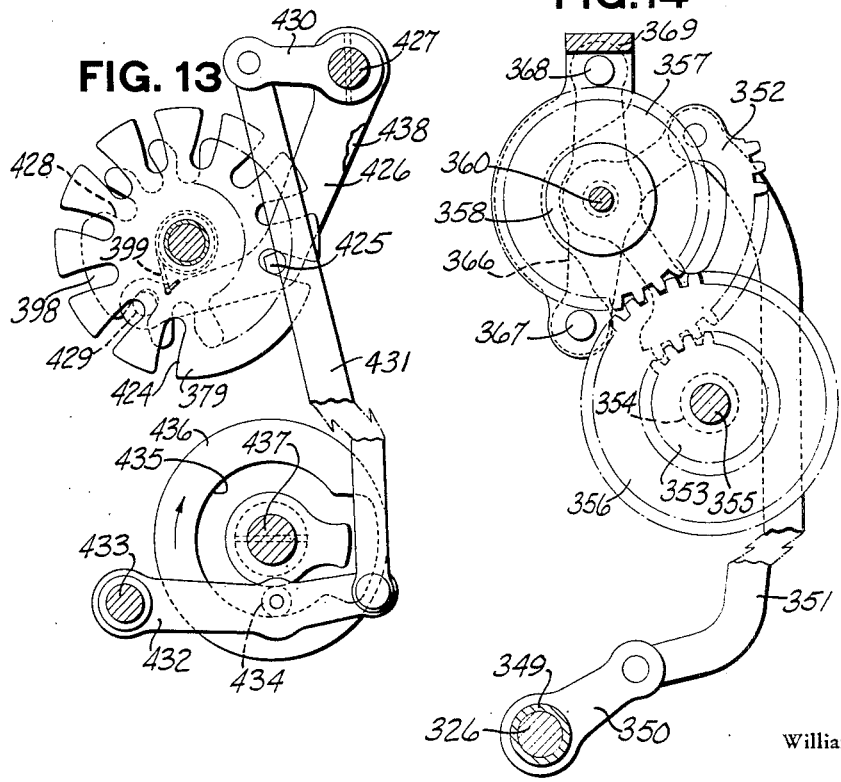
William H. Robertson
Inventor
By Earl Beust
His Attorney Jan. 8, 1946.  W. H. ROBERTSON  2,392,550
ACCOUNTING MACHINE
Filed Jan. 22, 1943  15 Sheets-Sheet 6
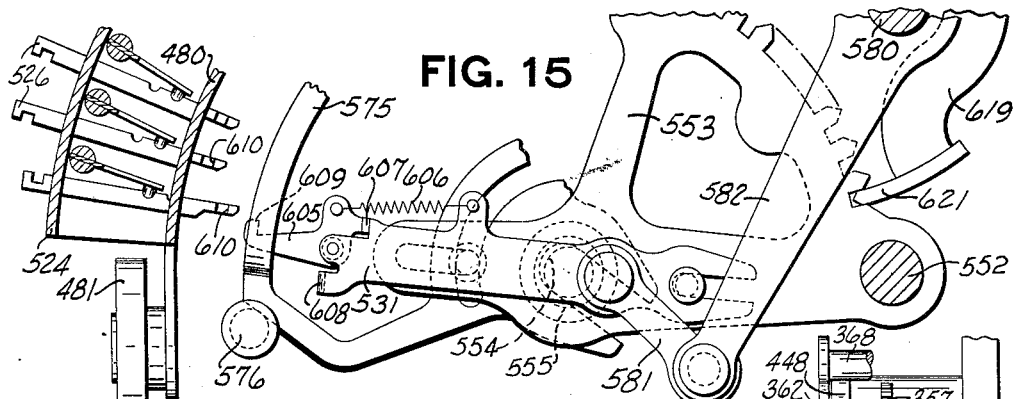
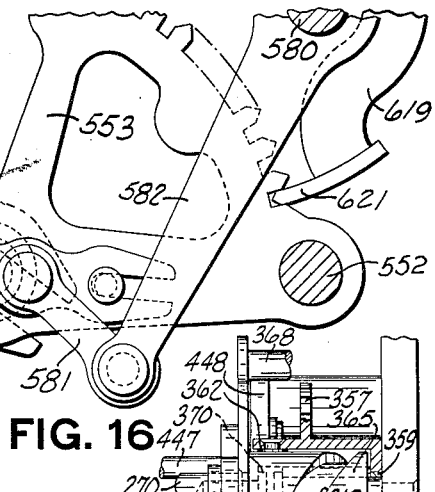
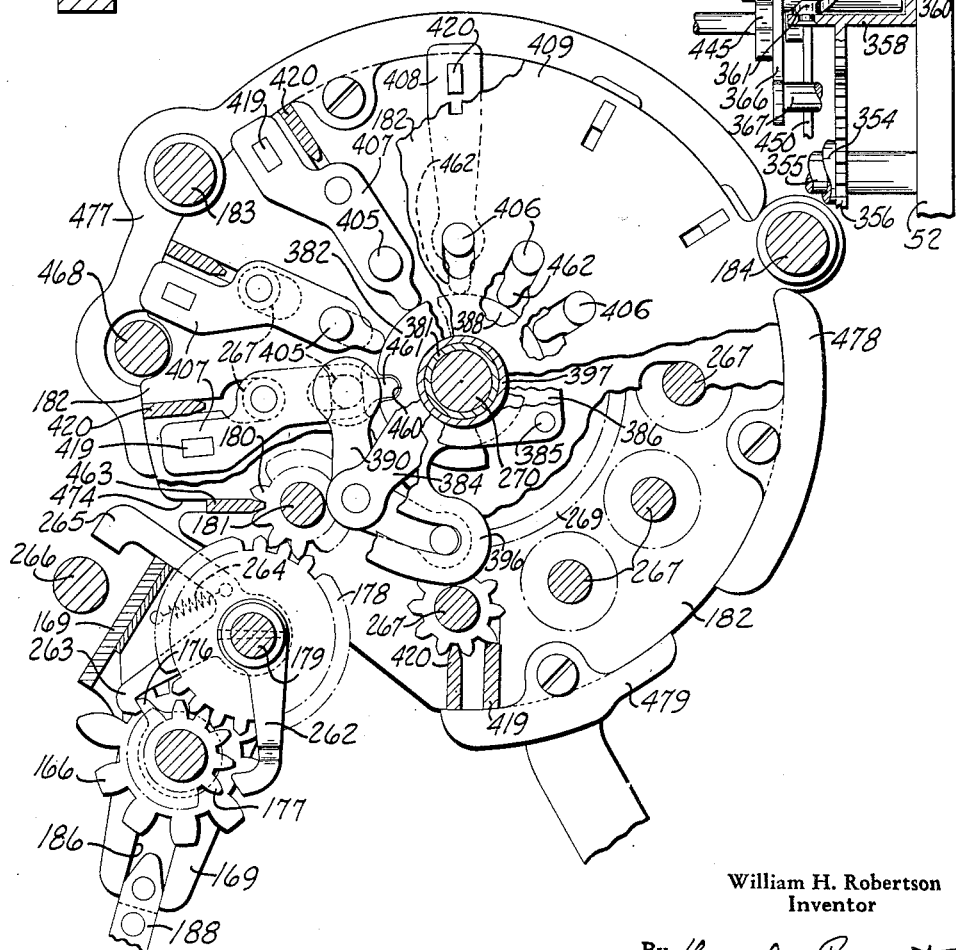
William H. Robertson
Inventor
By Pearl Benst
His Attorney Jan. 8, 1946.  W. H. ROBERTSON  2,392,550
ACCOUNTING MACHINE
Filed Jan. 22, 1943  15 Sheets-Sheet 7
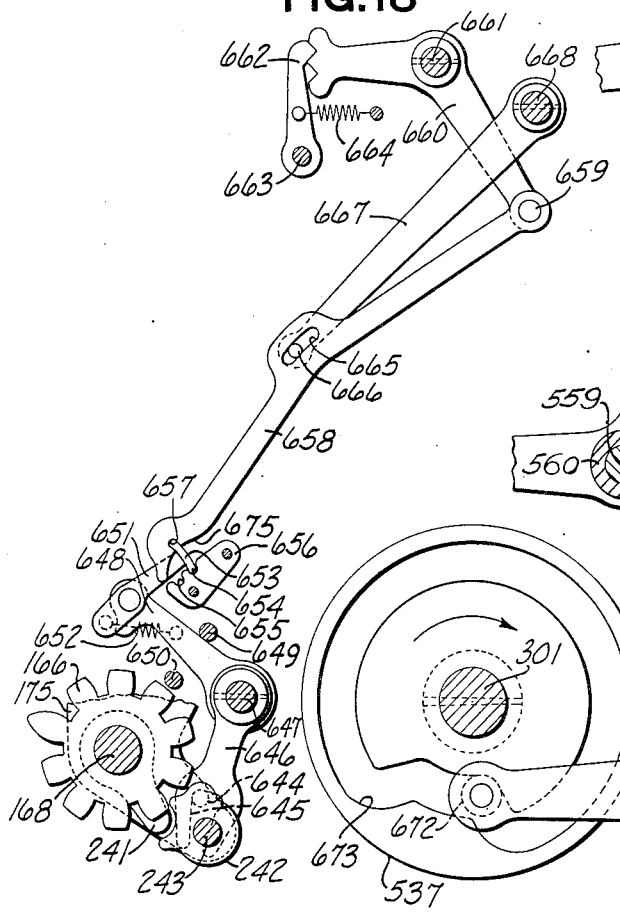
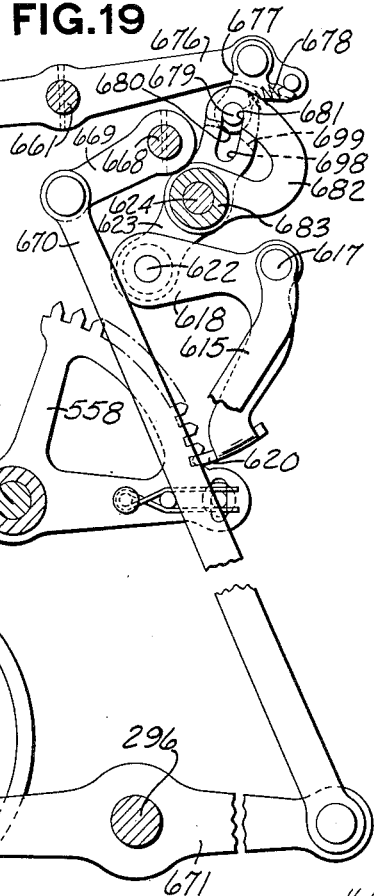
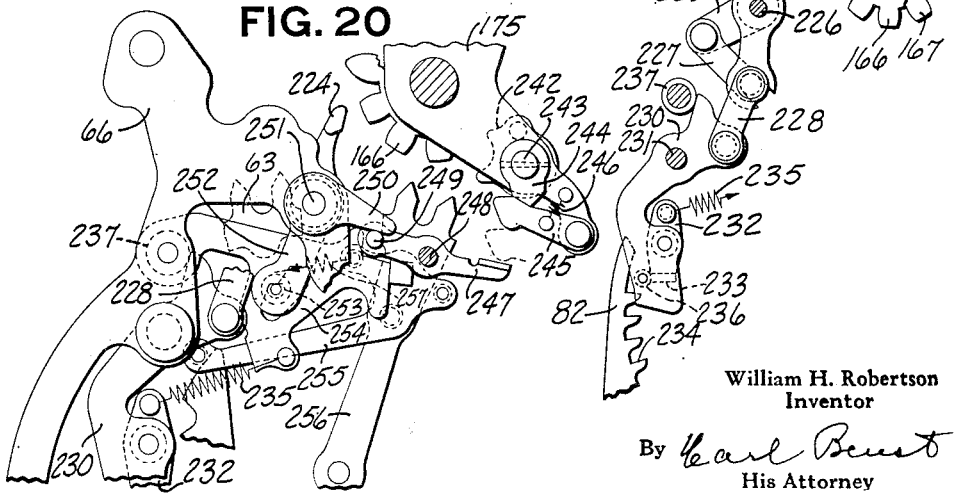
William H. Robertson
Inventor
By Carl Berust
His Attorney Jan. 8, 1946.　　　W. H. ROBERTSON　　　2,392,550
ACCOUNTING MACHINE
Filed Jan. 22, 1943　　　15 Sheets-Sheet 8
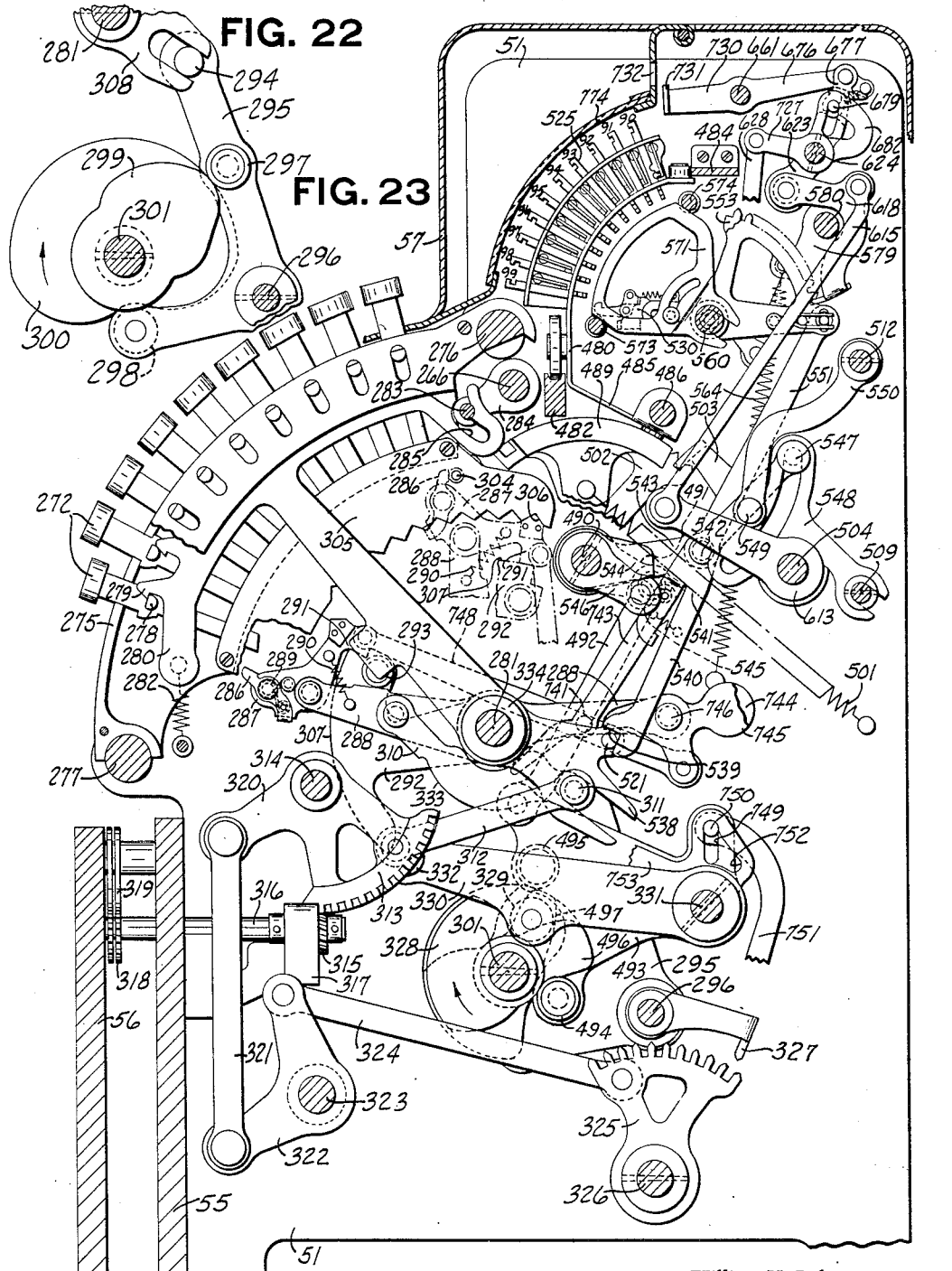
William H. Robertson
Inventor
By Carl Beust
His Attorney Jan. 8, 1946.  W. H. ROBERTSON  2,392,550
ACCOUNTING MACHINE
Filed Jan. 22, 1943  15 Sheets-Sheet 9
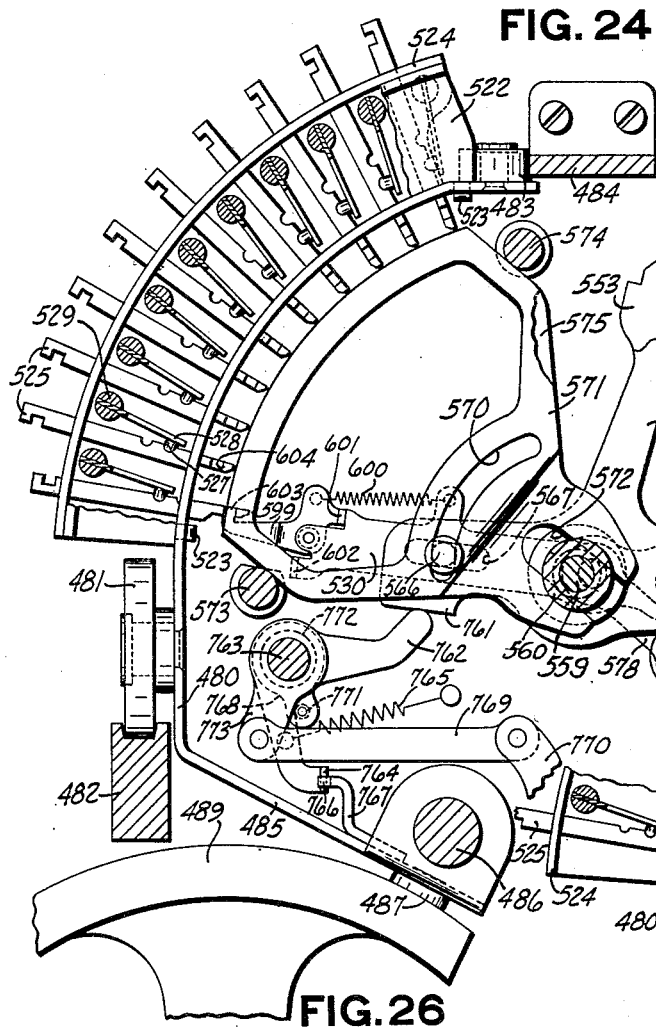
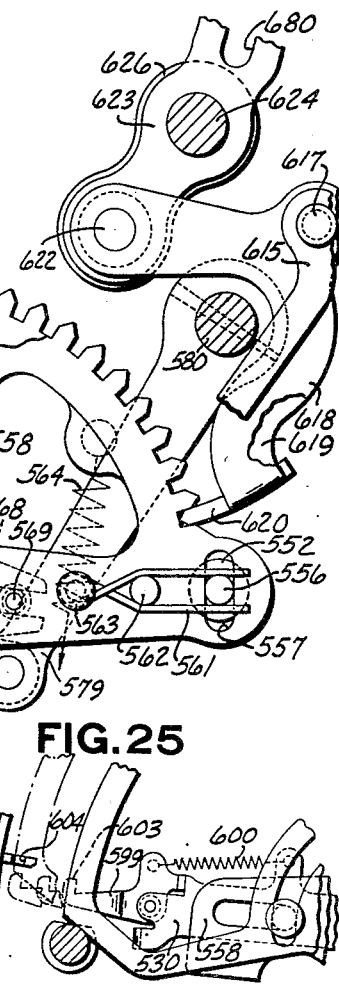
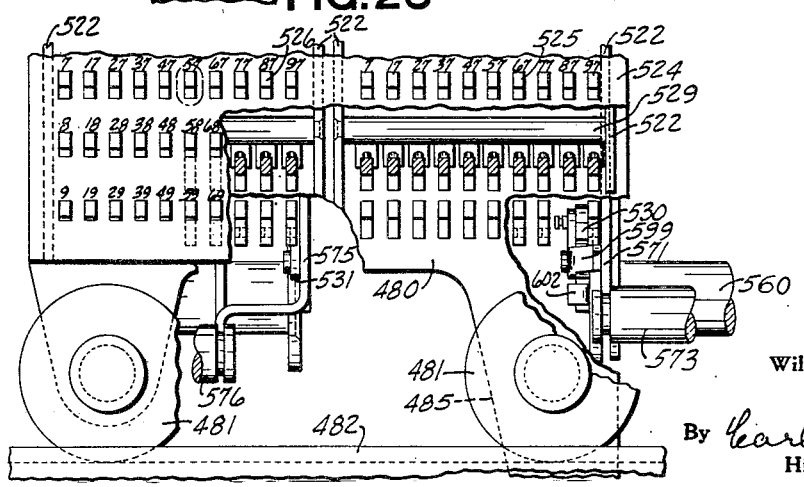
William H. Robertson
Inventor
His Attorney

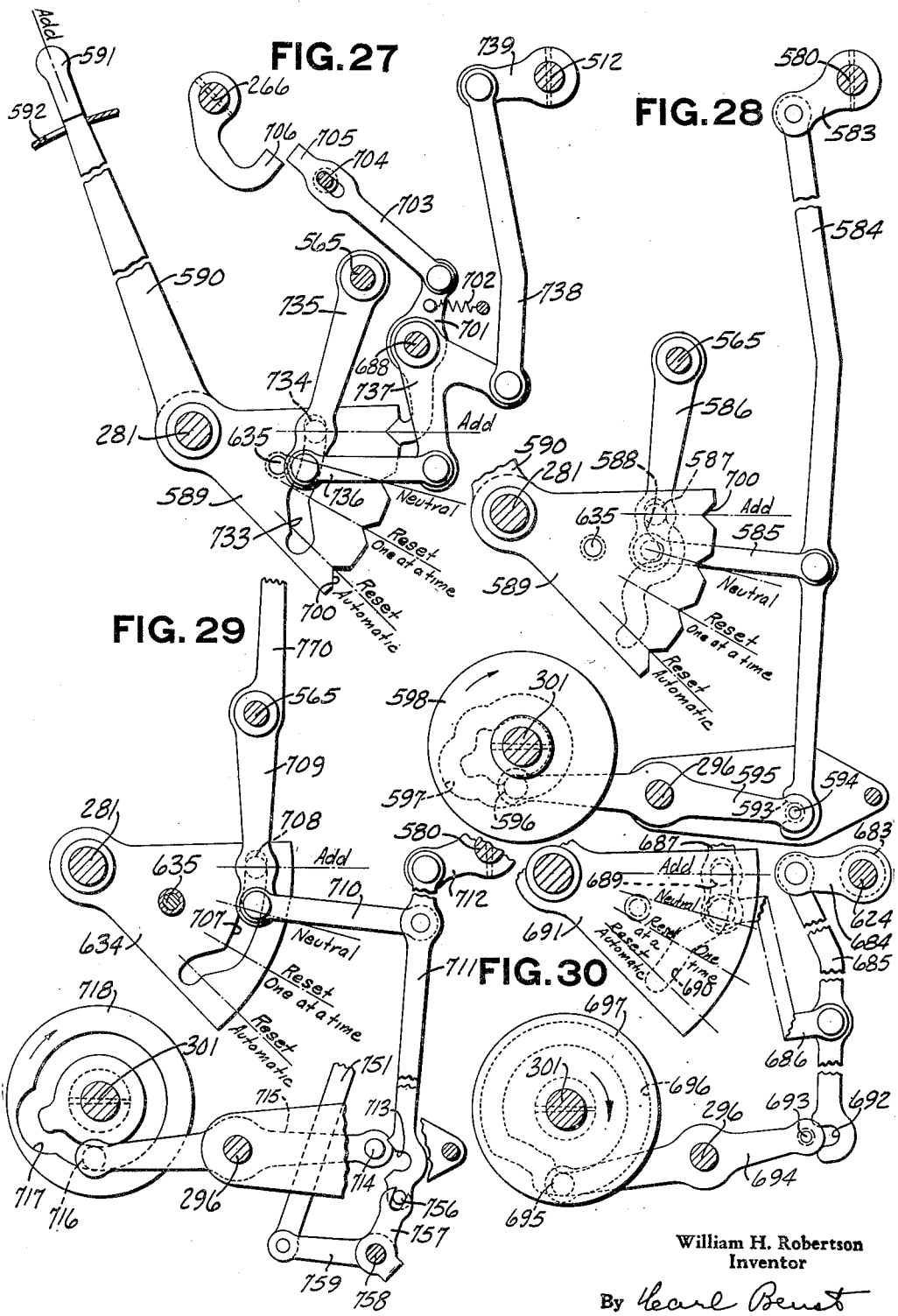

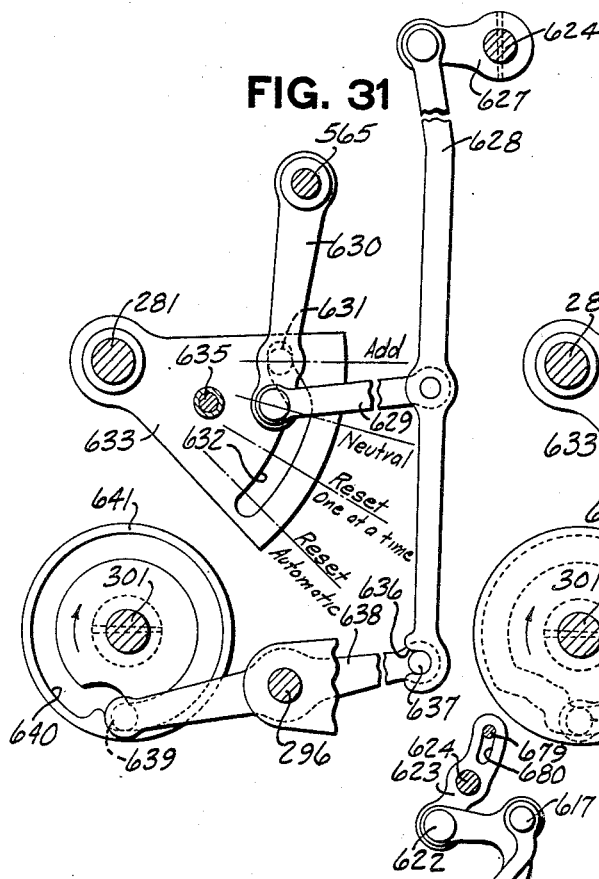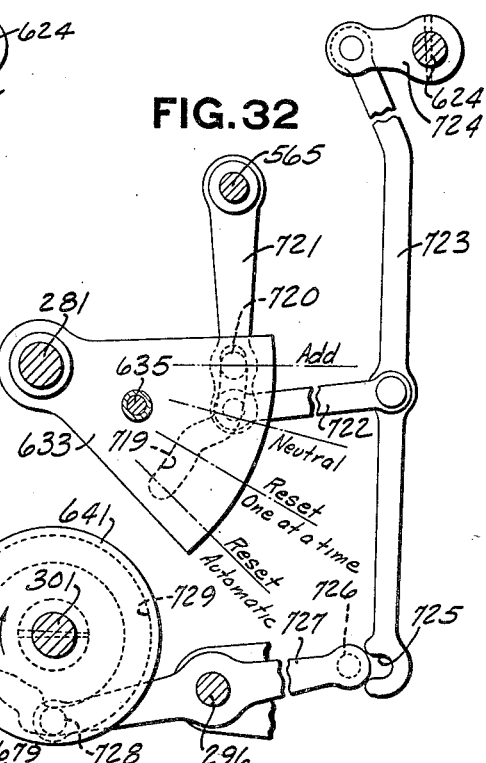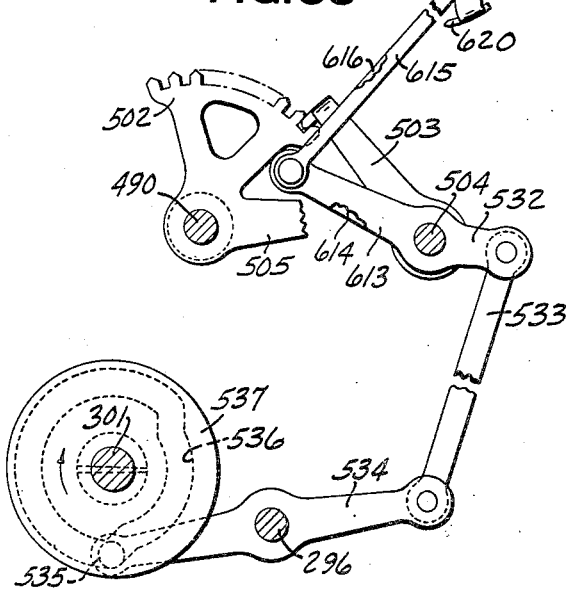

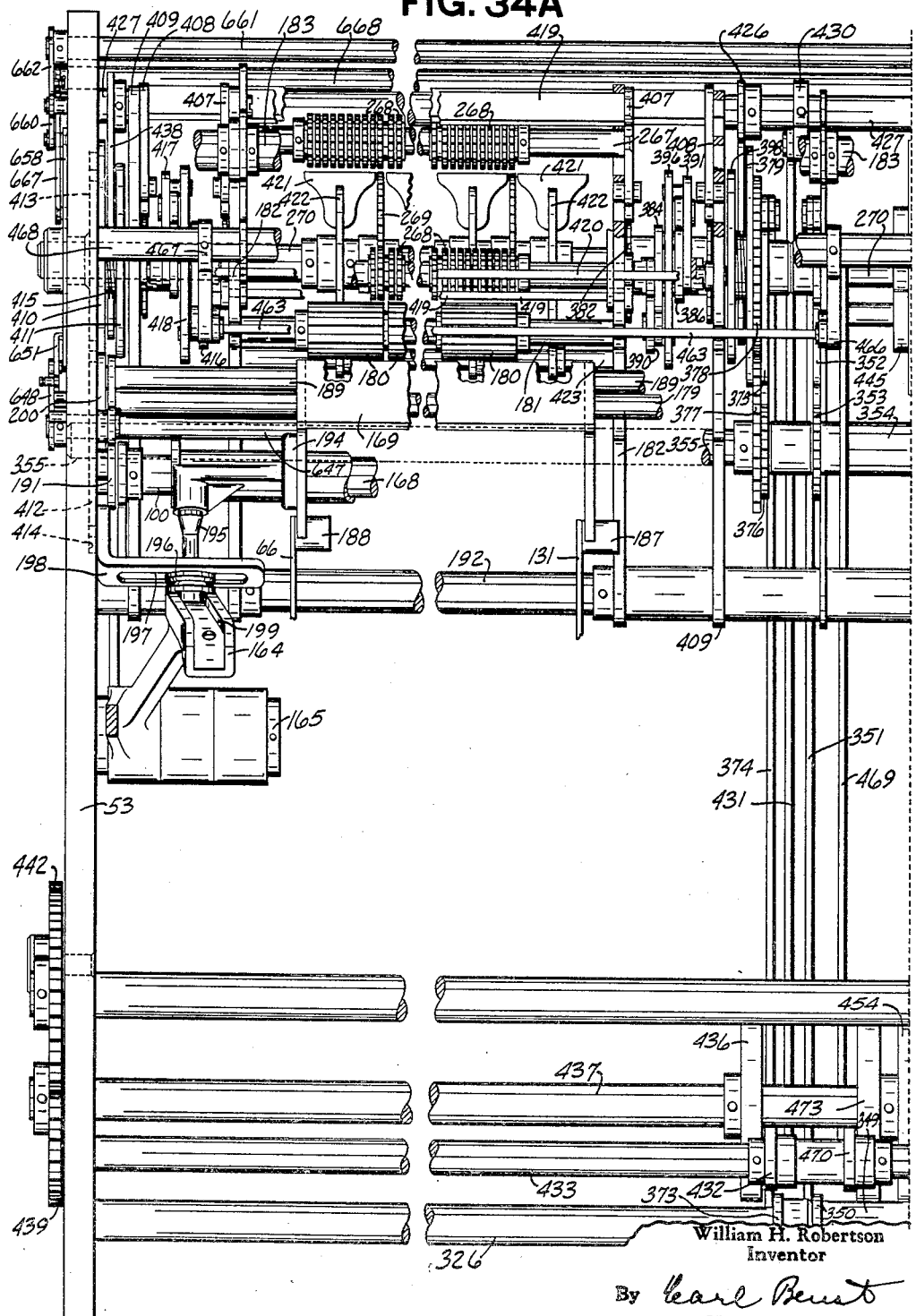

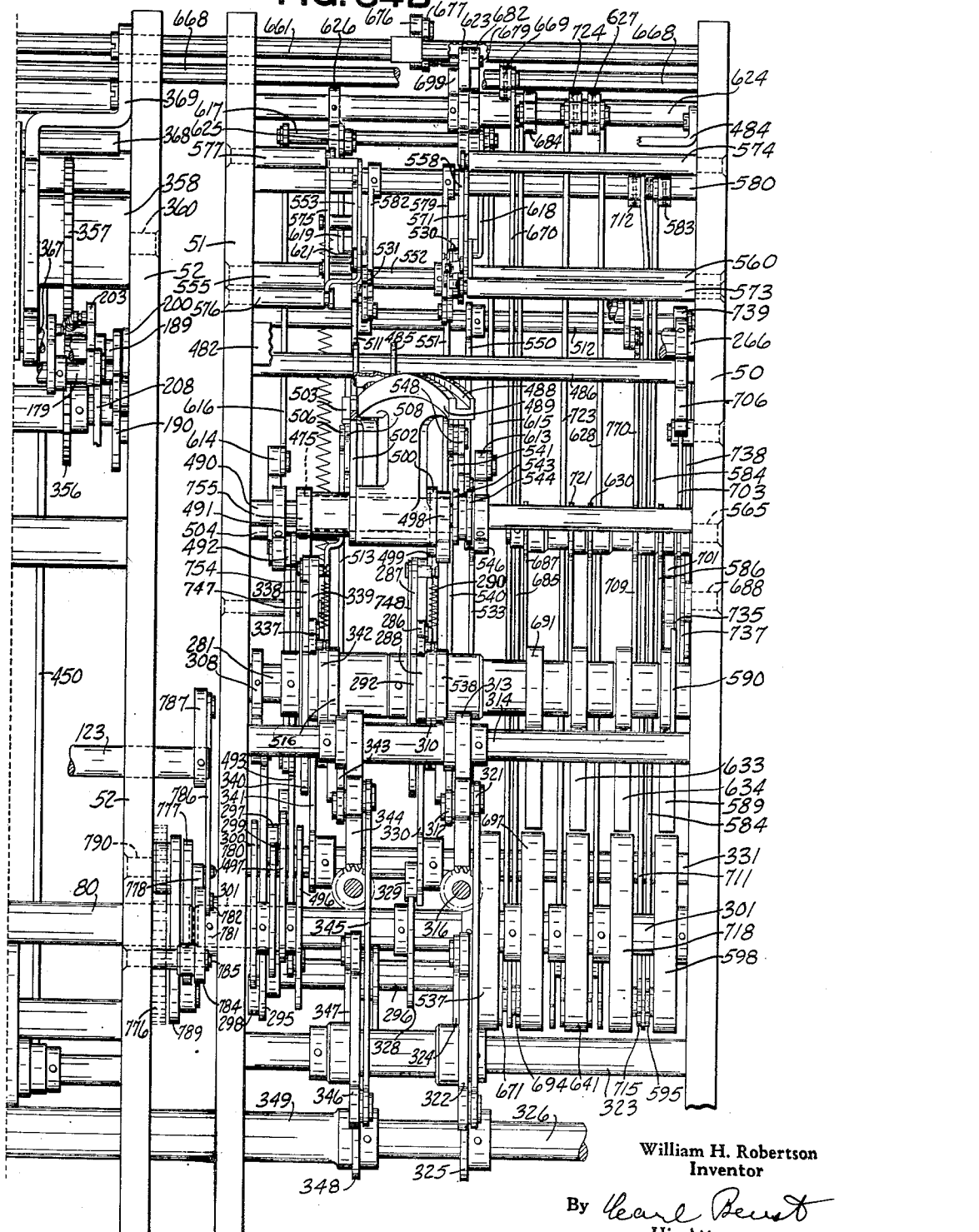

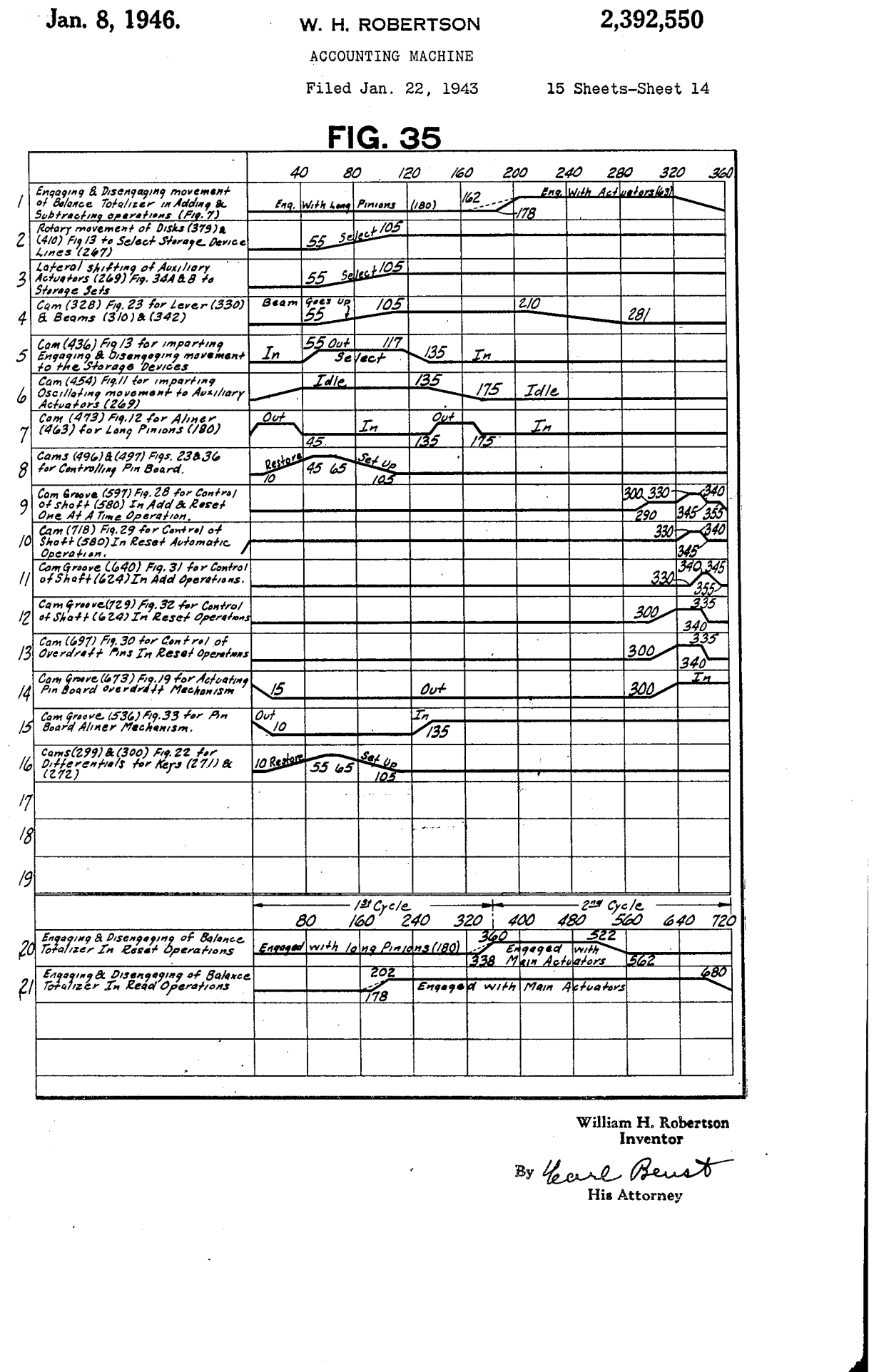

Jan. 8, 1946.  W. H. ROBERTSON  2,392,550
ACCOUNTING MACHINE
Filed Jan. 22, 1943   15 Sheets—Sheet 14

FIG. 35

William H. Robertson
Inventor

By Earl Beust
His Attorney

Jan. 8, 1946.    W. H. ROBERTSON    2,392,550
ACCOUNTING MACHINE
Filed Jan. 22, 1943    15 Sheets-Sheet 15

William H. Robertson
Inventor

By  Earl Beust
His Attorney

Patented Jan. 8, 1946

2,392,550

UNITED STATES PATENT OFFICE 2,392,550

ACCOUNTING MACHINE

William H. Robertson, Oakwood, Ohio, assignor to The National Cash Register Company, Dayton, Ohio, a corporation of Maryland Application January 22, 1943, Serial No. 473,171

22 Claims. (Cl. 235—6)

This invention relates to cash registers and accounting machines of the type disclosed in United States Patents Nos. 1,242,170 and 1,394,256, issued to Frederick L. Fuller on October 9, 1917, and October 18, 1921, respectively, and United States Patents Nos. 1,619,796 and 1,761,542, issued to Bernis M. Shipley on March 1, 1927, and June 3, 1930, respectively. The present invention is directed particularly to improvements in devices for storing a plurality of individual totals as applied to machines of the above type.

Machines of the type referred to above, having devices for storing a large number of separate or individual totals, have come into prominent use in recent years by large merchandising establishments for sales analysis work, such as the analysis of the sales of a large variety of commodities marketed by said merchandising establishment. Likewise, machines of the above type may be used to advantage by department stores or large grocery stores for keeping a perpetual inventory of the more prominent items marketed thereby, and by banking establishments for analysis of the more active commercial checking accounts.

A machine having the general characteristics outlined above is disclosed in the United States Patent No. 2,281,803, issued on May 5, 1942, to William H. Robertson. However, the present application discloses features and improvements not found in the above-mentioned Robertson patent.

One object of the present invention is to provide a machine of the character referred to above with means for storing a plurality of individual totals.

Another object of this invention is to provide a machine of the class referred to above with a large number of individual storage devices for the storing of individual totals, said storage devices adapted to be actuated by a single computing device which forms a medium for connecting any of the storage devices to the keyboard and the printing mechanism of the machine proper.

Another object of this invention is to provide a machine, having a plurality of storage devices for the storing of individual totals, with means to indicate which of the storage devices have totals stored therein and whether such totals are positive or negative.

Still another object of this invention is to provide a machine, having a plurality of storage devices for storing individual amounts and means to select the different storage devices, with a shiftable pin board mechanism adapted to be controlled by the selecting means to indicate which of the storage devices have amounts therein and further to indicate whether the amounts are positive or negative.

Still another object is to provide a machine, having a plurality of storage devices for storing individual amounts and a plurality of displaceable pins for indicating which of the storage devices have been active, with means for automatically resetting the displaced pins.

Still another object of this invention is to provide a machine having a plurality of amount storage devices with mechanism to identify any storage device having a positive amount therein, and to further identify any storage device having a negative amount therein.

Another object is to provide a machine having a plurality of amount storage devices with positive and negative indicating means corresponding to the different storage devices to indicate which of said devices have had amounts entered therein and whether or not the amounts are positive or negative.

With these and incidental objects in view, the invention includes certain novel features of construction and combinations of parts, the essential elements of which are set forth in appended claims and a preferred form or embodiment of which is hereinafter described with reference to the drawings which accompanying and form a part of this specification.

In the drawings:

Fig. 1 is a diagrammatic view showing a portion of the keyboard of the machine embodying the instant invention.

Fig. 2 is a cross-sectional view of the machine, taken just to the right of one of the amount banks, showing said amount bank, the differential mechanism associated therewith, and the corresponding denomination of the amount storage devices.

Fig. 3 is a cross-sectional view, taken just to the right of one of the transaction banks, showing the differential mechanism for said transaction bank and a part of the controlling and operating mechanisms for the storage devices.

Fig. 11 is a detail view of the cam and associated mechanism for driving the auxiliary actuators for the storage devices.

Fig. 12 is a detail view of the cam and the aliner operated thereby for alining the long pinions and the gearing connected thereto.

Fig. 13 is a detail view of the cam and associated mechanism for engaging the selected set of storage wheels with the auxiliary actuators.

Fig. 14 is a detail view of a part of the mechanism for selecting the different sets of storage wheels on the different storage lines.

Fig. 15 is a fragmentary detail view of one of the selecting and operating arms and associated mechanism for the add pins.

Fig. 16 is a detail view of the helical cam for shifting the auxiliary actuators laterally to select the different sets of storage wheels.

Fig. 17 is a side elevation of the storage device assembly, with certain parts broken away to better show how the balance totalizer is operatively connected to the auxiliary actuators.

Fig. 18 is a detail view of the mechanism for controlling the operation of the overdraft pin selecting and operating mechanism shown in Fig. 19.

Fig. 19 is a detail view of the cam for operating the mechanism shown in Fig. 18, and a detail view of a part of the overdraft pin selecting and operating mechanism.

Fig. 20 is a detail view of the "fugitive 1" mechanism for adding "one" in the minus wheel of the lowest order of the balance totalizer when said totalizer is overdrawn, and for subtracting "one" from said wheel when said totalizer is restored to a positive condition.

Fig. 21 is a detail view of a part of the mechanism of one denominational order for positioning the main actuator, in total and sub-total recording operations, in accordance with the amount on the balance totalizer wheel of this particular order.

Fig. 22 is a detail view, in a moved position, of the cams and associated levers for driving the differential mechanism for one of the rows of storage device and pin selecting keys.

Fig. 23 is a cross-sectional view of the machine, taken just to the right of one of the rows of storage device and pin selecting keys, showing the differential mechanism associated therewith and the pin selecting and operating mechanism controlled by said differential mechanism, in a moved position.

Fig. 24 is a side elevation showing a sectional view of the shiftable carriage which carries the pin board, and a part of the selecting and operating mechanism for the overdraft pins.

Fig. 25 is a fragmentary detail view of one of the pin selecting and operating arms, showing in particular the three circumferential positions of the pin selecting hook in relation to the pins.

Fig. 26 is a fragmentary front view of the shiftable carriage which supports the two sets of storage device indicating pins.

Fig. 27 is a detail view of the manually operable lever and a part of its associated mechanism for controlling the operation of the pin board mechanism.

Fig. 28 is a detail view of the cam and associated mechanism for controlling the in-and-out movement of the pin selecting and operating hooks in add and/or reset one at a time operations.

Fig. 29 is a detail view of the cam and associated mechanism for controlling the in-and-out movement of the pin selecting and operating hooks in reset automatic operations.

Fig. 30 is a detail view of the cam and associated mechanism for imparting engaging and disengaging movement to the overdraft pin selecting and displacing hook and arm in resetting operations.

Fig. 31 is a detail view of the cam and associated mechanism for controlling the pin operating mechanism in adding operations.

Fig. 32 is a detail view of the cam and associated mechanism for controlling the pin operating mechanism in resetting operations.

Fig. 33 is a detail view of the cam and mechanism connected thereto for alining the pin board differentials and the pin selecting arms.

Figs. 34A and 34B together constitute a side-spacing view of the mechanism pertinent to the instant invention, as observed from the front of the machine.

Fig. 35 is a timing chart outlining in graphic form the movements of the different mechanisms which are pertinent to the instant invention.

Figure 36:
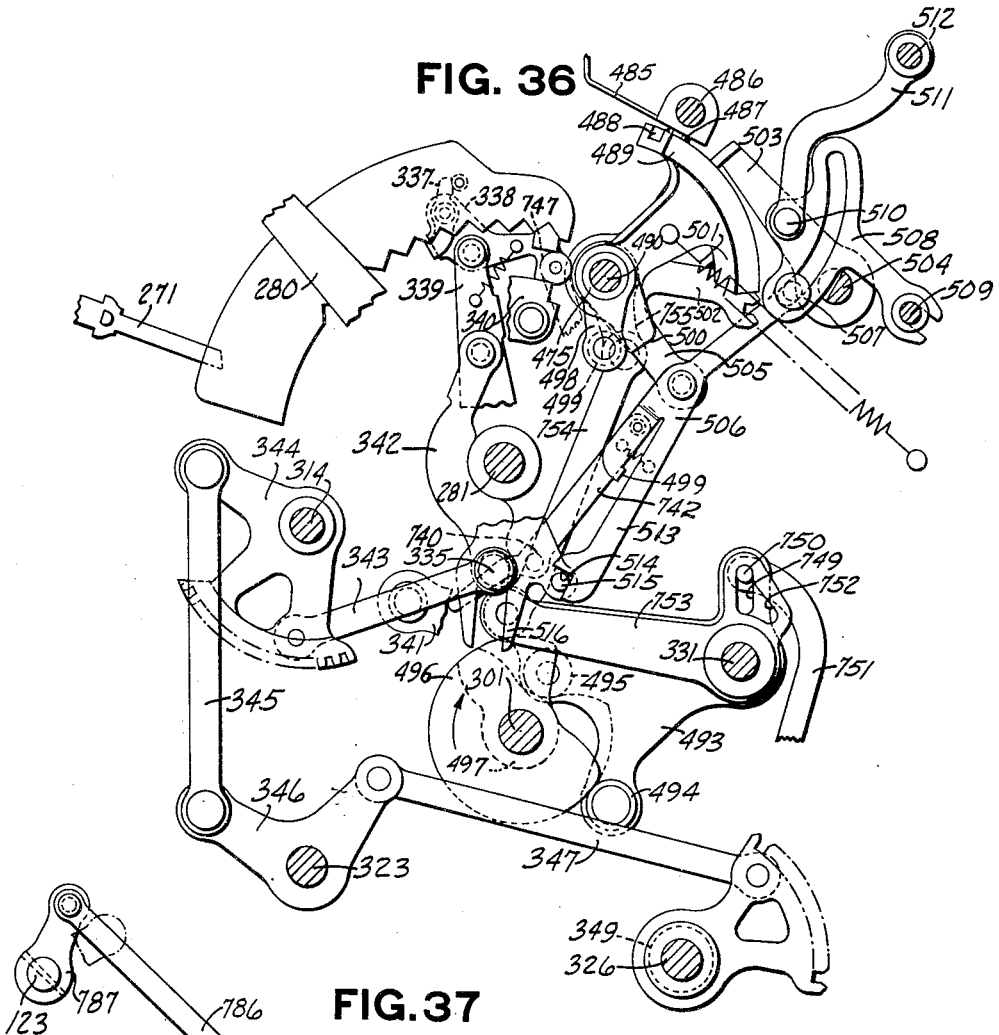

Fig. 36 is a side elevation showing a portion of the differential mechanism for selecting the different storage sets on each of the storage lines and for controlling the lateral positioning of the shiftable pin board carriage.

Figure 37:
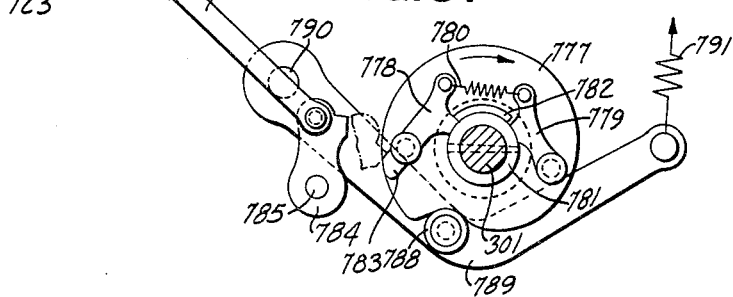

Fig. 37 is a detail view of the clutch mechanism for connecting the main cam shaft of the machine proper to the auxiliary cam shaft for the pin board mechanism.

Fig. 38 is a diagrammatic view of a portion of the pin board mechanism, showing the manner in which the keys 271 and 272 control the selecting and the displacing of the pins corresponding to the selected storage set.

GENERAL DESCRIPTION

The machine embodying the instant invention has a plurality of denominational rows of amount keys which control the positioning of their corresponding main differential actuators, which actuators in turn control the positioning of corresponding type wheels. The main actuators are also adapted to actuate two main sets of totalizer wheels carried, respectively, by a front totalizer line and a rear totalizer line, each totalizer line having a maximum of ten sets of totalizer wheels thereon.

Two rows of transaction keys control the selection of the different sets of totalizer wheels on the front and rear totalizer lines for actuation by the main actuators, and in adding operations said rows of keys control means which cause said totalizer wheels to be engaged with and disengaged from said main actuators.

The well-known total control lever is provided for controlling the adding, the sub-total recording, and the total recording functions of the machine. In sub-total and total recording operations often referred to as "reading" and "resetting" operations, the total control lever also controls means for causing one or the other of the two main totalizer lines to receive engaging and disengaging movement, in which case the two rows of transaction keys merely select the different sets of totalizers on the two lines and have nothing to do with the engaging and disengaging of said totalizers with and from the main actuators.

In adding operations, the main actuators, during their initial movement, are positioned under control of the depressed amount keys, and, at the same time, the selected totalizer line is shifted laterally to aline the selected set of wheels thereon with said actuators.

After the actuators have been positioned in accordance with the value of the depressed amount keys, the wheels of the selected totalizer are engaged therewith, and return movement of said actuators rotates said wheels to add therein the amount set up on the keyboard.

Adding and subtracting operations are effected by one cycle of movement of the operating mechanism, whereas sub-total and total recording operations require two cycles of movement of said operating mechanism. The term "cycle" is used herein as meaning one complete rotation of the main operating shaft. The cycle-controlling mechanism is not shown in the present application; however, this mechanism is well known in the art and is fully disclosed in the patents referred to at the beginning of this specification.

The first cycle of a sub-total or total recording operation is utilized to shift the selected totalizer line laterally to bring the selected set of wheels thereon into register with the main actuators, and, during this first cycle, the zero stop pawls break the latches for said main actuators in zero position. Consequently said actuators do not move beyond zero in the first cycle of operation. Immediately after the selected set of totalizer wheels has been moved into register with the main actuators, said wheels are engaged with said actuators.

During the second cycle of a sub-total or total recording operation, initial movement of the main actuators reversely rotates the selected set of totalizer wheels until a long tooth on each of said wheels, upon arrival at zero position, actuates mechanism which stops the main actuators in positions corresponding to the amounts on said set of totalizer wheels. In sub-total recording or "reading" operations, the selected set of totalizer wheels remains in engagement with the actuators during their return movement and is consequently restored to its original position to have reentered therein the amount of the total. In total recording or "resetting" operations, the selected set of totalizer wheels is disengaged from the main actuators after initial movement of said actuators, in the second cycle of such operation, has returned said wheels to zero, and consequently said wheels remain in a zeroized condition.

In addition to the two main totalizer lines just described, the present machine is equipped with ten lines of storage wheels, each line having ten separate sets of storage wheels thereon, thus providing means for storing 100 separate totals. The ten lines of storage wheels are arranged in a circle around nine auxiliary actuators, one such actuator for each denominational group of storage wheels. The auxiliary actuators are arranged to slide laterally in relation to the ten sets storage wheels to select said sets of storage wheels for actuation.

The sets of storage wheels have no transfer mechanisms, and all the totals stored therein are computed in a balance totalizer which forms a connecting medium between the auxiliary actuators and the main actuators of the machine proper. As the storage wheels have no transfer mechanisms, obviously they do not pass through zero. Each of said storage wheels has a long tooth, which, in cooperation with a stop bar, locates said wheels in zero position. This type of construction makes for compactness and permits the storing of 100 totals in a minimum of space, a very desirable feature which permits the incorporation of such a device in a standard type of machine of the character referred to hereinbefore.

While the capacity of the storage devices embodied in the machine of the instant disclosure is 100 totals, it is not the desire to limit the invention to the storage of any certain number of totals, as it is obviously within the scope of this invention to increase or decrease the number of storage sets on a line, or the number of lines in a storage unit, or to provide additional storage units, whichever is desirable.

Two rows of keys, located in the right-hand section of the keyboard of the machine, control the selection of the 100 storage sets. One row of keys controls the lateral shifting of the auxiliary actuators to select the different sets of storage wheels on the different lines, and the other row of keys controls the selection of the ten lines for engaging and disengaging movement to cause the selected set of wheels thereon to cooperate properly with the auxiliary actuators.

The balance totalizer, which forms the connecting link between the storage devices and the machine proper, is mounted in a framework which is shiftable downwardly to disconnect the balance totalizer, which is normally connected to the auxiliary actuators, from said actuators, and to connect said totalizer to the main actuators, and is shiftable upwardly to reverse the procedure. The shiftable framework supporting the balance totalizer is also adapted to shift horizontally or laterally to bring either the adding wheels or the subtracting wheels thereof into register with the main actuators, depending upon whether an adding operation or a subtracting operation is being performed in said balance totalizer.

The machine in its present embodiment is arranged for use by banking institutions in the computation of certain of the more active checking accounts; therefore, a Deposit key and a Withdrawal key are provided for controlling the horizontal (add and subtract) shifting of the balance totalizer.

The timing of the engaging and disengaging of the wheels of the balance totalizer with and from the auxiliary and main actuators is governed by the setting of the regular total control lever in the same manner as said total control lever governs the engaging and disengaging of the regular or adding totalizers of the machine.

In adding operations, the main actuators are positioned, during their initial movements, in accordance with the value of the depressed amount keys, and, while said main actuators are thus being positioned, the selected set of storage wheels is engaged with the auxiliary actuators and the auxiliary actuators are operated to restore the selected set of storage wheels to zero, as will be explained later. As the balance totalizer is also connected to the auxiliary actuators at this time, operation of said actuators turns the selected set of storage wheels to zero and transfers the amount thereon to the wheels of the previously zeroized balance totalizer. Before the main actuators begin their return movements, the balance totalizer is disconnected from the auxiliary actuators and connected to the main actuators, whereupon return movement of said main actuators rotates said wheels in an additive direction in accordance with the amount set up on the keyboard. The balance totalizer now contains an amount which is a combination of the amount stored in the selected set of storage wheels and the amount set up on the amount keys. After the main actuators have completed their return movements, the balance totalizer is disconnected therefrom and reconnected to the auxiliary actuators and remains thus connected at the end of a machine operation. Likewise, the wheels of the selected storage device remain in engagement with the auxiliary actuators at the end of a machine operation.

At the beginning of the next machine operation, the auxiliary actuators are operated to turn the balance totalizer wheels to zero and simultaneously enter the amount thereon into the wheels of the previously selected storage device. Immediately after the new amount has been entered into the wheels of the previously selected storage device, said wheels are disengaged from the auxiliary actuators and the set of storage wheels selected for the present operation is immediately engaged therewith, and return movement of said auxiliary actuators rotates said wheels to zero and enters the amount thereon into the zeroized balance totalizer, and the present adding operation is continued as explained above.

In subtracting operations, the amount on the selected set of storage wheels is first entered into the plus side of the zeroized balance totalizer, and, while the balance totalizer is being disconnected from the auxiliary actuators and connected to the main actuators, said main actuators having been previously positioned under control of the depressed amount keys, said balance totalizer is shifted laterally to bring the subtract side thereof into register with the main actuators. Return movement of the main actuators reversely rotates the adding wheels of the balance totalizer to subtract therefrom the amount set up on the keyboard. Near the end of the machine operation, the balance totalizer is again engaged with the auxiliary actuators, and, in the beginning of the succeeding operation, the balance totalizer is turned to zero and the amount thereon is entered into the wheels of the selected storage device.

As previously explained, sub-total and total recording operations, often referred to as "read" and "reset" operations, require two cycles of operation of the machine. Sub-total and total recording operations in the balance totalizer, as well as the other totalizers of the machine, are controlled by the well-known total control lever. When it is desired to record totals of amounts in the different storage sets, the total control lever is moved from Add position to the balance totalizer reset position (Reset-1) and the proper keys are depressed to select the desired set of storage wheels. During the first cycle of a total recording operation, the selected set of storage wheels is engaged with the auxiliary actuators and reversely rotated thereby to zero, to enter the amount thereon into the zeroized balance totalizer. Near the end of the first cycle of a total recording operation, the balance totalizer is disconnected from the auxiliary actuators and connected to the main actuators, whereupon initial movement of said main actuators, at the beginning of the second cycle of the operation, reversely rotates said balance totalizer wheels to zero, thereby causing said main actuators to be positioned in accordance with the value of the amount which was standing on the selected set of storage wheels at the beginning of the operation, said actuators in turn positioning the recording mechanism.

After the wheels of the balance totalizer have been turned to zero and prior to return movement of the main actuators, said wheels are disconnected from said main actuators and reconnected to the auxiliary actuators. Inasmuch as the balance totalizer wheels are standing at zero, nothing will be entered in the selected set of storage wheels at the beginning of the succeeding operation, and, as a result, said storage wheels will remain in a zeroized condition.

The only difference between a total recording operation and a sub-total recording operation is that, during the last cycle of a sub-total recording operation, the wheels of the balance totalizer remain connected to the main actuators during their return movements and consequently are returned thereby to their original positions, and in the beginning of the succeeding operation this amount is reentered in the preselected set of storage wheels.

The machine embodying the instant invention is provided with a pin board comprising a set of adding pins and a set of overdraft pins, each set having pins which correspond to each of the sets of storage devices. The two sets of pins are mounted in a shiftable framework or carriage which is positioned laterally under influence of one of the rows of storage device selecting keys with relation to the pin selecting and operating devices, which devices are in turn controlled by the other row of storage device selecting keys. Each of the two sets of pins consists of ten horizontal rows corresponding, respectively, to the ten different lines of storage wheels, and each horizontal row has ten pins therein corresponding to the ten sets of wheels on each line. As an illustration, the pins surrounded by circles in Figs. 26 and 38 correspond to the fifth set of wheels on the No. 7 storage line, or storage set No. 57.

The pins of each of the sets are numbered individually according to the storage device which they represent, and these numbers as well as the pins themselves are visible through a transparent closure in the top of the cabinet, so that the active storage devices may be readily identified.

Assuming that the storage devices and the pins are in a cleared condition and that the machine is conditioned for adding operations, selection of any of the storage devices will cause the corresponding add pin to be displaced and, if the amount to be entered in the selected storage device is an overdraft, will likewise cause the corresponding overdraft pin to be displaced. When an overdraft occurs in the balance totalizer, a projection on the highest order plus wheel rocks the overdraft control mechanism from normal position to overdraft position. This renders mechanism effective which causes the overdraft pin, corresponding to the selected storage device, to be displaced to indicate that the amount in said storage device is a negative amount.

There are two types of resetting operations for resetting the adding pins and the overdraft pins and for simultaneously resetting the corresponding storage devices, and these two types of operations are known as "Reset One at a Time" and "Reset Automatic." The machine is conditioned for either of these resetting operations by means of a control lever, which, when moved to Reset One at a Time position, permits the storage device selecting keys to be used for selecting the storage devices to be reset and for causing the corresponding add and overdraft pins to be reset simultaneously. When the manipulative lever is in Reset Automatic position, the displaced adding and overdraft pins serve to position the differential mechanism for the two rows of storage device selecting keys in accordance with said displaced pins, and said differential mechanisms in turn select the corresponding storage devices for resetting. Before an attempt is made to reset the displaced adding and overdraft pins automatically, it is necessary to make sure that the shiftable pin board carriage and the pin selecting arms are in their left-hand and downward positions, respectively, and this is effected by the performance of an idle operation of the machine for that purpose.

Movement of the control lever to Reset Automatic position moves similar stopping bars or bails into the paths of the displaced adding and overdraft pins and disconnects the pin board carriage from the differential mechanism which normally controls its positioning, thus releasing said carriage to the action of a spring which urges said carriage toward the right until the first or highest value displaced add or overdraft pin contacts its stop bar. This positions said pin board carriage in proper relationship to this particular order of pins. In successive operations of the machine, all the pins in this order are restored upwardly to normal position, and, at the same time, the storage devices corresponding to said pins are zeroized and the amounts contained therein are printed upon record material located in the machine proper.

Returning all the pins in a particular vertical row or order to upward or normal position moves the lower ends of said pins out of the path of the stop bar associated therewith, and normally this would release the pin board carriage to the action of its spring, which would immediately move said carriage to the next order in which a pin was displaced. However, means is provided for holding the pin board carriage against movement, at the beginning of the succeeeding operation, until the pin selecting and operating mechanism is moved to an extreme or neutral position, where it is out of the path of any displaced pins. The arrival of said pin selecting and operating mechanism at said neutral position releases the pin board carriage to the action of its spring, which immediately moves said carriage laterally until the next displaced pin contacts its corresponding stop bar. The automatic resetting action continues as outlined above until all of the pins and the corresponding storage devices have been reset.

In resetting the displaced pins and corresponding storage devices one at a time, the control lever is moved to the Reset One at a Time position, and the storage devices and the corresponding pins are then selected for resetting by depression of the proper selecting keys.

It is to be understood that, in the resetting operations outlined above, it is necessary to have the regular total control lever, as well as the storage device control lever, in proper position in order to have the machine function properly.

The pin board control lever, in addition to the resetting positions referred to above, has an Add position, in which the adding and overdraft pins are displaced in the manner explained above for adding operations, and said lever has a Neutral position, in which the pin selecting and operating mechanism is rendered inoperative, so that no pins will be displaced or restored.

An indicating device, which is visible through an aperture in the top of the cabinet, indicates when the overdraft pin selecting mechanism is functioning.

One example of a very efficient use of the present machine is that of a banking establishment for keeping a continuous record of the 100 most active checking accounts, and in such use the add and overdraft pins of the pin board would provide a convenient means for determining which of the storage devices representing the 100 accounts are active and whether or not the active storage devices have positive or negative amounts stored therein.

In the ensuing pages, the mechanism which is outlined in general above and which is pertinent to the present invention is described in detail.

Detailed Description

*Framework and operating mechanism*

Referring particularly to Figs. 2, 3, 23, 34A, and 34B, the framework of the machine embodying the instant invention comprises a right frame 50, intermediate frames 51 and 52, and a left frame 53, mounted upon a base plate (not shown) and maintained in rigid relationship to each other by cross frames 54, 55, and 56 and various other cross frames, bars, and rods. A suitable case or cabinet 57 (Figs. 2 and 23) encloses the mechanism of the machine and is secured to the main frames of the machine.

Normally the machine is operated by a conventional type of start-stop electric motor. However, a hand crank is also provided for emergency operation of the machine. As these parts are well known in the art, they are not illustrated herein, and further description thereof is believed unnecessary.

*Amount entering mechanism*

The machine embodying the instant invention has a plurality of rows of amount keys 58 (Figs. 1 and 2), each denominational order of which is mounted in a key blank framework 59 mounted on rods 60 and 61 supported by the main frames of the machine. Inasmuch as the mechanism of each of the amount banks is substantially duplicated, it is believed that the description of one such amount bank and its associated mechanisms will be sufficient for the present purpose.

Referring now to Fig. 2, depression of one of the amount keys 58 moves the lower end of the stem thereof into the path of an extension of a bell crank 62 pivoted on an extension of a differential actuator 63, for this particular amount bank, having a hub 64 journaled on a stud 65 supported between right-hand and left-hand support plates 66 (the left-hand plate only being shown here) for this particular amount bank. A tie rod 67 extends through holes in the studs 65 to assist in securing the differential mechanisms of the different amount banks in fixed relationship to each other. A link 68 pivotally connects the bell crank 62 to a latch 69 pivoted at 70 to the actuator 63. A spring 71 urges the bell crank 62, the link 68, and the latch 69 rearwardly to normally maintain a foot-shaped extension of said latch in engagement with a shoulder on a differential operating segment 72 free on the stud 65. A link 73 pivotally connects the segment 72 to a differential cam lever 74 free on a stud 75 in the left-hand plate 66. Extensions of the cam lever 74 carry rollers 76 and 77, which cooperate, respectively, with companion plate cams 78 and 79 secured on a main shaft 80 journaled in the main framework of the machine. The shaft 80 receives one clockwise revolution in each adding and subtracting operation and two such revolutions in sub-total and total recording operations.

All types of operations of the machine are initiated by the depression of the usual starting bar 91 (Fig. 1), which depression closes the circuit to the operating motor and simultaneously renders the clutch mechanism effective to connect the operating motor to the main shaft 80 (Fig. 2). A cycle controlling mechanism (not shown here but fully disclosed in the patents referred to earlier herein) determines whether the main shaft 80 is to make one clockwise revolution or two such revolutions before the clutch mechanism is automatically disconnected and the current to the motor is interrupted.

Depression of one of the amount keys 58 rocks a zero stop pawl, for this particular amount bank, counter-clockwise out of the path of an extension of a reset spider 82 free on the hub 64 and having therein a slot which engages a stud 83 in the bell crank 62.

Initial movement of the shaft 80 and the cams 78 and 79 (Fig. 2) rocks the lever 74 and the operating segment 72 first clockwise. The segment 72 carries the latch 69, the actuator 63, and the spider 82 clockwise in unison therewith until an extension of the bell crank 62 engages the stem of the depressed amount key 58. This rocks the bell crank 62 counter-clockwise to shift the latch 69 forwardly to disengage the foot-shaped extension thereof from the shoulder on the segment 72 and to engage a foot-shaped extension of the link 68 with a corresponding one of a series of notches 84 in a plate extending between arms of one of the support plates 66.

This positions the actuator 63 in agreement with the value of the depressed amount key 58, and the link 68, in cooperation with the corresponding notch 84, secures said actuator in set position. The operating segment 72 is free to continue its full excursion of movement clockwise, and an arcuate surface thereon, in cooperation with the sole of the foot-shaped extension of the latch 69, locks the link 68 in the notch 84.

Totalizers

The machine embodying the instant invention has three lines of totalizers; namely, a #1 or balance totalizer line and #2 and #3 adding totalizer lines, the latter having a maximum of ten sets of interspersed totalizer wheels thereon. The actuator 63 (Fig. 2) has thereon three sets of teeth adapted to cooperate, respectively, with the corresponding adding and subtracting wheels of the #1 or balance totalizer and the corresponding wheels of the #2 and #3 adding totalizers. The wheels of the #2 and #3 totalizers are selected for engagement with the actuators 63 by means of their respective rows of transaction keys 86 and 89 (Fig. 1). Inasmuch as the system chosen to illustrate the operation of the machine is that used by banking establishments in the computation and analysis of checking accounts, the adding wheels of the balance totalizer are selected for engagement with the actuators 63 by means of a Deposit key 87, and the subtract wheels of said balance totalizer are selected for engagement with the actuators 63 by means of a Withdrawal key 88.

Each of the totalizer lines is provided with the usual tens transfer mechanism for transferring tens digits from lower to higher denominations when the wheels of the lower denominations pass through zero. The transfer mechanism for the balance totalizer line functions in subtract operations to subtract one from the higher denominations when the wheels of the lower denominations pass through zero while being rotated in a subtractive direction.

The usual total control lever 92 (Fig. 1) is provided for controlling the adding, reading, and resetting functions of the machine, and, when said total control lever is in Add position, as shown here, the transaction keys 86 and 89 select the corresponding sets of wheels on the #2 or #3 totalizer lines and likewise control mechanism which causes the corresponding totalizer line to receive engaging and disengaging movement to cause the selected set of wheels to be engaged with and disengaged from the actuators 63 in adding time. Likewise, when the total control lever 92 is in Add position, it influences the cycle control mechanism to cause the main shaft 80 (Fig. 2) to make one clockwise revolution, as explained earlier herein.

In adding operations, after the actuators 63 have been positioned by the depressed amount keys 58, the corresponding wheels of the #2 or #3 totalizer are engaged therewith, and return movement of said actuators, under influence of the operating segment 72, revolves said adding wheels in accordance with the value of the depressed amount keys 58. After the amount has been added in the selected totalizer wheels, said wheels are disengaged from the actuators 63.

The #1 or balance totalizer has an adding wheel and a subtracting wheel for each denominational order, the corresponding wheels of each order being geared together so that they revolve reversely to each other.

When the Deposit key 87 (Fig. 1) is depressed, the adding wheels of the balance totalizer are moved into register with the amount actuators 63, and, after said actuators are positioned, said wheels are moved into engagement with the corresponding teeth thereof in exactly the same manner and at the same time as the wheels for the adding totalizers, so that the amount set up on the amount keys 58 will be added therein. Depression of the Withdrawal key 88 causes the subtracting wheels of the balance totalizer to be moved into register with the amount actuators 63, and, after said actuators have been positioned, said wheels are engaged with the corresponding teeth of the actuators, and return movement of said actuators reversely rotates the adding wheels of the balance totalizer to subtract therefrom the amount set up on the keys 58. It is to be understood that the balance totalizer may be selected for either addition or subtraction while totalizers on either or both of the adding totalizer lines are simultaneously selected for addition.

When no amount keys 58 in the amount bank shown here (Fig. 2) are depressed in an adding operation or in a subtracting operation, the zero stop pawl 81 remains in the path of the spider 82 and engages said spider when it is moved from home position, as shown here, to zero position, to disengage the latch 69 from the segment 72, to cause the actuator 63 to be positioned at zero.

It will be noted, by observation of Fig. 1, that the total control lever 92 has three reading or sub-total recording positions for the #1, #2, and #3 totalizers, and three resetting or total recording positions for the #1, #2, and #3 totalizers. Movement of said total control lever to any of its reading or resetting positions exercises control over the cycle controlling mechanism to cause the main shaft 80 to receive two clockwise revolutions, which are necessary in reading and resetting operations. The first cycle or revolution of the shaft 80 is utilized to shift the selected totalizer line laterally to select the desired set of wheels thereon. During the first cycle of a sub-total or total recording operation, the zero stop pawls 81 (Fig. 2) remain in effective position, as shown here, to break the latches of the actuators 63 in zero position.

Prior to the beginning of the second cycle of a sub-total or total recording operation, clockwise movement is imparted to the well-known zero throwout shaft 123 and to arms 124 secured thereon, causing a rod 125, carried by said arms, in cooperation with extensions 126, one of which is secured to each of the zero stop pawls 81, to rock said pawls counter-clockwise out of the path of the spiders 82. In the beginning of the second cycle of a sub-total or total recording operation, the wheels of the selected totalizer are engaged with the actuators 63 prior to their initial movement clockwise, which movement reversely rotates said wheels until a long tooth thereon causes the spiders 82 to be stopped in positions corresponding to the amount standing on said totalizer wheels. Stopping the spiders 82 causes the slots therein, in cooperation with the studs 83 (Fig. 2), to break the latches 69 to position the actuators 63 in accordance with the amount standing on the corresponding totalizer wheels. This leaves the wheels of the selected totalizer in zero position, and, in total recording or resetting operations, said wheels are disengaged from the actuators 63 at this time and consequently remain zeroized. In sub-total recording or reading operations, the wheels of the selected totalizer remain in engagement with the actuators 63 during their return movement counter-clockwise and are consequently restored to their original positions.

Printing mechanism

The positioning of the main actuator 63 (Fig. 2), under influence of the amount keys 58, is transmitted to the printing mechanism by means of a beam 93 pivoted at 94 to said actuator 63, said beam having a slot 95, which straddles a stud 96 in a link 97. The upper end of the link 97 is pivotally connected to an arm 98 fast on a sleeve 99 free on another sleeve 90 in turn free on a shaft 100 journaled in the main framework. The lower end of said link 97 is pivotally connected to an arm 101 integral with a gear sector 102 and an alining segment 103, all of which are free on a shaft 104 journaled in the main framework of the machine. The gear sector 102 meshes with a helical gear 105 secured on one end of a shaft 106 journaled in the frames 54 and 55 (Fig. 3), said shaft 106 also having secured thereon a gear 107, which meshes with teeth in the lower edge of a rack 108 mounted to shift horizontally. Teeth on the upper edge of the rack 108 mesh with a gear 109 secured on a shaft 110 journaled in the printer framework, said shaft also having secured thereon a gear 111, which meshes with a type wheel 112 for the particular amount bank shown here.

The alining segment 103 (Fig. 2) has teeth, which cooperate with an alining bar 113 mounted on similar arms 114, only one shown here, secured on a shaft 115 journaled in the main framework of the machine. Near the beginning of machine operation, and before positioning movement is imparted to the beam 93 and the link 97, the alining bar 113 is disengaged from the teeth of the segment 103. After the main actuator 63 has been positioned, a roller 116 mounted on an extension of the cam lever 74 engages an arcuate surface 117 on the lower edge of the beam 93 and moves a curved inner surface 118 on the upper edge of said beam into contact with the hub 64, to position said beam, the link 97, and the arm 101 in accordance with the value of the depressed amount key 58. The arm 101, through the gear sector 102 and the train of gearing described above, positions the type wheel 112 to the value of the depressed amount key, whereupon the impression mechanism (not shown) functions to move a record strip 120 and an inking ribbon (not shown) into contact with said type wheel 112, to record the amount set up on the amount key 58.

After the beam 93, the link 97, and the alining segment 103 have been positioned, as described above, the alining bar 113 is reengaged with the teeth of the segment 103 to retain the parts of the printing mechanism in alinement while printing is being effected.

Transaction key banks

The bank of transaction keys 86 (Figs. 1 and 3) has a differential mechanism, similar in many respects to the amount differential mechanism shown in Fig. 2 and explained above, for controlling the positioning of a corresponding type wheel in accordance with the depressed transaction key 86 and for controlling the shifting of the #2 totalizer line to select the set of wheels thereon corresponding to said depressed key.

By referring to Fig. 3, it will be seen that the transaction keys 86 are mounted in a key bank 127 supported by the rods 60 and 61. Depression of any one of the keys 86 rocks a zero stop pawl 128 therefor out of the path of an arm 129 free on a stud 130 extending between two similar plates 131 (only one shown here) which support the transaction differential mechanism as a unit and which are in turn supported by rods extending between the main frames of the machine. The arm 129 has, at the forward end thereof, a slot, which engages a stud 132 in a forward arm of a bell crank 133 pivoted on a differential arm 134 free on the stud 130. Also pivoted on the arm 134 is a link 135 which, together with the bell crank 133, supports a transaction latch 136 for radial shifting movement. A spring 137 urges the latch 136 rearwardly to normally maintain a foot-shaped rearward extension thereof in engagement with a shoulder on a differential operating segment 138 free on the stud 130 and connected by a link 139 to a cam lever 140 free on a stud 141 in the plate 131. The lever 140 carries rollers 142 and 143, which cooperate, respectively, with companion plate cams 144 and 145 secured on the main shaft 80, which, it will be recalled, makes one clockwise revolution in adding and subtracting operations and two such revolutions in total and sub-total recording operations.

If no key 86 is depressed in any type of operation, the zero stop pawl 128 remains in the path of the arm 129, and, upon clockwise movement of the segment 138 under influence of the cams 144 and 145, said zero stop pawl is engaged by said arm 129 to disengage the latch 136 from the shoulder of said segment 138 to position said latch and associated mechanism in zero position to select the adding totalizer on the #2 line corresponding to that position.

As the latch 136 moves out of engagement with the shoulder of the segment 138, a foot-shaped extension 146 of said latch is engaged with a corresponding alining notch 147 in a curved plate secured to one of the plates 131.

After the arms 129 and 134 have been positioned, as explained above, and near the terminus of the initial movement clockwise of the lever 140, a roller 148, carried by said lever 140, engages an outcurved surface 149 on a beam 150, pivotally mounted on the arm 134, and forces an incurved surface 151 on the upper edge of said beam into engagement with a hub 152 in the arm 134, to position said beam 150 in accordance with the position of the arm 134.

Differential positioning of the beam 150 is transmitted to the type wheel for the keys 86 by means of a slot 153 in said beam, in cooperation with a stud 154 in a link 155, the upper end of which link is pivotally connected to an arm 156 fast to the sleeve 90 free on the shaft 100. The lower end of the link 155 is pivotally connected to an arm 157 free on the shaft 104 and having integral therewith a gear sector 158 and an aligning segment 159, said gear sector meshing with a helical gear 160 secured on one end of a printer shaft 161 journaled in the frames 54 and 55. The shaft 161 is connected to the type wheel for the transaction keys 86 in exactly the same manner as the shaft 106 (Fig. 2) is connected to the type wheel 112 for the amount keys 58. The alining bar 113, in cooperation with teeth in the segment 159, alines the printing mechanism in set position.

The link 155 transmits the positioning of the beam 150 and its associated transaction differential mechanism to the type wheel for this particular bank and to the sleeve 90. Also connected to the sleeve 90, by an arm and a link (not shown), is a shifting cam (not shown) for the #2 totalizer line, which cam shifts said totalizer line laterally, with relation to the amount actuators 63, to aline the set of wheels thereon, corresponding to the position of the differential mechanism for the transaction keys 86, with said amount actuators. The mechanism for shifting the adding totalizer lines laterally is fully disclosed in the patents referred to hereinbefore and is similar to the mechanism shown in Fig. 34A, and presently to be described, for controlling the shifting of the balance totalizer line.

Depression of any one of the transaction keys 86 (Fig. 3) moves the lower end of the stem thereof into the path of an extending arm of the bell crank 133. Consequently, upon operation of the machine, the depressed transaction key breaks the latch of the differential mechanism, in the usual manner, and positions the printing mechanism and the #2 totalizer line in accordance with the value of said depressed key.

The row of transaction keys 89 (Fig. 1) has a differential mechanism associated therewith, similar in every respect to the differential mechanism for the transaction keys 86, shown in Fig. 3 and described above, for selecting the different totalizers on the #3 totalizer line for engagement with the main actuators 63.

The Deposit key 87 and the Withdrawal key 88 (Fig. 1) control the positioning of a differential mechanism similar to that for the transaction keys 86, for positioning a selecting cam 164 (Fig. 34A) for shifting the #1 or balance totalizer line laterally to aline the positive or negative wheels thereon with the amount actuators 63, as will be explained fully later.

The keys of each transaction row, including the keys 86, 87, 88, and 89, control the positioning of a corresponding selecting disc, which selects the corresponding totalizers for engaging and disengaging movement in adding and subtracting operations.

As previously explained, the total control lever 92 (Fig. 1) controls the engaging and disengaging movement of the various totalizer lines in sub-total and total recording operations. When the total control lever 92 is in Add position, the selecting discs, controlled by the transaction keys, control the engaging and disengaging movements of the various totalizer lines. Movement of the total control lever to #1, #2, or #3 Read position causes the corresponding totalizer line to receive engaging and disengaging movement in reading or sub-total time, and movement of the total control lever to #1, #2, or #3 Reset position causes the corresponding totalizer line to receive engaging and disengaging movement in reset or total time. As explained previously, the total control lever 92 also controls the functioning of the cycle controlling mechanism, and, when said lever is in Add position, the main shaft 80 (Fig. 3) performs one clockwise revolution or one cycle of movement, and, when said total control lever 92 is in any of its reading or resetting positions, said main shaft 80 performs two such revolutions or two cycles of movement.

The mechanism for shifting the various totalizer lines laterally to select the different sets of totalizer wheels thereon for engagement with and disengagement from the amount actuators 63, and the mechanism for causing the selected totalizers to be engaged with and disengaged from the amount actuators, are fully disclosed in the patents referred to hereinbefore, and therefore further description thereof is believed unnecessary.

*Balance totalizer*

The #1 or balance totalizer, as previously stated, forms a connecting link between the main actuators 63 and the ten lines of storage wheels. The balance totalizer functions substantially in the same manner as the totalizers on the #2 and #3 totalizer lines, but, as this totalizer has a more important bearing on the present invention, it will be described more in detail.

All computations of the amounts stored in the various sets of storage wheels are performed in the balance totalizer. For example, in adding and subtracting operations, the selected set of storage wheels is first reversely rotated to zero and the amount thereon is transferred to the plus side of the previously zeroized balance totalizer. The balance totalizer is then disengaged from the auxiliary actuators for the storage devices and engaged with the main actuators 63. In adding operations, the plus side of the balance totalizer is engaged with said main actuators and the amount set up on the keyboard is added to the amount which was transferred from the storage device to the balance totalizer wheels. In subtract operations, the minus side of the balance totalizer is engaged with the main actuators and the plus wheels of said totalizer are reversely rotated to subtract the amount set up on the keyboard from the amount transferred thereto from the selected storage device. At the beginning of the next operation, the total amount on the plus side of the balance totalizer is transferred to the wheels of the storage device which was selected in the previous operation.

The balance totalizer comprises nine denominational units; however, as the mechanism is substantially duplicated in each unit, it is believed that a description of the mechanism associated with the main actuator mechanism shown in Fig. 2 will be sufficient.

Figures 9, 10:
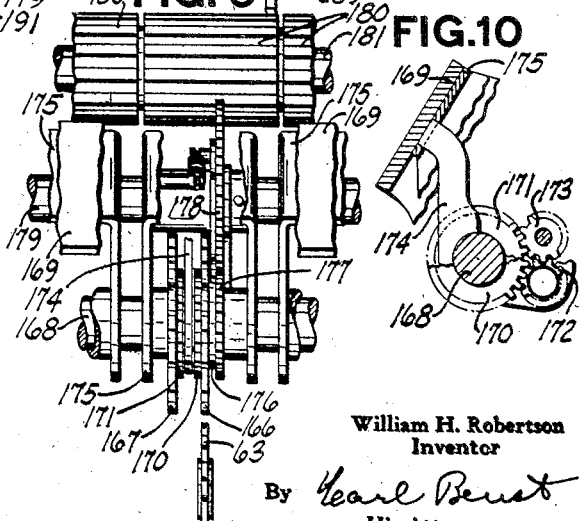
Fig. 9 is a side-spacing view showing a part of the mechanism for transferring amounts from the accounting machine to the storage devices and vice versa.
Fig. 10 is a detail view of the reverse gearing for one set of plus and minus wheels of the balance totalizer.

The denominational unit of the balance totalizer chosen to be described has a plus wheel 166 and a minus wheel 167 (Figs. 2, 9, and 17) free on a shaft 168 supported by the depending side arms of a framework 169 mounted to shift laterally and in and out, in a manner to be described presently. The plus wheel 166 and the minus wheel 167 have secured thereto, respectively, similar gears 170 and 171 (Figs. 9 and 10), which mesh, respectively, with pinions 172 and 173 in turn meshing with each other, said pinions being mounted on a plate 174 supported by the shaft 168 and disposed between the gears 170 and 171. The plate 174 has an extension which engages a slot in an inverted U-shaped bracket 175 having two downwardly extending arms which freely engage the shaft 168 and between which arms the plus wheel 166 and the minus wheel 167 for this particular denomination are supported. The bracket 175 is secured on the cross bar of the framework 169, and it is to be understood that there is a similar bracket 175 for each denominational unit of the balance totalizer.

The gearing just described, including the pinions 172 and 173, connect the plus wheel 166 and the minus wheel 167 for reverse rotation, which is essential in this type of add-subtract totalizer.

The plus wheel 166 (Figs. 9, 17, 34A, and 34B) has integral therewith a zero stop disc 176 and a gear 177, said gear meshing with an intermediate gear 178 free on a shaft 179 journaled in the brackets 175 and the side arms of the frame 169. The gear 178 meshes with a long pinion 180 free on a shaft 181 supported by a plurality of plates 182, which in turn space and support the mechanism for the storage devices, said plates 182 being mounted on rods 183, 184, and 192 supported by the frames 52 and 53.

The right and left arms of the frame 169 (Figs. 3, 17, and 34A) have, respectively, slots 185 and 186, which engage corresponding guide blocks 187 and 188 secured, respectively, on the transaction bank plate 131 and one of the amount bank plates 66 (Fig. 2). The right and left arms of the framework 169 are loosely mounted on the shaft 179 and a companion shaft 189, said shafts engaging, at their opposite ends, parallel slots in guide plates 190 and 191 (Figs. 7, 34A, and 34B) secured, respectively, to the frames 52 and 53. Secured on the left arm of the framework 169 (Fig. 34A) is a bracket 194, which forms a bearing for one end of the shaft 168 and which also carries a pin 195 which forms an axle for a double roller 196. One portion of the double roller 196 engages a horizontal guide slot 197 in a bracket 198 secured to the frame 53, to hold the pin 195 against rotary displacement when the framework 169 is being shifted laterally, and the other portion of said roller engages a cam slot 199 in the cam 164.

When the Deposit key 87 (Fig. 1) is depressed, the differential mechanism for the Deposit and Withdrawal keys positions the cam 164 as shown here (Fig. 34A) to aline the plus wheels 166 of the balance totalizer with the amount actuators 63. When the Withdrawal key 88 is depressed, the differential mechanism rotates the cam 164, causing the slot 199, in cooperation with the roller 196, to shift the framework 169 to the right to aline the subtract wheels 167 of the balance totalizer with the amount actuators.

*Engaging mechanism for the balance totalizer*

The mechanism for engaging and disengaging the balance totalizer with and from the amount actuators and the auxiliary actuators is similar in many respects to that of the machines disclosed in the Shipley patents referred to hereinbefore, and therefore it will be but briefly described.

Secured on opposite ends of the shaft 189 (Figs. 7, 8, and 34A) are similar arms 200 carrying similar rollers 201, which engage similar camming slots 202 in the guide plates 190 and 191. Secured on one end of the shaft 189 is an arm 203 carrying a stud 204, to which is pivotally connected the upper end of a link 208, the lower end of which carries a stud 209 extending through an L-shaped slot 210 in a stationary plate 211, said stud adapted to be engaged with a hook 212 on a totalizer engaging spider 213. The link 208 carries a stud 214 (Fig. 7), which cooperates with a slot in a shifting arm 215 pivoted on a stud 216 in a crank 217 in turn pivoted on a stud 218 in the plate 211. A spring 219 urges the arm 215 counter-clockwise to normally maintain a stud 220 carried thereby in contact with the high portion of the periphery of a control disc 221, which disc is adapted to be positioned by the Deposit key 87 and the Withdrawal key 88 (Fig. 1).

Figures 7, 8:
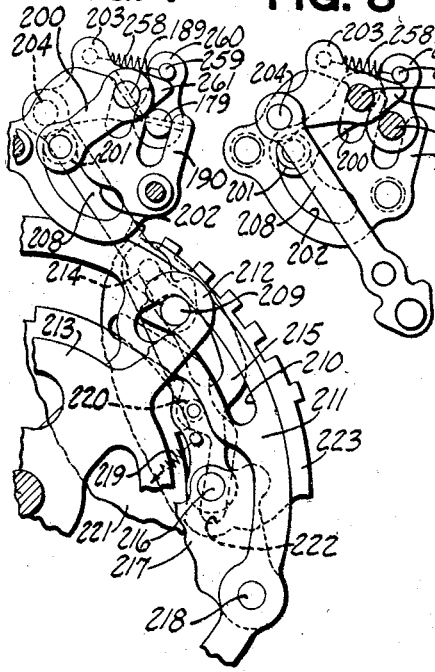
Fig. 7 is a fragmentary view of the mechanism for engaging the balance totalizers with and disengaging them from the main and auxiliary actuators.
Fig. 8 is a detail view of a part of the engaging mechanism shown in Fig. 7.

In adding or subtracting operations, when either the Deposit key or the Withdrawal key is depressed, the control disc 221 is positioned so that a high portion of the periphery thereof is opposite the stud 220, as shown in Fig. 7.

Near the beginning of operation of the machine and immediately prior to the positioning of the control disc 221, the crank 217 is rocked clockwise in the well-known manner, which movement, due to the resistance of the spring 219, rocks the arm 215 counter-clockwise to shift the link 208 clockwise to disengage the stud from the hook in the spider 213 and to engage said stud with the locking portion of the L-shaped slot 210. After the stud 209 bottoms in the locking portion of the slot 210, continued clockwise movement of the crank 217 lifts the stud 220 away from the high portion of the periphery of the disc 221 so that said disc may be positioned without stumbling on said stud. After the disk 221 has been positioned under influence of the depressed Deposit or Withdrawal keys, the crank 217 is returned counter-clockwise, causing the stud 220 to engage a high portion of the disc 221 to form a fulcrum point for the arm 215 to cause said arm to be rocked clockwise to shift the link 208 upwardly to engage the stud 209 with the hook of the engaging spider 213, as shown here.

If a low or undercut portion of the periphery of the control disc 221 is positioned opposite the stud 220, clearance is provided for said stud, which permits the arm 215 to pivot on the stud 216 without shifting the link 208, and consequently the stud 209 remains in the locking portion of the slot 210.

After the main actuators 63 (Fig. 2) have been positioned in adding and subtracting operations under influence of the amount keys 58, the engaging spider 213 (Fig. 7) is rocked first clockwise and carries the stud 209 in unison with it into the arcuate portion of the slot 210. This shifts the link 208 (Figs. 7 and 8) downwardly to rock the arm 203, the shaft 189, and the arms 200 counter-clockwise. Counter-clockwise movement of the arms 200 (Figs. 7, 34A, and 34B) causes the rollers 201, in cooperation with the slots 202, to shift the framework 169 downwardly to disengage the gear 178 (Fig. 9) from the long pinion 180 and to engage the selected plus wheel 166 or minus wheel 167 of the balance totalizer with the corresponding main actuator 63, according to the timing given in space 1, Fig. 35.

After the selected wheel of the balance totalizer has been engaged with the main actuator, return movement counter-clockwise of said actuator enters the amount set up on the corresponding amount key 58 into the selected side of the balance totalizer. After the amount actuators have completed their return movement, the engaging spider 213 (Fig. 7 and space 1, Fig. 35) is returned counter-clockwise to return the shaft 189 and the arms 200 clockwise to normal position to shift the totalizer frame 169 upwardly to the position shown here, to disengage the selected wheel of the balance totalizer from the main actuator 63 and to reengage the gear 178 with the long pinion 180. Near the beginning of the succeeding operation, the auxiliary actuators for the storage devices receive movement to turn the wheels of the balance totalizer to zero to transfer the amount thereon to the previously selected set of storage wheels, as will be explained fully later.

The stud 220 in the arm 215 also cooperates with a camming slot 222 (Fig. 7) in a total control plate 223 integral with the total control lever 92 (Fig. 1). When the total control lever 92 is in Add position, as shown here, a clearance portion of the slot 222 is opposite the stud 220, so that the arm 215 is free to move under control of the selecting disc 221. Movement of the total control lever either to No. 1 Read or to No. 1 Reset position causes the camming slot 222, in cooperation with the stud 220, to rock the arm 215 clockwise on its pivot 216, to engage the stud 209 with the hook 212, whereupon, during the next machine operation, the engaging spider 213 causes the balance totalizer to be engaged and disengaged in read or reset time, as the case may be. From the foregoing description it is evident that the selecting disc 221 is effective only in adding and subtracting operations, and that the total control plate 223 controls the selection of the different totalizers in reading and resetting operations.

In adding operations, when the plus wheel 166 (Fig. 20) of the balance totalizer passes through zero, a long tooth thereon engages and rocks a pawl 224 counter-clockwise to trip the transfer mechanism for the next higher denomination to cause 1 to be added therein. In subtract operations, when the minus wheel 167 passes through zero, the long tooth thereon likewise engages and rocks the pawl 224 counter-clockwise to trip the transfer mechanism for the next higher order to cause 1 to be borrowed from said order. The transfer mechanism, which is well known in the art and a portion of which is shown in Fig. 20, will not be described further, as reference may be had to the Shipley patents referred to at the beginning of this specification for a full description thereof.

When the total control lever 92 (Fig. 1) is moved either to No. 1 Read or to No. 1 Reset position, movement is imparted to the well-known No. 1 reset shaft (not shown), which in turn rocks a reset segment 225 (Fig. 21) clockwise on its pivot 226 to lengthen or straighten out companion toggle links 227 and 228, which are connected, respectively, to levers 229 and 230. The lever 230 is pivotally mounted on a stationary stud 231 and has pivotally mounted thereon a latch-breaking arm 232 with a bent-over ear 233 adapted to cooperate with teeth 234 on the reset spider 82 for the amount bank shown in Fig. 2. A spring 235 normally maintains the ear 233 in engagement with a stud 236 in the lever 230, and said spring also urges said lever 230 counter-clockwise to normally maintain an extension thereof in engagement with a stop collar 237. Inasmuch as the spring 235 restrains movement of the lever 230, lengthening or straightening the companion toggle links 227 and 228 rocks the lever 229 clockwise to move an arcuate surface 238 thereon into the path of the long tooth of the add and subtract totalizer wheels 166 or 167, depending upon which one of the two wheels is in lateral alinement therewith.

When the balance totalizer is in a positive condition—that is, not overdrawn—the plus wheel 166 is in lateral alinement with the arcuate surface 238, and when said balance totalizer is in an overdrawn condition, the minus wheel 167 is in lateral alinement with said arcuate surface 238. In other words, when the totalizer is in a positive condition, the plus wheels thereof are read or reset, and when said totalizer is in an overdrawn condition, the negative wheels thereof are read or reset. The reason for this lateral alinement of the negative wheels with the arcuate surface 238, when the balance totalizer is overdrawn, is that the negative wheels contain the true negative balance, while the plus wheels contain the complement thereof, and it is always desirable to record the true negative balance.

As previously explained, in reading or resetting operations, often referred to as sub-total or total recording operations, the selected positive or negative wheel of the balance totalizer is engaged with the actuator 63 at the beginning of the second cycle of movement thereof and is reversely rotated thereby until the long tooth thereon engages the arcuate surface 238 (Fig. 21) to rock the lever 229 counter-clockwise. This movement of the lever 229, due to the toggle links 227 and 228 having been previously expanded, rocks the lever 230 clockwise to move the bent-over ear 233 into the path of the tooth 234 corresponding to the amount on the selected balance totalizer wheel. This obstructs further movement of the spider 82 and breaks the latch of the corresponding amount differential mechanism in a position corresponding to the amount on the selected balance totalizer wheel. The differential mechanism in turn positions the printing mechanism for this particular denomination in accordance with the amount on the selected wheel, after which said amount is recorded.

*Fugitive one mechanism*

With balance totalizers of the type incorporated in the present machine, it is necessary to enter a fugitive 1 in the lowest order subtract wheel when the highest order plus wheel passes through zero while being rotated in a negative direction—that is, when an overdraft occurs—and, as the usual mechanism for entering this fugitive 1 has been altered slightly in the present embodiment, it will be described in detail.

When the highest order plus wheel 166 (Fig. 18) of the balance totalizer passes through zero while being rotated in a subtractive direction, a finger 241 secured to said wheel engages a recess in a disc 242 secured on a shaft 243, journaled in extensions of the brackets 175 for the lowest and highest orders of the balance totalizer, and rotates said disc and said shaft clockwise. Clockwise movement of the shaft 243 moves a cam 244 (Fig. 20), secured on the right-hand end thereof, in unison therewith, causing said cam to shift a tripping arm 245, pivoted on the extension of the bracket 175 for the lowest order, counter-clockwise against the action of a spring 246. Inasmuch as the balance totalizer frame 169 is in its downward position at this time, to engage the wheels of the balance totalizer with the actuators 63, a nose on the tripping arm 245 (Fig. 20) occupies the position shown in dot-and-dash lines in relation to a bent-over ear on a tripping lever 247 pivoted on a stationary stud 248, prior to counter-clockwise movement of the arm 245.

Counter-clockwise movement of the arm 245 rocks the lever 247 clockwise, causing a stud 249 carried thereby, in cooperation with a finger 250 secured on a short shaft 251 journaled in a bushing in the plate 66 for the lowest order denomination, to rock said finger and said shaft counter-clockwise. Counter-clockwise movement of the shaft 251 moves an arm 252, secured on the other end thereof, in unison therewith to disengage a flat surface on a stud 253, carried by said arm, from a shoulder in a slot of a transfer control arm 254 pivoted on the stud which supports the stop collar 237 for this particular denomination (Figs. 20 and 21). Withdrawal of the stud 253 from the shoulder in the slot in the arm 254 releases said arm to the action of the spring 235 for this denomination, which immediately rocks said arm clockwise to disengage an arcuate surface thereon from a square stud in a retaining lever 255 pivoted on a transfer segment 256 rotatably mounted on the actuator 63 for the lowest order denomination. This releases the segment 256 to the action of its spring 257 (see also Fig. 2), which immediately rocks said segment counter-clockwise, causing said segment to rotate the subtract wheel 167, for the lowest order, one step in an additive direction to add the fugitive 1 therein, to correct the reading of the negative side of the balance totalizer.

When the balance totalizer changes from a negative condition to a positive condition, or to zero, the finger 241 (Figs. 18 and 20) restores the disc 242, the shaft 243, and the cam 244 counter-clockwise to the position shown here, to again rock the tripping arm 245 counter-clockwise to trip the transfer mechanism of the lowest order denomination to rotate the plus wheel 166 for said denomination one step in an additive direction, which simultaneously rotates the associated minus wheel 167 in a subtractive direction, to subtract the fugitive 1 therefrom.

*Aliner mechanism for balance totalizer wheels*

When the balance totalizer is receiving engaging and disengaging movement, there is a time when the gears 178 (Fig. 17) are disengaged from the long pinions 180 and when the wheels of the balance totalizer are simultaneously disengaged from the amount actuators 63, and an aliner mechanism is provided for holding the balance totalizer wheels against displacement during this time.

Referring now to Figs. 7, 8, 34A, and 34B, a spring 258, tensioned between the arm 203 and a stud 259 in a crank 260 secured on the shaft 179, urges said stud 259 into engagement with the periphery of a camming extension 261 on said arm 203. Also secured on the shaft 179 (Fig. 17) is a series of alining pawls 262, one for each denominational order of the balance totalizer. The pawls 262 have thereon an alining tooth adapted to cooperate with the teeth of the gears 177.

Normally the aliners 262 are disengaged, as shown in Fig. 17; however, upon engaging movement of the balance totalizer, as explained above, counter-clockwise movement of the arm 203 (Figs. 7 and 8) causes the camming extension 261 thereon, in cooperation with the stud 259, to rock the crank 260, the shaft 179, and the aliners 262 first clockwise to engage the teeth of the aliners with the teeth of the gears 177, to prevent displacement of the balance totalizer wheels when the gears 178 are being disengaged from the long pinions 180 and the wheels of the balance totalizer are being engaged with the amount actuators 63.

After the wheels of the balance totalizer have been engaged with the amount actuators, continued counter-clockwise movement of the arm 203 causes the free end of the camming extension 261 to pass from beneath the stud 259 to permit the spring 258 to return the crank 260, the shaft 179, and the aliners 262 counter-clockwise, to disengage said aliners from the gears 177. It is evident that, during disengaging movement of the balance totalizer, the aliners 262 (Fig. 17) are again engaged with the teeth of the gears 177 to prevent displacement of said balance totalizer wheels while the gears 178 are being meshed with the long pinions 180.

*Zero stop mechanism for the balance totalizer*

As previously explained, the balance totalizer is zeroized in order to transfer the amounts thereon into the various storage devices, and, as said balance totalizer is disconnected from the main actuators 63 at this time, the regular zero stop mechanism is not effective; therefore it was necessary to provide an auxiliary mechanism to meet this condition.

Free on the shaft 179 (Fig. 17) is a zero stop pawl 263 for each denominational order of the balance totalizer, the tooth of which pawl is arranged to cooperate with a stop tooth on the corresponding zero stop disc 176, which, as previously explained, is secured to the corresponding plus wheel 166. There is a spring 264 for each of the pawls 263, and said springs urge said pawls counter-clockwise until extensions 265 thereof engage the top surface of the cross bar of the frame 169, to position the teeth of said pawls 263 in the paths of the teeth of the corresponding stop discs 176.

When the frame 169 is shifted downwardly, to engage the wheels of the balance totalizer with the main actuators 63, as explained earlier herein, hook-shaped portions of the extensions 265 engage a key lock shaft 266 supported by the main frames, and continued downward movement of said frame 169 causes said shaft to move the teeth of the pawls 263 out of the paths of the discs 176, to render said stop mechanism ineffective when the balance totalizer is engaged with the amount actuators. However, when the balance totalizer is connected to the storage mechanism, as shown in Fig. 17, the stop pawls 263 are in effective position and, when the wheels of the balance totalizer are reversely rotated, as will be explained later, stop said wheels in zero position to transfer the amount thereon to the selected storage device.

*Storage device selecting mechanism*

The balance totalizer described above is used for computing amounts to be stored in any of the 100 storage devices or storage sets, each set comprising nine denominational groups or orders of storage wheels. There are ten such sets of wheels 268 mounted upon each of ten rods 267 (Figs. 2, 34A, and 34B) supported in a circle about a central shaft 270, said rods and said shaft being supported by the plates 182 for the storage device mechanism. Fig. 2 illustrates the connection between the one order of balance totalizer mechanism here shown and a corresponding auxiliary actuator 269. The auxiliary actuator 269 is revolved and shifted laterally by the shaft 270, to which it is impositively connected by a friction clutch shown in Fig. 2 and to be described later, and said actuator meshes with the long pinion 180 for this particular order. Instead of the conventional method of shifting the storage device lines laterally in relation to the auxiliary actuators 269, said actuators are themselves shifted laterally, in relation to the sets of storage wheels 268, to select any one of the ten sets of said storage wheels mounted on the ten storage lines 267.

After the auxiliary actuators 269 have been alined with the selected set of storage wheels 268, the rod 267 containing the selected set of wheels 268 is shifted downwardly to engage said selected set of wheels with the auxiliary actuators. The lateral shifting of the shaft 270 and the actuators 269 is controlled by a row of control keys 271 (Fig. 1), and the engaging and disengaging movement of the rods 267 is controlled by a row of control keys 272. The keys 271 and 272 do not have the type of differential mechanism provided for the amount keys 58 and the transaction keys 86 and 89, but instead have the well-known ledger type of differential mechanism illustrated in Fig. 16 of the Shipley Patent No. 1,619,796, as will be explained more fully later. Inasmuch as the differential mechanisms for the two rows of keys 271 and 272 are substantially alike, it is believed that a description, in detail, of the differential mechanism for the keys 272, illustrated in Fig. 23, will be sufficient.

The keys 272 (Figs. 23 and 34B) are mounted in a key frame 275 supported by rods 276 and 277 in turn supported by the frames 50 and 51. Compressible springs (not shown) urge the keys 272 upwardly to normally maintain them in undepressed position. Depression of any one of the keys 272 causes a stud 278 therein, in cooperation with the angular nose of a corresponding retaining hook 279 on a detent 280, an arm of which is pivoted on a shaft 281 supported by the frames 50 and 51, to rock said detent clockwise against the action of a spring 282. When a flat surface on the top of the stud 278 moves beyond a shoulder on the hook 279, the spring 282 returns the detent counter-clockwise to latch said hook over the flat surface to retain the key in depressed position. The keys 271 and 272 are flexible keys; that is, depression of a key in either of the banks releases a previously depressed key in the same bank.

Clockwise movement of the well-known key lock shaft 266, upon release of the machine for operation, causes a stud 283 in an arm 284 secured on said shaft to move into engagement with a shoulder on the detent 280 to lock said detent in the position shown here, to lock the depressed key 272 against release and to prevent depression of any other of said keys during machine operation. When the key lock shaft 266 is in normal position, as shown in Fig. 23, an enlarged portion of a cam slot 285 is opposite the stud 283 to permit movement of the detent 280 when the keys 272 are depressed. When the shaft 266 is rocked counter-clockwise near the end of a machine operation, as is well known, the stud 283 moves into the cam slot 285 to rock the detent 280 clockwise to release the depressed key 272.

Depression of any one of the keys 272 (Fig. 23) moves the lower end of the stem thereof into the path of a by-pass pawl 286 pivoted on a differential latch 287 in turn pivoted on a differential arm 288 free on the shaft 281. A torsion spring 289 urges the pawl 286 counter-clockwise to normally maintain a bent-over extension thereof in contact with the edge of the latch 287. A spring 290, tensioned between the latch 287 and the arm 288, urges said latch 287 clockwise to normally maintain a projection 291 thereon in engagement with a shoulder on a differential operating segment 292 secured on the shaft 281. When the latch 287 is engaged with the shoulder on the segment 292, a raised surface on the arm 288 is maintained in engagement with a roller 293 carried by said segment, to effect an operative connection between said segment 292 and said arm 288. An arm 308 (Figs. 22 and 34B), secured on the shaft 281, is bifurcated to receive a stud 294 in a cam lever 295 secured on a shaft 296 journaled in the frames 50 and 51. The lever 295 carries rollers 297 and 298, which cooperate, respectively, with the peripheries of companion plate cams 299 and 300 secured in fixed relationship to each other on a shaft 301 journaled in the frames 50 and 51, said shaft 301 being in axial alinement with the main cam shaft 80.

*Auxiliary shaft driving means*

The auxiliary cam shaft 301 for the pin board mechanism is connected to the main cam shaft by clutch mechanism similar to that shown in Figs. 23 and 24 of the Shipley Patent No. 1,619,-796, which clutch mechanism is used in machines of the type embodying the present invention for disconnecting the main cam shaft from the printing mechanism during the first cycle of sub-total and total recording operations.

It will be recalled that one clockwise revolution of the main cam shaft 80 (Fig. 2) is required to effect adding and subtracting operations and that two such revolutions are required to effect sub-total and total recording operations. The clutch mechanism is effective to connect the main cam shaft 80 and the auxiliary cam shaft 301 (Fig. 37) for unitary movement in adding and subtracting operations, but, in sub-total and total recording operations, mechanism rendered effective by the zero throwout shaft 123 causes the clutch mechanism to be disengaged during the second cycle of such operations, so that the auxiliary cam shaft 301 will be driven only one clockwise revolution during the first cycle of such operations. It is necessary to disconnect the auxiliary cam shaft 301 from the main cam shaft 80 during the second cycle of sub-total and total recording operations, because the construction of the pin board differential mechanism will not permit said mechanism to perform two cycles of movement in such operations without an erroneous result being obtained, as will be explained later in connection with the operation of the pin board mechanism in reset automatic operations. The clutch mechanism will now be described in detail.

Secured on the right-hand end of the main cam shaft 80 (Fig. 34B) is a gear 776 having integral therewith a clutch disc 777 (Fig. 37) pivotally supporting a driving pawl 778 and a retaining pawl 779, the upper ends of which pawls are connected by a spring 780, which normally maintains the teeth of said pawls in resilient engagement with the periphery of a collar 781 secured on the left-hand end of the auxiliary cam shaft 301. Normally a segmental portion 782 (Fig. 37) of the collar 781 is disposed between the teeth of the pawls 778 and 779 to form a driving connection between the main shaft 80 and the auxiliary shaft 301. An extension 783 of the driving pawl 778 cooperates with the tooth of a controlling pawl 784 free on a stud 785 in the frame 52. A link 786 pivotally connects the pawl 784 to a crank 787 secured on the right-hand end of the zero throwout shaft 123 (Figs. 34B and 37).

In adding and subtracting operations, the tooth of the pawl 784 is retained out of the path of the extension 783 of the driving pawl 778, as shown in Fig. 37.

Movement of the total control lever 92 (Fig. 1) to any of its reading or resetting positions imparts a slight clockwise movement to the zero throwout shaft 123 and sets up a condition which causes said shaft 123 to receive maximum clockwise movement near the end of the first cycle of reading and resetting operations. Full clockwise movement of the shaft 123, through the crank 787 and the link 786, rocks the pawl 784 to the position indicated by dot-and-dash lines in Fig. 37, in which position the tooth of said pawl is in the path of the extension 783. The extension 783 is so located in relation to the tooth of the pawl 784 that, at the end of the first revolution, or first cycle of movement, of the main shaft 80, said extension engages said tooth to rock the driving pawl 778 counter-clockwise out of engagement with the shoulder of the segment 782 to disconnect the shaft 301 from the main drive shaft 80 during the second cycle of sub-total and total recording operations.

The mechanism for controlling the movement of the zero throwout shaft 123 is fully disclosed in the Shipley Patent No. 1,619,796 and the other Shipley patents listed at the beginning of this specification, and reference may be had to said patents for a complete disclosure of this mechanism.

The periphery of the disc 777 (Figs. 34B and 37) forms a camming surface which cooperates with a roller 788 pivotally mounted on a lever 789 free on a stud 790 in the frame 52. A comparatively strong spring 791 urges the lever 789 counter-clockwise to maintain the roller 788 in yielding engagement with the periphery of the cam surface on the disc 777. The spring tension applied to the lever 789 causes the roller 788, in cooperation with the camming surface formed by the periphery of the disc 777, to assist the main shaft 80 to home position and to retain said shaft and associated mechanisms in said home position. The mechanism described immediately above is commonly referred to as the homing mechanism, which is illustrated in Fig. 2 of the Shipley Patent No. 1,761,542.

*Storage device selecting differentials*

The extreme upward position of the differential mechanism for the keys 272, as shown in dot-and-dash lines in Fig. 23, is the home or zero position of said mechanism, and, as the differential mechanism approaches home position, the pawl 286 engages a stud 304 in a plate 305 secured to the key frame 275. Continued movement of the arm 288 causes the latch 287 to be rocked counter-clockwise against the action of the spring 290, to disengage the projection 291 from the shoulder on the segment 292 and to engage an angular alining tooth on the upper surface of said latch 287 with a corresponding one of a series of angular notches 306 in an arcuate surface on the plate 305. This breaks the latch mechanism and positions the differential arm 288 at zero, while the segment 292 is free to complete the extent of its initial movement and come to rest in its normal or home position, as shown in dot-and-dash lines.

As the segment 292 moves to normal position, an arcuate surface 307 thereof passes under the projection 291 to lock the tooth of the latch in the notch 306 to prevent displacement of the arm 288. The movement imparted by the cams 299 and 300 (Fig. 22) to the cam lever 295 and connected parts is shown graphically in space 16 of the time chart (Fig. 35).

Initial movement counter-clockwise of the differential operating segment 292, under influence of the cams 299 and 300, causes the shoulder on said segment to move beyond the projection 291, whereupon the spring 290 immediately rocks the latch 287 clockwise to engage said projection 291 with said shoulder. At about the same time, the roller 293 engages the raised surface of the arm 288 and carries said arm and connected parts counter-clockwise in unison therewith to the extreme downward position as shown in Fig. 23. During the counter-clockwise movement of the arm 288 and the latch 287, the pawl 286 by-passes any depressed key 272.

Return movement clockwise of the arm 288 and the latch 287 causes the pawl 286 to engage the stem of the depressed key 272 to rock the projection 291 of said latch out of engagement with the shoulder on the segment 292 and to simultaneously engage the alining tooth on said latch with the corresponding alining notch 306 to position said differential arm 288 in accordance with the depressed key 272. The operating segment 292 is free to complete its return movement clockwise independently of the arm 288 and in so doing moves the arcuate surface 307 beneath the projection 291 to secure the arm 288 in set position.

The differential positioning of the arm 288 is transferred to the printing mechanism and to the mechanism for selecting a storage device for engagement with the auxiliary actuators, through the medium of a beam 310 (Fig. 23) pivotally mounted on said arm and carrying a stud 311, to which is pivotally connected one end of a link 312, the other end of which link is pivotally connected to a gear sector 313 free on a shaft 314 supported by the frames 50 and 51. The gear sector 313 meshes with a helical gear 315 secured on one end of a printer drive shaft 316 journaled in a cross bar 317 and the frames 55 and 56, said shaft 316 having secured on the forward end thereof a gear 318, which meshes with a rack 319 in turn geared to a type wheel (not shown) for the keys 272. An arm 320 of the sector 313 is freely connected by a link 321 to a bell crank 322 free on a rod 323 supported by the frames 50 and 51. The bell crank 322 is freely connected by a link 324 to an alining segment 325 loose on a shaft 326, which extends the full length of the machine and is supported by the frames 50, 51, 52, and 53 (Figs. 34A and 34B). The segment 325 (Fig. 23) has in the periphery thereof a series of alining teeth which cooperate with an alining bar 327 extending between two similar arms secured to the shaft 296. The alining bar 327 is normally in engagement with the teeth in the segment 325; however, said aliner is actuated by cams which move the aliner in the same timing as aliner 425 is moved by cam 436 (Fig. 13 and space 5, Fig. 35) and is disengaged from the teeth in said segment while the differential mechanism is being positioned, and is reengaged after the differential mechanism has been positioned.

Secured on the shaft 301 (Figs. 23 and 34B) is a cam 328, the periphery of which cooperates with a roller 329 in a cam lever 330 secured on a shaft 331 journaled in the frames 50 and 51. The lever 330 carries a roller 332, which cooperates with an arcuate surface 333 on the beam 310. After the differential arm 288 and the beam 310 have been positioned under influence of the depressed key 272, as explained above, the cam 328, the timing of which is given in space 4 of the time chart, Fig. 35, causes the roller 332 to engage the surface 333 to force a curved surface on the upper edge of the beam 310 into engagement with a bushing 334 on the shaft 281 to position said beam, the sector 313, and the segment 325 in accordance with the depressed keys 272. The shaft 326, through mechanism to be described later, selects the storage line 267, corresponding to the depressed key 272, for engaging and disengaging movement.

As previously explained, there are two sets of pins (Figs. 23 and 26), an adding set and an overdraft set, to indicate which of the storage sets has an amount therein and whether or not the amount is positive or negative. The differential mechanism just described controls the selection of the ten horizontal rows of pins, said horizontal rows corresponding to the ten lines of storage sets, the ten pins in each horizontal row in turn corresponding to the ten sets of wheels on each storage line. The manner in which the indicating pins for the storage devices are selected will be described later herein in connection with the description of the pin board mechanism.

The keys 271 (Figs. 1 and 36), which control the selecting of the different sets of storage wheels on the various storage lines, control the positioning of a differential mechanism, similar in every respect to that just explained for the keys 272. The differential mechanism for the keys 271 controls the lateral shifting movement of the auxiliary actuators 269 and, in addition, controls the lateral shifting of the pin board carriage, which supports the add pins and the overdraft pins, to cause the pins corresponding to the selected set of storage wheels to be simultaneously selected.

The differential mechanism for the keys 271 is illustrated in Figs. 34A, 34B, and 36, and includes a latch pawl 337 pivotally mounted on a latch 338 in turn pivoted on a differential arm 339 free on the shaft 281. The latch 338 engages a shoulder on a differential operating segment 340 secured on the shaft 281 and arranged to be driven in unison with the operating segment 292 for the keys 272, which, as previously explained, is driven by the cams 299 and 300 (Fig. 22). A roller carried by the operating segment 340, similar in every respect to the roller 293 (Fig. 23) for the segment 292, and the latch 338 form a driving connection between said segment and the differential arm 339.

After the differential mechanism, including the arm 339 (Figs. 34B and 36), has been positioned under influence of the depressed key 271, clockwise movement of the shaft 331 under influence of the cam 328 and the cam lever 330 moves a cam lever 341, secured on said shaft, in unison therewith to cause a roller carried thereby to engage an arcuate surface on a beam 342 to force a curved surface on the upper edge of said beam into engagement with a bushing on the shaft 281 to position said beam in accordance with the depressed key 271.

The differential positioning of the beam 342 is transmitted to the printing mechanism and to the shaft which controls the lateral shifting of the auxiliary actuators by a link 343, which is pivotally connected between a stud 335 in said beam and a gear sector 344 free on the shaft 314, which sector positions the type wheel for the keys 271 in exactly the same manner as explained for the keys 272 (Fig. 23).

A link 345 (Figs. 34A, 34B, and 36) connects the gear sector 344 to a bell crank 346 free on the rod 323, and said bell crank is in turn connected by a link 347 to an aliner segment 348 connected by a sleeve 349, free on the shaft 326, to an arm 350. The arm 350 (Figs. 3, 14, 34A, and 34B) is connected by a link 351 to a gear segment 352 free on the shaft 270, and said segment 352 meshes with a gear 353 secured to one end of a sleeve 354, rotatably mounted on a shaft 355 supported by the frames 52 and 53. Secured to the other end of the sleeve 354 is a gear 356, which meshes with a gear 357 integral with a cylindrical sleeve 358 (see also Fig. 16) having secured in a small central boring therein a hub 359 free on a stud 360 secured in the frame 52. The stud 360 rotatably supports the gear 357 and the sleeve 358, and a head on said stud, in cooperation with the hub 359, holds said gear and said sleeve against lateral displacement. The large central boring in the sleeve 358 (Fig. 16) has mounted therein two diametrically opposed rollers 361 and 362, which cooperate, respectively, with identical helical camming grooves 363 and 364 in a drum cam 365 having a central boring which fits freely on the outer circumference of the hub 359. The cam 365 is secured to a guide plate 366 carrying guide studs 367 and 368, which slide in holes in a bracket 369 (Figs. 3, 34A, and 34B) secured to the frame 52.

The cam 365 (Fig. 16) is adapted to shift the auxiliary actuator shaft 270 laterally to aline the auxiliary actuators 269 with the denominational set of storage wheels corresponding to the depressed key 271, and said cam is connected to said shaft by a trunnion stud 370, which fits freely in a reduced portion of the boring of said cam 365 and is secured in a hole in the right-hand end of the shaft 270. The trunnion stud 370 forms a bearing for the right-hand end of the shaft 270 and connects said shaft to the cam 365 for lateral positioning thereby. Thus the shaft 270 is free to be rotated in a manner presently to be described, after having been positioned laterally by the cam 365.

From the foregoing description it will be seen that the differential mechanism shown in Figs. 34A, 34B, and 36, under control of the keys 271, transmits the positioning of said mechanism to the drum cam 365 (Fig. 16) to cause said cam to shift the shaft 270 and the auxiliary actuators 269 laterally to select the denominational set of storage wheels 268 corresponding to the depressed key 271. After the auxiliary actuators have thus been positioned, the storage device line 267 corresponding to the depressed key 272 is shifted radially to engage the selected set of wheels on said line with the auxiliary actuators 269, as will be described presently. The timing of the differential mechanism for the keys 271, explained above, is exactly like the timing for the differential mechanism for the keys 272 as given in space 16 of the chart, Fig. 35. The movement of the beam lever 341 for the keys 271 (Figs. 34B and 36) is controlled by the cam 328 (Fig. 23), the movement of which is given in space 4 of the chart, Fig. 35.

It will be noted by referring to Fig. 23 that the differential mechanisms for the keys 271 and 272 remain in set positions at the end of machine operation and are moved directly from their old positions to their new positions in the succeeding operation.

*Selecting and engaging mechanisms for the storage device lines*

It will be recalled by referring to Fig. 23 that the keys 272, by means of the differential mechanism shown here, control the positioning of the shaft 326, and said shaft in turn controls the selection of the storage device line corresponding to the depressed key 272, for engaging and disengaging movement, as will now be explained.

Secured on the shaft 326 (Figs. 4, 5, 6, and 34A) is an arm 373 connected by a link 374 to a gear segment 375 free on the shaft 270. The gear segment 375 meshes with a gear 376 integral with a companion gear 377, both of said gears being secured on the shaft 355. The gear 377 meshes with a gear 378 secured to a storage line selecting disc 379 through the medium of a plurality of studs 380, and the disc 379 is in turn secured to a sleeve 381 free on the shaft 270. Secured in fixed relation to the gear 378 and the disc 379, by a sleeve 371, similar to the sleeve 381 and connected thereto by tenons and clutch cuts, is an alining disc 382 (Figs. 6 and 17) connected by a hub 383 to an arm 384 (Figs. 5 and 6) in turn secured by studs 385 to a similar arm 386 connected by a hub 387 to an alining disc 388. From the foregoing it will be understood that the gear 378, the disc 379, the disc 382, the arms 384 and 386, and the disc 388 are connected in fixed relationship to each other and move in unison, under influence of the differential mechanism for the keys 272, to select the different storage device lines.

The arms 384 and 386 (Figs. 5, 6, and 34A), respectively, have pivoted thereon levers 390 and 391 carrying studs 392 and 393, which cooperate, respectively, with camming slots 394 and 395 in a storage line engaging disc 396 secured to a sleeve 397 connected by tenons and clutch cuts to a similar sleeve 372 having secured thereto a storage line engaging disc 398 (Fig. 13). The hub 387 bears on the sleeves 397 and 372, and the sleeves 397 and 372 bear on the sleeves 381 and 371, which in turn bear on the shaft 270. A yieldable non-positive operating connection is formed between the discs 398 and 379 by a torsion spring 399 (Figs. 6 and 13), opposite ends of which are connected, respectively, to said discs, said spring freely encircling a collar 400, which side-spaces said discs 379 and 398. From the foregoing it will be understood that the disc 398 and the engaging disc 396 have a non-positive operating connection with the disc 379 and rotate in unison with said disc, under influence of the keys 272, to select the proper line of storage devices. However, the spring 399 permits the discs 398 and 396 to be moved relatively to said disc 379, after the proper storage line has been selected, to impart engaging and disengaging movement to said selected storage device line.

The levers 390 and 391 (Figs. 5, 6, 17, and 34A) carry, respectively, studs 403 and 404, each having therein a slot which cooperates with studs 405 and 406 in arms 407 and 408, respectively. There is an arm 497 and an arm 408 for each of the ten lines of storage wheels. The arm 407 is mounted for radial sliding movement upon the plate 182, and the arm 408 is mounted for radial sliding movement upon a plate 409 similar to the plate 182, which it assists in supporting the storage device mechanism. Extensions of the studs 405 and 406 in the arms 407 and 408 pass through guide slots in the plates 182 and 409, while each of said arms 407 has secured thereto the right-hand end of the corresponding storage device shaft 267. The shafts 267 pass through corresponding guide slots in the plate 182, which slots are in radial alinement with the corresponding slots for the studs 405.

Figure 4:
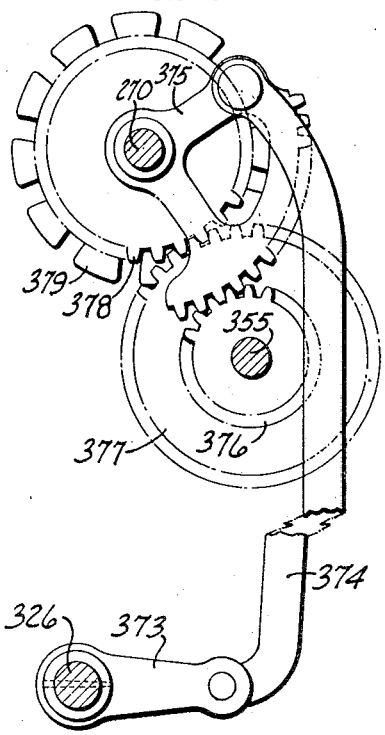
Fig. 4 is a detail view of a part of the mechanism for selecting the different lines of storage devices.
Figure 5:
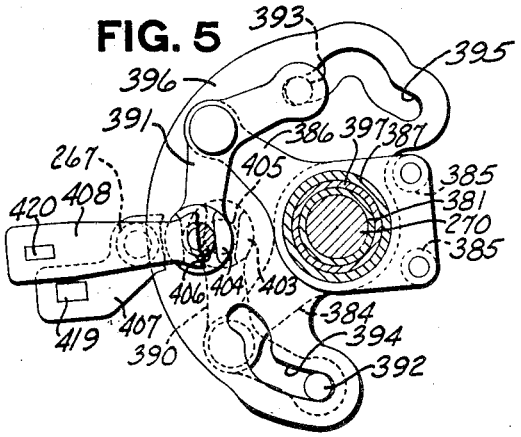
Fig. 5 is a detail view of the cam plates and the parts associated therewith for engaging the wheels of the selected storage device with the auxiliary actuators.
Figure 6:
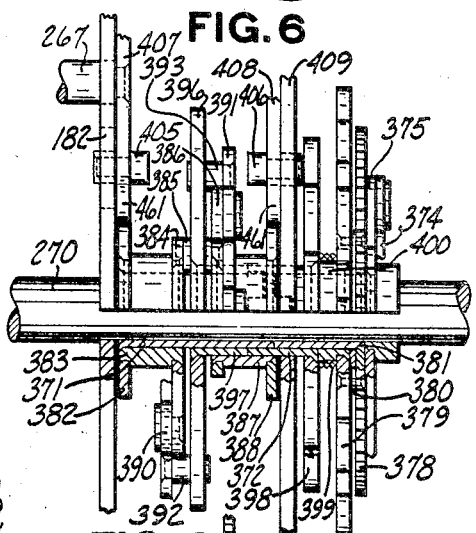
Fig. 6 is a side-spacing view of the mechanism shown in Figs. 4 and 5.

There is a storage device selecting and engaging group exactly like that shown in Figs. 5, 6, and 17 on the left-hand end of the shaft 270 (Fig. 34A), and this unit includes a selecting disc 410 and an engaging disc 411, similar to the corresponding right-hand discs 379 and 398, respectively. The differential positioning of the shaft 355 (Figs. 4 and 34A), under influence of the keys 272, is transmitted to the discs 410 and 411 by a gear 412 secured on the left-hand end of said shaft 355, which gear meshes with a gear 413 secured to the disc 410. A recessed portion 414 of the left frame 53 provides clearance for the gears 412 and 413. A spring 415, similar in every respect to the spring 399, forms a non-positive connection between the discs 410 and 411. The disc 410 is connected to levers 416 and 417, similar in every respect to and functioning exactly like the corresponding right-hand levers 390 and 391 (Figs. 5 and 6), to control the engaging and disengaging of the storage devices with and from the auxiliary actuators 269. The disc 411 is connected to a cam plate 418, similar in every respect to and functioning exactly like the right-hand cam disc 396, to control the engaging and disengaging movement of the levers 416 and 417. The levers 416 and 417 (Fig. 34A) cooperate, respectively, with the corresponding left-hand arms 407 and 408, said arms being mounted for radial shifting movement on the left-hand plates 182 and 409. The left-hand arms 407 are secured to the left-hand ends of the corresponding storage wheel shafts 267 and, together with their right-hand companion arms 407, support said shafts for radial shifting movement.

Zero stop and aliner mechanisms

Each of the storage device wheels 268 has thereon a long tooth, which is always in the path of a zero stop bar 419 (Figs. 17 and 34A) supported between the right-hand and left-hand companion arms 407. The stop bars 419 and the corresponding storage device shafts 267 are supported by the corresponding pair of arms 407 and therefore must always remain in fixed relationship to each other. This fixed stop is possible because, as previously stated, the wheels 268 of the storage devices never pass through zero but, near the middle of each machine operation, are reversely rotated until the long teeth thereon come into contact with the stop bar 419 to stop said wheels in zero position after the amounts thereon have been transferred to the wheels of the balance totalizer.

Extending between the right- and left-hand pairs of arms 408 is an alining bar 420 for each storage line. The aliners 420 extend through guide slots in the plates 182 and 409, which slots are in alinement with the slots for the studs 406, to guide said arms 408 when they are shifted radially, as will be explained presently. It is to be understood that there is an aliner 420 for each line of storage wheels, and this aliner is in engagement with the teeth of the storage wheels when they are in disengaged position. During engaging movement of the selected storage wheel line, the aliner 420 therefor moves in unison therewith to retain the storage wheels in alinement until the selected set of wheels is engaged with the auxiliary actuators 269. After the selected set of wheels has been engaged with the auxiliary actuators, the aliner 420 is returned outwardly to normal position to free the wheels of the selected storage line for rotation by the auxiliary actuators 269.

The other sets of wheels on the selected storage line are retained against displacement, while said storage line is in engaged position, by a series of aliners 421 (Figs. 2 and 34A), there being one such aliner for each denominational group of storage wheels on each line. The aliners 421 of adjacent orders are spaced apart sufficiently to form a clearance opening for the auxiliary actuators 269, and said aliners are arranged to engage the teeth of all but the selected set of wheels on the selected line. The aliners 421 for each order are secured in radial slots in a plate 422 free on the auxiliary actuator shaft 270 and arranged to shift laterally in unison therewith, said aliners being held against rotary movement by extensions thereof having bushings which loosely engage a rod 423 supported by the plates 182.

As previously explained, there is an auxiliary actuator 269 for each of the nine denominational groups of storage device wheels, there being ten wheels in each group, or, in other words, ten sets of wheels on each line, said actuators adapted to shift laterally in unison with the shaft 270 to select the set of wheels 268 (Fig. 34A) corresponding to the depressed key 271. Simultaneously with the lateral shifting of the auxiliary actuators 269, the differential mechanism under control of the keys 272 functions to position the storage line selecting discs 379 and 410 (Figs. 5, 6, and 34A) to cause the slots in the studs 403 and 404, carried by the levers 390, 391, 416, and 417, to be moved into engagement with the studs 405 and 406 carried by the arms 407 and 408 for the storage device line corresponding to the depressed key 272. After this, an aliner mechanism, shown in Fig. 13, alines the discs 379 and 410 in set position and simultaneously imparts relative movement to the discs 398 and 411 to cause engaging movement to be imparted to the selected storage wheel line.

The disc 379 (Figs. 13, 34A, and 34B) has ten alining notches 424 corresponding to each of the ten lines of storage devices, said notches adapted to be engaged by an alining stud 425 in an arm 426 secured on a shaft 427 journaled in the frames 52 and 53. The disc 398 has ten camming slots 428 corresponding to each of the ten lines of storage devices, which notches cooperate with a camming stud 429 carried by the arm 426. A crank 430, secured on the shaft 427, is connected by a link 431 to a cam lever 432 free on a rod 433 supported by the frames 52 and 53. The lever 432 carries a roller 434, which cooperates with a camming groove 435 in a cam 436 secured on a cam line 437 journaled in the frames 52 and 53.

The disc 410 (Fig. 34A), which is a companion disc to the disc 379, has ten alining notches therein exactly like the notches 424 in said disc 379, and the disc 411 has therein ten camming slots exactly like the slots 428 in its companion disc 398, said slots in the discs 410 and 411 cooperating with their corresponding alining and camming studs in an arm 438 (Fig. 13) secured on the shaft 427, said arm 438 being similar in every respect to the arm 426.

The cam shaft 437 (Figs. 3 and 34A) has secured on the left-hand end thereof a gear 439, which meshes with an idler gear 440 free on a stud 441 in the frame 53, said idler gear in turn meshing with a gear 442 secured on the left-hand end of the main cam shaft 80. The gears 439 and 442 are exactly the same; consequently, when the main cam shaft 80 is rotated in the manner explained earlier herein, the cam shaft 437 is rotated in exactly the same direction and to the same extent as said main cam shaft.

As previously explained, the selected set of storage wheels 268 (Fig. 34A) remains in engagement with the auxiliary actuators 269 at the end of an operation, and at the beginning of the succeeding operation the wheels of the balance totalizer are reversely rotated to zero to enter the amount thereon in the set of storage wheels selected in the previous operation.

Immediately after the amount has been entered into the preselected set of storage wheels, the cam 436 (Fig. 13) functions, as illustrated graphically in space 5 of the chart, Fig. 35, to rock the lever 432 clockwise, which movement, through the link 431, rocks the shaft 427 and the arms 426 and 438 counter-clockwise. Counter-clockwise movement of the arms 426 and 438 causes the studs 429, in cooperation with the camming slots 428 in the discs 398 and 411 (Figs. 5, 6, 34A, and 34B) to rock said discs counter-clockwise, as viewed in Fig. 13, and counter-clockwise movement of the discs 398 and 411 causes their companion cam plates 396 and 418 to move in unison therewith, which movement causes the cam slots 394, in cooperation with the studs 392, to restore the levers 390 and 416 counter-clockwise to shift the arms 407 and the shaft 267, for the selected set of storage wheels, outwardly to disengage said wheels from the auxiliary actuators 269. Simultaneously the slots 395, in cooperation with the studs 393, impart movement to the levers 391 and 417 and the arms 408, to cause the aliner 420 to be engaged with the teeth of the storage wheels on the selected line, while said wheels are being moved to disengaged position.

After the preselected storage line has thus been moved to disengaged position, the alining studs 425 (Fig. 13) move out of the notches 424 in the discs 379 and 410, and the studs 429 move out of the path of the discs 398 and 411 to free said discs for rotary selecting movement.

After the preselected storage line has been disengaged, the mechanism under control of the keys 272 (Figs. 1, 4, 5, 6, and 23) functions to rotate the discs 379 and 410 in accordance with the depressed key 272 to move the slots in the studs 403 and 404 (Fig. 5) carried by the levers 390, 416, 391, and 417 into engagement with the studs 405 and 406 of the storage line corresponding to the depressed key 272. Simultaneously with the selecting of the storage line, the mechanism shown in Figs. 16, 34A, and 34B and under control of the keys 271 (Fig. 1) shifts the shaft 270 and the auxiliary actuators 269 laterally to position said actuators in accordance with said depressed key 271 to select the set of wheels on the selected storage line corresponding to said depressed key 271.

The rotary movement of the discs 379 and 410 (Figs. 13 and 34A) to select the various storage lines for engaging and disengaging movement is illustrated graphically in space 2 of the chart, Fig. 35, and the lateral shifting movement of the shaft 270 and the auxiliary actuators 269 to select the different sets of storage wheels on the selected line is shown graphically in space 3 of the chart, Fig. 35.

After the discs 379 and 410 (Figs. 5, 6, 13, and 34A) have been positioned, as explained above, to select the storage line corresponding to the depressed key 272, the cam 436 returns the shaft 427 and the arms 426 and 438 clockwise to cause the studs 425 to engage the notches 424 corresponding to the selected storage line 267. Return movement of the arms 426 and 438 also causes the studs 429 to engage the camming slots 428 corresponding to the selected storage line to impart clockwise movement to the discs 398 and 411 while the discs 379 and 410 are held stationary to cause the cam slots 394 and 395 in the cam plates 396 and 418 to impart engaging movement to the selected line 267 to engage the selected set of wheels thereon with the auxiliary actuators 269.

After the selected set of wheels has been engaged with the auxiliary actuators 269, counter-clockwise movement is imparted to said auxiliary actuators, by mechanism to be described presently, to turn the selected set of storage wheels to zero and to transfer the amount thereon to the wheels of the balance totalizer.

*Rotary drive mechanism for auxiliary actuators*

The mechanism shown in Figs. 11, 34A, and 34B imparts oscillating movement to the shaft 270 and the auxiliary actuators 269 to transfer amounts from the balance totalizer to the storage wheels and vice versa.

Secured on the shaft 270 is a segment 445 having in the periphery thereof three equally spaced notches 446, which cooperate with corresponding studs 447 in an arm 448 free on a stud 449 secured in the frame 52. A link 450 pivotally connects the arm 448 to a cam lever 451 free on the rod 433, said cam lever carrying a roller 452, which cooperates with a camming groove 453 in a cam 454 secured on the shaft 437. The above mechanism oscillates the shaft 270 first clockwise and back to normal position according to the timing of the cam groove 453, which is given in space 6 of the time chart, Fig. 35.

As explained previously, the wheels of the selected storage device remain in engagement with the auxiliary actuators at the end of machine operation, and, likewise, the wheels of the balance totalizer remain connected to the auxiliary actuators through the gears 178 (Fig. 17) and the long pinions 180.

Obviously, it is necessary for the shaft 270, during its oscillating movement, to rotate the auxiliary actuators 269, mounted thereon, varying extents, depending in one case upon how much movement is required to return the various wheels of the balance totalizer to zero position and in the other case upon how much movement is required to return the various wheels of the selected storage device to zero position. This is effected by the provision of a yielding or slippage connection between each of the auxiliary actuators 269 and the shaft 270, so that, as the wheels of the balance totalizer, or the wheels of the selected storage device, are returned to zero position, the actuators 269 may stop while the shaft 270 is free to continue its full excursion of movement.

This yielding connection comprises companion clutch arms 455 and 456 (Figs. 2, 34A, and 34B) mounted on a common pivot 457 carried by each of the auxiliary actuators 269. A spring 458, tensioned between opposing hooks on each of the clutch arms 455 and 456, urges said clutch arms toward each other, in pincer fashion, to cause inside curved surfaces thereon to yieldingly embrace the periphery of a hub 459 secured on the shaft 270. It is obvious that this forms a non-positive driving connection between the shaft 270 and each of the auxiliary actuators 269 for turning the wheels of the balance totalizer and the wheels of the various storage devices to zero position to transfer amounts from said balance totalizer to said storage wheels and vice versa.

It will be recalled that the main cam shaft 80 and the auxiliary cam shaft 437 (Figs. 3 and 11) make one clockwise revolution in adding and subtracting operations and two such revolutions in sub-total and total recording operations. Initial movement clockwise of the cam 454, at the beginning of a machine operation, rocks the cam lever 451 clockwise to impart counter-clockwise movement to the arm 448, which arm in turn rocks the segment 445 and the shaft 270 clockwise. Clockwise movement of the shaft 270, through the clutch mechanism shown in Fig. 2, rotates the auxiliary actuators 269 in unison therewith, which movement, through the gearing shown in Fig. 17, rotates the corresponding wheels 166 of the balance totalizer counter-clockwise or in a subtractive direction until the zero stop disc 176 contacts the tooth of the corresponding pawl 263 to stop the wheels of the balance totalizer in zero position and to transfer the amount thereon to the wheels of the preselected storage device, as explained previously. When the wheels of the balance totalizer arrive at zero position, the non-positive connection between the auxiliary actuators and the shaft 270 permits said actuators to remain stationary while said shaft completes its clockwise movement without interruption.

After the amount standing on the balance totalizer has been transferred to the set of storage wheels selected in the previous operation, said storage wheels are disengaged from the auxiliary actuators, and the mechanisms under control of the selecting keys 271 and 272 (Fig. 1) cause the set of storage wheels corresponding to the depressed keys 271 and 272 to be engaged with the auxiliary actuators 269 in the manner explained earlier herein. During the disengaging movement of the storage wheels selected in the previous operation, and during the engaging movement of the storage wheels selected in the present operation, the contour of the cam groove 435 (Fig. 11 and space 6, Fig. 35) causes the arm 448 to dwell in its counter-clockwise position. After the set of storage wheels selected in the present operation has been engaged with the auxiliary actuators, continued rotation of the cam 454 returns the arm 448 clockwise to return the segment 445, the shaft 270, and the auxiliary actuators in a counter-clockwise direction. Counter-clockwise movement of the auxiliary actuators 269 (Figs. 17, 34A, and 34B) rotates the wheels of the selected storage device to zero position, which position is determined by the long teeth on said wheels coming into contact with the stop bar 419 to transfer the amount on said wheels to the wheels of the balance totalizer, which, up to the present time, have remained in engagement with the long pinions 180. Immediately after the amount on the selected set of storage wheels has been transferred to the balance totalizer, the balance totalizer framework 169 (Fig. 17 and space 1, Fig. 35) is shifted downwardly to engage the balance totalizer with the main actuators 63, whereupon functioning of said actuators causes the amount set up on the amount keys 58 to be added to or subtracted from (as the case may be) the amount on the balance totalizer. After the balance totalizer has been actuated, the mechanism shown in Fig. 7 and explained earlier herein shifts the framework 169 (Fig. 17) upwardly to disengage the wheels of the balance totalizer from the main actuators and to reengage the gears 178 with the long pinions 180.

Directing attention to Figs. 6, 17, 34A, and 34B, the discs 382 and 388, which are in fixed relationship to the discs 379 and 410 and move in unison therewith, have therein notches 460 adapted to be engaged by rounded tips 461 and 462 of the arms 407 and 408 of the selected storage device line, when engaging movement is imparted to said selected line, as shown in Fig. 17. The peripheries of the discs 382 and 388, in cooperation with the rounded tips on the arms 407 and 408, insure that all but the selected one of the storage device lines are retained in disengaged position.

*Aliner mechanism for long pinions*

An aliner mechanism is provided for holding the long pinions 180 and the auxiliary actuators 269 against displacement at all times except when rotary movement is being imparted to said auxiliary actuators by the mechanism shown in Fig. 11. The aliner mechanism includes an alining bar 463 (Figs. 3, 12, 17, 34A, and 34B), which cooperates with the teeth of the long pinions 180, said alining bar having on opposite ends thereof arms 464 and 465, which are pivotally connected, respectively, to a downwardly extending arm of a bell crank 466 and to a crank 467, both of which are secured on a shaft 468 journaled in the frames 52 and 53. A rearwardly-extending arm of the bell crank 466 is pivotally connected by a link 469 to a cam lever 470 free on the rod 433. The cam lever 470 carries a roller 471, which cooperates with a cam groove 472 in a cam 473 secured on the auxiliary cam shaft 437.

The timing of the cam groove 472 is shown in space 7 of the chart, Fig. 35, and, from a comparison of this cam groove with the cam groove 453 (Fig. 11) and space 6 of the chart, Fig. 35, it will be seen that, at the beginning of machine operation, the cam 473 rocks the lever 470 and the shaft 468 clockwise to disengage the aliner 463 from the teeth of the long pinions 180. The aliner 463 remains thus disengaged while the cam 454 (Fig. 11) is imparting initial movement to the auxiliary actuators 269, after which the cam 473 causes the aliner 463 to be engaged with the teeth of the long pinions 180 to hold said long pinions and the auxiliary actuators 269 against displacement while disengaging and engaging movements are being imparted, respectively, to the storage device line selected in the previous operation and to the storage device line selected in the present operation, as previously explained.

After the auxiliary actuators 269 have been positioned laterally, and after engaging movement has been imparted to the selected storage device line to engage the selected set of wheels thereon with said auxiliary actuators, the cam 473 again rocks the aliner 463 out of engagement with the teeth of the long pinions 180. The aliner 463 remains thus disengaged until the second or counter-clockwise movement has been imparted to the auxiliary actuators 269 to transfer the amount on the selected storage device wheels to the balance totalizer, after which the cam 473 again engages the aliner 463 with the long pinions 180.

By referring to Fig. 17, it will be noted that the aliner 463 is slidably supported by horizontal guide slots 474 in the end plates 182, which insures that said aliner retains the long pinions 180 and the auxiliary actuators 269 in proper alinement. It will likewise be noted that the aliners 420 (Fig. 17) and their corresponding stop bars 419 for the wheels of the storage devices are retained in their respective slots in the plates 182 by retaining segments 477, 478, and 479, secured to said plates 182.

*Total and sub-total recording operations*

The engaging and disengaging movement of the balance totalizer in total recording or reset operations is illustrated graphically in space 20 of the chart, Fig. 35, and one rotary or oscillating movement of the auxiliary actuators 269 is shown graphically in space 6 of said chart. By consulting the chart, it will be seen that, during the first cycle of a total recording operation, the amount remaining on the balance totalizer from the previous operation is entered in the set of storage wheels selected during said previous operation, after which said storage wheels are disengaged from the auxiliary actuators, and the set of storage wheels from which it is desired to take a total is engaged with said actuators, and the amount thereon is transferred to the previously zeroized balance totalizer. Near the end of the first cycle of a total recording operation, the wheels of the balance totalizer are disconnected from the auxiliary actuators and engaged with the main actuators 63.

In the first part of the second cycle of a total recording operation, the positive wheels of the balance totalizer are reversely rotated to zero position, and the main actuators are positioned in accordance therewith in the usual manner. After the amount has been recorded, the wheels of the balance totalizer are disconnected from the main actuators and are again connected to the auxiliary actuators, and, as this disconnecting and connection occurs prior to return movement of the main actuators, the wheels of the balance totalizer remain in a zeroized condition. Inasmuch as the wheels of the balance totalizer are standing at zero, nothing will be entered in the selected set of storage wheels during the first part of the succeeding operation; consequently said storage wheels will remain in a zeroized condition.

The engaging and disengaging movement of the balance totalizer in sub-total recording or reading operations is depicted graphically in space 21 of the chart, Fig. 35, and by consulting said chart it will be observed that in sub-total recording operations the balance totalizer is disconnected from the auxiliary actuators and engaged with the main actuators earlier during the first cycle than in total recording operations. This earlier movement of the balance totalizer in reading operations is due chiefly to the structure of the engaging mechanism and has no important bearing upon the functioning of the balance totalizer mechanism.

Likewise, by referring to space 21 of the chart, Fig. 35, it will be seen that the wheels of the balance totalizer remain in engagement with the main actuators during the return movement of said actuators and are consequently restored to their original positions. Near the end of the second cycle of said sub-total recording operation, the balance totalizer wheels are disengaged from the main actuators and are reconnected to the auxiliary actuators, and, inasmuch as the amount has been reentered in the wheels of the balance totalizer, this amount will likewise be reentered in the selected set of storage wheels during the first part of the next succeeding operation, regardless of whether said operation is an add, subtract, sub-total recording, or total recording operation.

Further description of the balance totalizer is believed unnecessary, as this mechanism is thoroughly explained in the patents referred to at the beginning of this specification.

PIN BOARD MECHANISM

The present machine is provided with a shiftable pin board carriage which supports two complete sets of displaceable indicating pins, a regular or add set of pins and an overdraft set of pins, each of said sets having therein a pin for each of the storage devices or sets of storage wheels. The two sets of pins are arranged in ten horizontal rows, each row comprising ten pins, thus making a total of 100 add pins and a total of 100 overdraft pins, or one pin in each set for each of the 100 storage sets. The vertical, or up-and-down, arrangement of the pins in each of the sets corresponds to the ten lines of storage wheels, and the horizontal arrangement of said two sets of pins corresponds to the ten sets of storage wheels on each storage line. The vertical, or up-and-down, selection of the add pins and of the overdraft pins is controlled by the keys 272 (Figs. 1 and 23) and their associated differential mechanism, and the horizontal selection of said pins is controlled by the keys 271 (Fig. 36) and their associated differential mechanism. A selecting mechanism for controlling the vertical selection of the pins is provided for each set of pins, and this mechanism is positioned, with relation to said pins, by the differential mechanism under control of the keys 272. The keys 271 control the lateral shifting of the pin board carriage, which supports the two sets of pins, to position the pins in each set, corresponding to the depressed key 271, in cooperative relationship with the vertical selecting mechanism.

When any of the sets of storage wheels is selected for the entering of either positive or negative amounts, the corresponding pin in the regular or add set of pins is displaced, thus indicating that the corresponding storage set has been active. Whenever an overdraft occurs in the balance totalizer, the regular or add pin corresponding to the selected storage set is displaced as before, and, in addition, the corresponding pin in the overdraft set is simultaneously displaced, thus indicating that the storage device has been active and contains a negative amount. The two sets of pins are always visible through a closure with a transparent opening therein, and said pins are numbered in accordance with the storage sets which they represent, so that said sets may be readily identified, thus providing means for telling exactly how many of the storage sets have been active and which of said active sets have been overdrawn.

A manipulative control lever is provided for controlling the functioning of the pin board, said lever having four positions; namely, "Add," "Neutral," "Reset One at a Time," and "Reset Automatic." When the control lever is in Add position, the pin board mechanism functions, as explained above, to displace pins corresponding to the depressed keys 271 and 272. When the control lever is in Neutral position, the pin board mechanism does not function; when said lever is in Reset One at a Time position, the pins are reset one at a time upon being selected by the keys 271 and 272; and when the control lever is in Reset Automatic position, all the displaced pins in the regular and overdraft sets are reset or restored to normal position automatically, without the necessity of depressing the keys 271 and 272 for the selection thereof.

Shiftable carriage for pin board

The two sets of pins are mounted in a shiftable carriage comprising a main plate 480 (Figs. 23, 24, 26, and 34B), said plate having mounted thereon two similar rollers 481 adapted to engage a guide groove in a rail 482 supported by the frames 50 and 51. Also mounted on the main plate 480 are two similar rollers 483, which cooperate with a guide rail 484 supported by the frames 50 and 51. The rollers 481 and 483, in cooperation with their corresponding rails 482 and 484, support the pin board carriage plate 480 for horizontal shifting movement. An extension 485 of the carriage plate 480 (Figs. 24 and 34B) has two similar upturned ears with alined borings therein, which slidably engage a rod 486 extending between the frames 50 and 51, said rod serving to retain the rollers 481 and 483 in engagement with their respective guide rails 482 and 484.

Mounted on the extension 485 is a roller 487, which engages a cam groove 488 in a shifting cam 489 (Figs. 24, 34B, and 36) free on a sleeve 475 in turn free on a shaft 490 journaled in the frames 50 and 51. Secured on the shaft 490 (Figs. 23 and 34B) is a crank 491 connected by a link 492 to a cam lever 493 free on the shaft 331. The lever 493 carries rollers 494 and 495, which cooperate, respectively, with the peripheries of companion plate cams 496 and 497 secured on the pin board cam shaft 301.

The cam lever 493 (Figs. 23 and 36) has in an extension thereof a substantially vertical slot 749, through which extends a stud 750 in the upper end of a link 751. The lower end of the link 751 is connected to mechanism which is controlled by the pin board control lever 590 (Fig. 1) in reset automatic positions, for disconnecting the pin board shifting cam 489 from the differential mechanism for the keys 271, as will be explained later.

The stud 750 (Fig. 36) extends into a triangular slot 752 in an upward extension of an arm 753 free on the shaft 331. The arm 753 is pivotally connected by a link 754 to a crank 755 secured to the left-hand end of the sleeve 475 (Fig. 34B). Secured on the right-hand end of the sleeve 475 (Figs. 34B and 36) is a crank 498 carrying a stud 499, which cooperates with an extension 500 of the shifting cam 489. A spacing collar, interposed between the cranks 491 and 755, and the other parts assembled on the shaft 490 between the crank 498 and the right frame 50 (Fig. 34B), hold the sleeve 475 and said cranks 755 and 498 against lateral displacement. The cam 489 is retained against lateral displacement on the sleeve 475, between the cranks 498 and 755, by a spacing collar inserted between said crank 755 and said cam 489. In all operations except reset automatic operations, the stud 750 (Figs. 23 and 36) remains in its upward position, as shown here, to connect the cam lever 493 and the arm 753 for unitary movement under influence of the cams 496 and 497. Spring 501 urges the shifting cam 489 clockwise to normally maintain the extension 500 in yielding engagement with the stud 499.

Secured to the shifting cam 489 (Figs. 23, 33, 34B, and 36) is a segment 502 having alining teeth which cooperate with an alining pawl 503 secured on a shaft 504 journaled in the frames 50 and 51. An extension 505 of the segment 502 is pivotally connected to a differential control link 506 carrying a stud 507, which engages an arcuate guide slot in a plate 508. An extension of the plate 508 is bifurcated to embrace a stud 509 secured in the frame 51, said extension fitting in an annular groove formed by two similar collars secured on said stud to hold said plate 508 against lateral displacement. The plate 508 carries a stud 510, to which is pivoted one end of a guide plate shifting arm 511 secured on a shaft 512 journaled in the frames 50 and 51. An extension 513 of the link 506 has a shoulder 514, which cooperates with a stud 515 in an arm 516 free on the shaft 281. The arm 516 is bifurcated to receive an extension of the stud 335 carried by the beam 342, which is pivoted on the differential arm 339 for the keys 271, as explained in detail earlier herein.

In all types of operations involving the storage devices, except Reset Automatic operations, the link 506 (Fig. 36) is in the position shown here, in which the shoulder 514 is in operative alinement with the stud 515. In Reset Automatic operations, the keys 271 and 272 are not used to select the storage devices, but, instead, the displaced pins in the pin board position the differential mechanisms for said keys 271 and 272 to select the storage devices corresponding to said displaced pins for resetting, as will be explained later.

Referring now to Figs. 24, 26, and 36, the main plate 480 of the pin board carriage has mounted thereon two pairs of similar brackets 522, which are secured to the plate 480 by means of bent-over ears 523 in cooperation with corresponding apertures in said main plate 480. Bent-over portions of the brackets 522 have secured thereto a curved keyboard top plate 524 concentric with the main plate 480, said plates having alined slots which slidably support a set of overdraft pins 525 and a set of regular or add pins 526. Each of the pins 525 and 526 has therein two retaining notches, corresponding to the displaced and undisplaced positions of said pins, which notches cooperate with studs 527 carried by flat springs 528 secured in slotted rods 529 in turn secured between pairs of the brackets 522.

The overdraft pins 525 (Figs. 23 and 24) are actuated by a differential mechanism including a pin selecting arm 530, and the regular or add pins 526 are actuated by a similar differential mechanism including a pin selecting arm 531 (Fig. 15), both of said arms 530 and 531 being under control of the differential mechanism for the keys 272, which differential mechanism also, as previously explained, selects the different storage device lines for engaging and disengaging movements.

Positioning of pin board carriage

The timing of the companion plate cams 496 and 497 (Fig. 36) is shown in space 8 of the chart, Fig. 35. As explained previously, the shaft 301 performs one clockwise revolution in adding and subtracting operations and one such revolution in the first cycle of total and sub-total recording operations. In adding and subtracting operations, clockwise movement of the cams 496 and 497 (Figs. 23, 24, 34B, and 36), through the cam lever 493, the slots 749 and 752, the stud 750, the arm 753, and the link 754, rocks the sleeve 475, the crank 498, and the shifting cam 489 counter-clockwise against the action of the spring 501, causing the camming groove 488 in said cam, in cooperation with the roller 487, to shift the pin board plate 480 to its extreme left-hand position, as shown in Figs. 24 and 34B. This extreme counter-clockwise movement of the shifting cam 489 raises the link 506 (Figs. 23, 34B, and 36) to its extreme upward position to move the shoulder 514 beyond the reach of the stud 515, while the differential mechanism for the keys 271 is being positioned under influence of the depressed key, as explained earlier herein.

Inasmuch as the slot in the arm 516 engages the stud 335 carried by the beam 342 for the keys 271, said arm is positioned by said beam in accordance with the value of the depressed key 271. After the arm 516 has been positioned thus, continued rotation of the cams 496 and 497 returns the shaft 490 and the crank 498 clockwise to permit the shifting cam 489, under influence of the spring 501, to return clockwise in unison therewith. Clockwise return movement of the shifting cam 489 and the alining segment 502 moves the link 506 downwardly in unison therewith until the shoulder 514, in coöperation with the stud 515, positions said shifting cam 489 and the pin board carriage plate 480 commensurate with the value of the depressed key 271. This lateral positioning of the pin board carriage plate 480 places the vertical rows of pins 525 and 526, corresponding to the depressed key 271, in operative alinement with their respective pin selecting arms 530 and 531.

The alining pawl 503 (Figs. 23, 33, and 36) is in engagement with the teeth of the alining segment 502 when the machine is at rest; however, at the beginning of machine operations, said aliner is disengaged from the teeth of said segment to permit positioning of the shifting cam 489. After these parts 502 and 489 have been positioned, as explained above, the alining pawl 503 is again engaged with the teeth of the segment 502 to hold the shifting cam 489, the pin board carriage plate 480, and connected parts against displacement.

The shaft 504, upon which the alining pawl 503 is secured, also has secured thereon a lever 532 (Figs. 33 and 34B) connected by a link 533 to a cam lever 534 pivoted on the shaft 296. The lever 534 carries a roller 535, which extends within a camming groove 536 in one face of a cam 537 secured on the shaft 301. The timing of the cam groove 536 is shown in space 15 of the chart, Fig. 35, and, from a comparison of space 15 with space 8, it will be seen that, prior to initial movement of the pin board shifting cam 489, the alining pawl 503 is disengaged from the teeth of the segment 502, and, after said shifting cam has been positioned under influence of the keys 271, the alining pawl 503 is engaged with the teeth of said segment and remains thus engaged during the remainder of the machine operation.

*Pin selecting and displacing mechanism*

Mechanism, similar to that described above for positioning the cam 489 (Fig. 36) and the pin board 480 in accordance with the depressed key 271, is provided for selecting and displacing the pins 525 and 526 (Fig. 26) corresponding to the depressed key 272, which key, as previously explained, also selects the corresponding line of storage devices. As previously explained, the differential mechanism for the keys 272 (Fig. 23) positions the pin selecting arms 530 and 531 in accordance with the value of the depressed key 272 to select the pins 525 and 526 corresponding thereto.

Referring to Figs. 23, 24, and 34B, the stud 311, carried by the beam 310 for the keys 272, engages a slot in an arm 538, similar to the arm 516 free on the shaft 281. The arm 538 carries a stud 521, similar to the stud 515, which cooperates with a shoulder 539 on an extension 540 of a pin board differential link 541, similar in every respect to the link 506. The link 541 is pivoted on a stud 542 carried by an arm 543 free on the shaft 490 and connected by a hub to a companion arm 544. The arm 544 cooperates with a stud 545 in a crank 546, secured on the shaft 490, in exactly the same manner as the extension 500 cooperates with the stud 499 in the crank 498, as explained above.

The link 541 carries a stud 547, which cooperates with an arcuate slot in a plate 548 having an extension which is bifurcated to embrace the stud 509 in exactly the same manner as the plate 508. A stud 549, carried by the plate 548, pivotally supports one end of an arm 550 secured on the shaft 512. A link 551 pivotally connects the link 541 to a stud 552, one end of which is secured in an alining segment 553 (Fig. 15) for the selecting mechanism for the add pins 526, said segment carrying a trunnion 554 free to rotate in a boring in a stud 555 secured to the frame 51. A tenon 556 (Figs. 23, 24, and 34B) on the stud 552 passes through a substantially vertical slot 557 in an alining segment 558 for the overdraft pins 525, said segment being similar in every respect to the segment 553 and carrying a trunnion 559 which is free to rotate in a boring in a stud 560 in axial alinement with the stud 555 and secured in the frame 50. Normally, the tenon 556 of the stud 552 is yieldingly maintained in the center of the slot 557 by parallel fingers of a centering spring 561 in cooperation with a stud 562 in the segment 558, said spring 561 being loosely coiled around a stud 563 carried by the segment 558.

A spring 564 (Figs. 23, 24, and 34B) urges the segments 553 and 558 and their corresponding selecting arms 531 and 530 clockwise to normally maintain the arm 544 in contact with the stud 545. The cams 496 and 497, in cooperation with the cam lever 493, the link 492, the crank 491, and the shaft 490, rock the crank 546 back and forth, according to the time given in space 8 of the chart, Fig. 35, first to move the segments 553 and 558 and connected mechanisms to their extreme counter-clockwise positions at the beginning of machine operations, and then to return said segments and the link 541 clockwise to engage the shoulder 539 with the stud 521, which stud has previously been positioned under influence of the depressed key 272 to position the selecting arms 530 and 531 in accordance with said depressed key 272.

Normally the segments 553 and 558 (Fig. 24) oscillate in unison, but the non-positive connection formed by the spring 561, in cooperation with the tenon 556 and the slot 557, permits the segment 558 to be moved a slight distance in either direction independently of its companion segment 553, the reason for which will be explained later.

The pin selecting arm 530 for the pins 525 (Figs. 23, 24, and 34B) is slidably mounted upon the segment 558 by means of a stud 566 carried thereby, in cooperation with a slot 567 in a forward extension of said segment, and by means of a slot 568 in the rearward end of said arm 530, in cooperation with a stud 569 secured in said segment 558. The pin selecting arm 531 (Fig. 15) for the pins 526 is slidably mounted upon its positioning segment 553 in exactly the same manner as the arm 530.

The stud 566 (Figs. 24 and 34B), carried by the arm 530, passes through an arcuate slot 570 in a pin board stop segment 571 for the pins 525, said segment being slidably mounted by means of a slot 572 therein in cooperation with an annular groove in the stud 560, and by means of parallel faces thereon in cooperation with annular grooves in studs 573 and 574 secured in the frame 50. The stud in the arm 531 (Fig. 15), corresponding to the stud 566, likewise passes through an arcuate slot in a pin board stop segment 575 (Fig. 15) for the pins 526, which segment is similar in every respect to the segment 571 and is similarly mounted for sliding movement by means of a slot therein in cooperation with an annular groove in the stud 555, and by means of parallel faces thereon in cooperation with annular grooves in studs 576 and 577 in the frame 51, said studs being similar in every respect to the studs 573 and 574.

A link 578 (Figs. 24 and 34B) forms a pivotal connection between the arm 530 and an arm 579 secured on a shaft 580 journaled in the frames 50 and 51. A link 581 (Fig. 15) and an arm 582, similar to the link 578 and the arm 579, connect the arm 531 to the shaft 580. Secured on the shaft 580 (Figs. 28 and 34B) is a crank 583 having loosely connected thereto the upper end of a link 584, which is in turn shiftably connected by a link 585 to a shifting arm 586 free on a stud 565 fast in the frame 50. The arm 586 carries a stud 587, which engages a camming groove 588 in one face of a cam segment 589 free on the shaft 281 and integral with a manually operable pin board control lever 590, a finger piece 591 of which extends through a slot 592 (Fig. 1) in the keyboard of the machine. The pin board control lever 590 has four positions; namely, Add, Neutral, Reset One at a Time, and Reset Automatic, said lever being retained in any one of its positions by means of four corresponding notches in the slot 592 and by means of four V-shaped alining notches in the periphery of the segment 589 (Fig. 27), in cooperation with an alining pawl, as will be explained later.

When the pin board control lever 590 is in normal, or Add, position, as shown in Figs. 1, 27, and 28, the camming groove 588, in cooperation with the stud 587, retains a notch 593, in the lower end of the link 584, in engagement with a stud 594 in a cam lever 595 free on the shaft 296. The cam lever 595 carries a roller 596, which cooperates with a camming groove 597 in a cam 598 secured on the shaft 301.

The selecting arm 530 (Figs. 23, 24, and 25) for the overdraft pins 525 has pivotally mounted thereon a pin displacing hook 599, which is urged clockwise by a spring 600 to normally maintain a bent-over ear 601 thereon in engagement with a shoulder on said arm 530. A bent-over ear 602 on an extension of the arm 530 prevents excessive counter-clockwise movement of the hook 599. The hook 599 has a pin displacing tooth 603, which cooperates with notches 604 in the lower ends of the overdraft pins 525.

The pin selecting arm 531 (Figs. 15 and 34B), has pivotally mounted on the upper end thereof a hook 605, similar in every respect to the hook 599 for the overdraft pins 525, said hook being urged clockwise by a spring 606 to normally maintain a bent-over ear 607 thereon in engagement with a shoulder on the arm 531. A bent-over ear 608 on a projection of the arm 531 prevents excessive counter-clockwise movement of the hook 605. The hook 605 has on the upper end thereof a pin displacing tooth 609, which cooperates with notches 610 in the lower ends of the add pins 526.

After the pin board 480 (Figs. 23, 24, and 26) has been positioned laterally, to place the vertical row of pins 525 and 526, corresponding to the depressed key 271, opposite their respective hooks 599 and 605, the differential mechanism under control of the depressed key 272 (Fig. 23) positions the link 541 in accordance therewith, which link, by means of the link 551, positions the hooks 599 and 605 opposite the pins 525 and 526 corresponding to said depressed key 272. After the hooks have been thus positioned, the cam 598 (Figs. 28 and 34B), through the lever 595 and the link 584, rocks the crank 583 and the shaft 580 clockwise according to the time given in space 9 of the chart, Fig. 35.

Initial movement clockwise of the shaft 580 and the arms 579 and 582 shifts the pin selecting arms 530 and 531 outwardly in intermittent steps, as indicated in space 9 of the chart, Fig. 35. When the arms 530 and 531 reach the full extent of their outward movement, the teeth 603 and 609 of their respective hooks 599 and 605 are alined with the notches 604 and 610 in the selected pins 525 and 526.

Assuming that the balance totalizer is in a positive condition after the hook 605 has been alined with the notch in the selected add pin 526, a slight clockwise rocking movement is imparted to the arm 531 and the hook 605 to engage the tooth 609 of said hook with the notch 610 in the selected pin 526. In this case, no such additional clockwise movement is imparted to the arm 530 and the hook 599 (Fig. 24); consequently the tooth 603 of said hook 599 is not engaged with the notch 604 in the corresponding overdraft pin 525.

After the add hook 605 has thus been engaged with the notch in the selected pin, the cam 598 (Fig. 28 and space 9, Fig. 35) returns the shaft 580 counter-clockwise to return the arms 530 and 531 inwardly to pull down or displace the selected add pin 526. After the selected add pin 526 has been displaced, the arm 531 is rocked counter-clockwise to disengage the hook 605 from the notch 610 in said selected pin 526. In case the balance totalizer is overdrawn, the same rotary movement is imparted to the overdraft arm 530 that is imparted to the add arm 531, and consequently the corresponding overdraft pin 525, as well as the add pin 526, will be pulled down or displaced. The mechanism for imparting the rotary movement to the arms 530 and 531 will now be described.

*Rotary movement of pin hooks*

Referring now to Figs. 33 and 34B, an extension 613 of the lever 532, which, as previously explained, is secured on the shaft 504, and a similar arm 614, also secured on said shaft 504, are connected, respectively, by similar links 615 and 616 to a rod 617. The rod 617 (see also Fig. 24) passes freely through borings in similar aliners 618 and 619 having, respectively, alining teeth 620 and 621, which cooperate with alining notches in their respective segments 550 and 553. The aliner 618 (Figs. 19, 33, and 34B) is pivoted on a stud 622 in an arm 623 free on a shaft 624 journaled in the frames 50 and 51, and the aliner 619 (Fig. 15) is free on a stud 625 carried by a crank 626 secured on the shaft 624. Also secured on the shaft 624 (Figs. 31 and 34B) is a crank 627, to which is pivotally connected the upper end of a link 628 connected by a link 629 to a cam arm 630 free on the stud 565. The arm 630 carries a roller 631, which cooperates with a camming groove 632 in one face of a segmental plate cam 633 free on the shaft 281 and, together with a companion segmental cam 634 (Fig. 29) is connected by a stud 635 to the segment 589 (Figs. 27 and 28), which is in turn integral with the manual control lever 590. A notch 636 (Fig. 31) in a downward extension of the link 628 cooperates with a stud 637 in a cam lever 638 free on the shaft 296. The cam lever 638 carries a roller 639, which cooperates with a camming groove 640 in one face of a cam 641 secured on the pin board cam shaft 301, which, it will be recalled by referring to Figs. 34A and 34B, is connected to and moves in unison with the main cam shaft 80. The timing of the cam groove 640 is given in space 11 of the chart, Fig. 35.

When the machine is at rest, the teeth 620 and 621 (Fig. 24) of the aliners 618 and 619 are in engagement with the teeth of their respective segments 550 and 553. However, at the beginning of machine operations, the groove 536 in the cam 537 (Fig. 33 and space 15, Fig. 35) rocks the shaft 504 to rock the aliners 618 and 619 counter-clockwise to disengage their teeth from their respective segments 558 and 553. While the aliners are thus disengaged from the segments, said segments and their respective pin selecting arms 530 and 531 (Figs. 15 and 24) are positioned circumferentially, in the manner explained earlier herein, to select the pins 525 and 526 corresponding to the depressed key 272 (Figs. 23 and 36). After the segments 558 and 553 have thus been positioned, the cam groove 536 returns the aliners 618 and 619 clockwise to engage the alining teeth 620 and 621 thereof with the corresponding teeth of said segments 558 and 553, to retain said segments and their corresponding pin selecting arms in set positions.

After the selecting arms 530 and 531 have been alined, the mechanism shown in Fig. 28 and explained earlier herein rocks the shaft 580 clockwise. After the shaft 580 has reached the terminus of its clockwise movement, which movement alines the teeth of the pin hooks 599 and 605 with the notches 604 and 610 in the selected pins 525 and 526, the came groove in the cam 641 (Fig. 31 and space 11, Fig. 35), through the lever 638 and the link 628, rocks the crank 627 and the shaft 624 counter-clockwise to impart similar movement to the crank 626 (Figs. 15, 24, and 34B), which, it will be recalled, is also secured on said shaft. Counter-clockwise movement of the crank 626 rocks the aliner 619 for the segment 553 also in a counter-clockwise direction, the rod 617, which is held stationary at this time, forming a pivot for said aliner. Counter-clockwise movement of the aliner 619, by means of the tooth 621, rocks the segment 553 and its associated arm 531 a slight distance clockwise to engage the tooth 609 of the hook 605 with the notch 610 in the selected pin 526.

After the tooth of the hook 605 has thus been engaged with the notch in the selected pin, the cam groove 597 (Fig. 28 and space 9, Fig. 35) imparts return movement counter-clockwise to the shaft 580 to return the selecting arm 531 (Figs. 15 and 34B) rearwardly to cause the hook to displace or pull down the selected add pin 526, as shown in connection with the hook 599 (Fig. 24) for the overdraft pins 525. It will be noted, by referring to space 9 of the chart, Fig. 35, that, after the cam groove 597 has returned the shaft 580 a slight distance counter-clockwise, which movement is sufficient to displace the selected pin, there is a short dwell in this position, and, during this dwell, the cam groove 640 (Fig. 31 and space 11, Fig. 35) returns the shaft 624 in a clockwise direction to disengage the tooth of the hook 605 from the notch in the selected pin 526. After the tooth of the hook has thus been disengaged, the cam 598 completes the return movement counter-clockwise of the shaft 580 to move the selecting arm 531 and the hook 605 to their extreme inward positions, as shown in Fig. 15, in which positions the teeth of the hooks clear the ends of the depressed pins 525 and 526.

*Overdraft pin displacing mechanism*

The selecting arm 530 (Fig. 24) and the hook 599 for the overdraft pins 525 move in and out with relation to said pins in exactly the same manner as the selecting arm 531 and the hook 605 for the add pins 526. However, when the balance totalizer is in a positive condition, no rotary movement is imparted to the aliner 618; consequently the tooth 603 of the hook 599 is not engaged with the notch 604 in the selected overdraft pin, and, as a result, said pin is not displaced. When the balance totalizer changes from a positive condition to a negative or overdrawn condition, mechanism is rendered effective for causing exactly the same rotary movement to be imparted to the aliner 618 that is imparted to the aliner 619, and in this case both the add pin 526 and the overdraft pin 525, corresponding to the depressed key 272, are displaced.

By referring to Figs. 18 and 20, it will be recalled that the shaft 243, which is here shown in normal or positive position, is rocked clockwise by the projection 241, carried by the highest order plus wheel of the balance totalizer when said balance totalizer is overdrawn. Clockwise movement of the shaft 243 and the disc 242, carried thereby, causes a stud 644 in said disc, in cooperation with a slot 645 in an arm 646 secured on a shaft 647 journaled in the main framework of the machine, to rock said arm, said shaft, and an arm 648 secured on said shaft counter-clockwise from positive position, as shown here, to negative or overdraft position. The positive and negative positions of the arm 648 are determined, respectively, by stop studs 649 and 650 in the frame 53. Pivotally mounted on the arm 648 is a pawl 651 urged counter-clockwise by a spring 652 to normally maintain a stud carried thereby in engagement with an extension of the arm 648. The pawl 651 (Fig. 18) has formed on the upper edge thereof a two-edged bar 653 the lower edge of which cooperates with locating notches 654 and 655 in a stationary plate 656 secured to the frame 53. The upper edge of the bar 653 cooperates with a notch 657 in a shifting pitman 658, the upper end of which is pivoted on a stud 659 carried by a bell crank 660 secured on a shaft 661 journaled in the main framework of the machine.

A forward extension of the bell crank 660 has therein two V-shaped alining notches corresponding to the positive and negative positions of said bell crank, which notches cooperate with an alining pawl 662 free on a stud 663 in the frame 53, said pawl being urged clockwise by a spring 664 into resilient engagement with said notches in said bell crank 660. The pitman 658 has therein a slot 665, which cooperates with a stud 666 in a pitman-operating arm 667 secured on a shaft 668 journaled in the main framework of the machine. Also secured on the shaft 668 (Fig. 19) is a crank 669 connected by a link 670 to a cam lever 671 free on the shaft 296. The lever 671 carries a roller 672, which cooperates with a cam groove 673 in the right-hand face of the cam 537 (Fig. 34B).

When the machine is at rest, the pitman 658 and connected mechanism are in the positions shown in Fig. 18, in which position the notch 657 is in engagement with the upper edge of the bar 653 and holds the lower edge of said bar in one of the notches 655 or 654, depending upon whether the balance totalizer is in a positive condition or in a negative condition. As shown here, the balance totalizer is in a positive condition; consequently, the bar 653 is in alinement with the positive notch 654. At the beginning of machine operation, the cam groove 673, the timing of which is given in space 14 of the chart, Fig. 35, in cooperation with the roller 672, rocks the lever 671 counter-clockwise to rock the crank 669, the shaft 668, and the arm 667 clockwise to disengage the notch 657 from the bar 653, whereupon the spring 652 retracts the pawl 651 to its counter-clockwise position to disengage the lower edge of said bar 653 from the notch 654 in the plate 656.

While the bar 653 is thus free of the notches 654, 655, and 657, the balance totalizer is engaged with the main actuators for actuation thereby, and if, during this actuation, the balance totalizer is overdrawn, the finger 241 (Fig. 18) carried by the highest order plus wheel of said balance totalizer, in cooperation with the disc 242, rocks said disc and the shaft 243 clockwise, in the manner previously explained. Clockwise movement of the disc 242 causes the stud 644, in cooperation with the slot 645, to rock the arm 646, the shaft 647, the arm 648, and the pawl 651 counter-clockwise from the position shown here, which is determined by the stop stud 649, to negative position, which is determined by the stud 650, to aline the lower edge of the bar 653 with the negative notch 655 in the plate 656.

Prior to operation of the mechanism shown in Fig. 31, which mechanism functions according to the timing given in space 11, Fig. 35, to engage the add hook 605 (Fig. 15) with the notch in the selected add pin 526, as explained earlier, the cam groove 673, in cooperation with the roller 672, returns the lever 671 clockwise to impart counter-clockwise movement to the shaft 668, the arm 667, and the pitman 658. The pitman 658 has an arcuate camming surface 675 located on either side of the notch 657 and leading toward said notch. Counter-clockwise movement of the pitman 658 causes the camming surface 675 to contact the rounded upper edge of the bar 653 and rock the pawl 651 clockwise to engage the rounded lower edge of said bar 653 with the negative notch 655 in the plate 656. After the bar 653 is engaged with the notch 655, continued pressure of the camming surface 675 on the rounded upper edge of the bar 653 shifts the pitman 658 forwardly until the notch 657 engages said upper edge of said bar 653. Forward movement of the pitman 658 rocks the bell crank 660 and the shaft 661 clockwise from positive position to negative position, which position is determined by the engagement of the lower V-shaped notch in the extension of the bell crank 660 with the alining pawl 662 (Fig. 18).

Secured on the shaft 661 (Figs. 19, 33, and 34B) is an arm 676 having pivotally mounted thereon an arm 677 urged counter-clockwise by a spring 678 to normally maintain an extension thereof in contact with a stud carried by the arm 676. The arm 677 carries a stud 679, which extends through a slot 680 in the upper end of the arm 623, and, when the balance totalizer is in a positive condition, said stud 679 normally engages a notch 681 in a hook-shaped arm 682 free on the shaft 624, as shown in Fig. 19. The arm 682 is connected by a hub 683 (Figs. 30 and 34B) to a crank 684, which pivotally supports the upper end of a link 685 shiftably connected by a short link 686 to a cam lever 687 free on the stud 565. The cam lever 687 carries a roller 689, which cooperates with a camming slot 690 in a segmental cam 691 free on the shaft 291 and connected by the stud 635 (Fig. 27) to the cam 589 and the control lever 590.

As previously explained, the control lever 590 has four positions—namely, Add, Neutral, Reset One at a Time, and Reset Automatically—and, when said lever is either in Add position, as shown here, or in Neutral position, the cam groove 690 (Fig. 30), in cooperation with the roller 689, maintains a notch 692 in the lower end of the link 685 out of engagement with a stud 693 in a cam lever 694, as shown here. The lever 694 is free on the shaft 296, and said lever carries a roller 695, which cooperates with a cam groove 696 in the left-hand face of a cam 697 secured on the pin board cam shaft 301.

By referring to Fig. 19, it will be recalled that the arm 623, which is likewise free on the shaft 624, pivotally supports the aliner 618 for the overdraft segment 558. When the balance totalizer is in a positive condition and the control lever 590 (Fig. 1) is in Add position, the stud 679 will connect said arm 623 to the hook-shaped arm 682, and, as no movement is imparted to said hook-shaped arm 682 by the cam 697 (Fig. 30) in adding operations, no rotary movement will be imparted to the aliner 618. As a result, the overdraft hook 599 (Fig. 24) will not be engaged with the notch 604 in the selected overdraft pin 525, and therefore said overdraft pin will not be displaced.

When the overdraft shaft 661 (Figs. 18, 19, and 34B) is shifted from positive position, as shown here, to overdraft or negative position, the arms 676 and 677 are rocked clockwise to shift the stud 679 out of engagement with the notch 681 in the arm 682 and into engagement with an open slot 698 in an arm 699 secured on the shaft 624. This downward shifting of the stud 679 couples the arm 623 to the shaft 624, which shaft is controlled, in adding operations, by the mechanism shown in Fig. 31, and consequently, when the balance totalizer is in an overdrawn condition, the aliner 618 for the overdraft segment 558 (Fig. 24) receives exactly the same rotary movement as the aliner 619 for the add segment 553 (Fig. 15), and, as a result, the overdraft pin 525 corresponding to the depressed key 272 is displaced in exactly the same way as the corresponding add pin 526.

As previously explained in connection with Fig. 17, the balance totalizer is zeroized at the beginning of a machine operation to transfer the amount thereon into the set of storage wheels selected in the preceding operation, and, if the balance totalizer is in an overdrawn condition, the amount entered in the selected storage wheels is, of course, a complementary or negative amount.

Zeroizing of the balance totalizer, after said totalizer has been overdrawn, causes the finger 241 (Fig. 18) to return the disc 242 and the shaft 243 counter-clockwise, which movement, by means of the stud 644, restores the arm 646, the shaft 647, the arm 648, and the pawl 651 clockwise to positive position, as shown here. After the pawl 651 has been restored to positive position, the pitman 658 is again rocked counter-clockwise to cause the camming surface 675 thereon to engage the top edge of the bar 653, to rock the lower edge of said bar into engagement with the positive notch 654, whereupon said camming surface 675 shifts the pitman 658 upwardly until the notch 657 engages said bar 653 to restore the bell crank 660, the shaft 661, and the arm 676 counter-clockwise to positive position, as shown in Figs. 18 and 19. This restoring of the arm 676 moves the stud 679 out of engagement with the open slot 698 in the arm 699 and reengages said stud with the notch 681 in the hook-shaped arm 682, in which position the arm 623 is held stationary in adding and subtracting operations, and consequently no rotary movement is imparted to the aliner 618 in such operations.

A device is provided for indicating when the shaft 661 (Figs. 19 and 23) is moved from positive position to negative position, to inform the operator that the amount transferred from a selected storage device to the balance totalizer has been overdrawn during subsequent computations, whereupon the operator may take any steps in relation to this account, or follow the particular procedure outlined by the bank or business for such cases.

An extension 730 of the arm 676 has a bent-over portion forming an indicator 731, which, when the shaft 661 and the arm 676 are in negative position, registers with a sight aperture 732 in the cabinet 57 to indicate to the operator that the amount in the balance totalizer has been overdrawn. When the amount in the balance totalizer is positive, the indicator 731 is beneath the aperture 732, as shown in Fig. 23.

A clearer understanding of the manner in which the pin board mechanism functions may be obtained by referring to Fig. 38, which is a diagrammatic showing of the pin board mechanism, including the two banks of selecting keys 271 and 272, and a plan view of the pin board carriage 480, which is divided into 100 identical squares representing either the set of 100 add pins 526 or the set of 100 overdraft pins 525, said pins being numbered in sequential order beginning with the extreme left-hand vertical row, so that they may be identified in relation to the storage sets which they represent.

In the diagrammatic illustration (Fig. 38), the pin board 480 is shown connected to the cam 489, which positions said pin board laterally and which is controlled by the row of keys 271, said keys likewise controlling the lateral positioning of the auxiliary actuators 269 (Figs. 34A and 34B) to select the ten sets of storage wheels on each of the ten lines.

Likewise, in Fig. 38, the pin selecting arm 530 or 531 is shown in relation to the pin board carriage 480, the circumferential positioning of said arm, in relation to the pins 525 or 526, being controlled by the row of keys 272, which keys likewise control the selection of the ten lines of storage devices (Fig. 2) for engaging and disengaging movement with and from the auxiliary actuators 269, in the manner explained earlier herein. In Fig. 38, the arm 530 or 531 and the pin board 480 are shown in their extreme moved positions, to which positions they are moved at the beginning of each machine operation, with the exception of Reset Automatic operations.

The extreme upper or zero positions of the keys 271 and 272 are used to select the zero set of wheels on the zero line, and, when no key is depressed in either of the banks 271 or 272, the differentials of said banks move to their extreme upward or zero positions, causing the cam 489 to shift the pin board toward the right until the extreme left-hand or zero row of pins is in alinement with the pin selecting arm 530 or 531 and said arms 530 and 531 are located in their extreme upward positions in operative alinement with the zero pins. Following this, in-and-out and rotary movements are imparted to the pin selecting arm 530 or 531, causing the pin hook carried thereby to engage and displace the zero pin, to indicate that the zero set of wheels on the zero line has been active.

In case the 9 key 271 and the 9 key 272 are depressed, to select the ninth set of wheels on the ninth storage device line, the cam 489 positions the pin board 480 in its extreme left-hand position, in which position the extreme right-hand vertical row of pins is opposite the pin selecting arm 530 or 531 and the differential mechanism for the keys 272 positions the selecting arms 530 and 531 in ninth position, in which position the hooks carried by said arms are in operative alinement with the 99 pin 525 or 526. As the operation of the machine progresses, the selecting arms 530 and 531 receive in-and-out and rotary movements to cause the hooks carried thereby to engage and displace the 99 pins 525 or 526 to indicate that the No. 99 storage set has been active.

From the foregoing description it will be seen that, by using the keys 271 and 272, any desired one of the 100 storage sets may be selected for actuation and that, during such actuation, the overdraft pin 525 and/or the add pin 526 corresponding to said selected storage device will be displaced, to indicate to the operator that said storage device has been active.

*Pin board control lever and associated mechanism*

As previously explained, the finger piece 591 of the pin board control lever 590 (Figs. 1 and 27) extends through the slot 592 in the keyboard top plate, and said lever has four positions; namely, Add, Neutral, Reset One at a Time, and Reset Automatic, said lever and connected segments 589, 633, 634, and 691 being retained in any one of the various positions by means of the four corresponding notches in the slot 592 and by means of four V-shaped alining notches 700 (Figs. 27, 28, and 34B) in the periphery of the cam segment 589, in cooperation with the tooth of an alining pawl 701 free on a stud 688 in the frame 50. The pawl 701 is urged clockwise by a spring 702 into resilient engagement with the notches 700. Pivoted on a stud in an extension of the pawl 701 is a locking plunger 703 slotted to receive a stationary stud 704 in the frame 50.

Moving the lever 590 from one position to another causes the tooth of the alining pawl to ride out of the V-shaped notches onto the periphery of the segment 589. This imparts counter-clockwise movement to said pawl, against the action of the spring 702, to shift the plunger 703 forwardly or toward the left, as viewed in Fig. 27, to move a locking projection 705 of said plunger into the path of a hook-shaped extension of a locking arm 706 secured on the key lock shaft 266 (see also Fig. 34B). As it is necessary for the key lock shaft 266 to rock counter-clockwise to release the machine for operation, the projection 705, in cooperation with the arm 706, obstructs this movement when the lever 590 is out of any of its four positions.

The pin board mechanism functions in the manner explained above when the pin board control lever 590 is in Add position. Moving the pin board control lever 590 to Neutral position causes the cam groove 588 (Fig. 28) in the segment 589 to shift the link 584 counter-clockwise to disengage the notch 593 therein from the stud 594 to disconnect the shaft 580 from the operating cam 598. Moving the control lever 590 to Reset One at a Time position causes the groove 588 in the cam segment 589 to again engage the notch 593 in the link 584 with the stud 594, so that movement of the shaft 580 will be controlled by the cam 598 at this time. Moving the control lever 590 to Reset Automatic position causes the cam groove 588 to again disengage the notch in the link 584 from the stud 594, and at the same time causes a camming groove 707 in the right-hand face of the cam 684 (Fig. 29), in cooperation with a roller 708 carried by an arm 709 free on the stud 565, to rock said arm clockwise. The arm 709 is connected by a link 710 to a pitman 711, the upper end of which is pivoted to a crank 712 secured on the shaft 580. Consequently the pitman 711 moves clockwise in unison with said arm 709 to engage a notch 713 in the lower end thereof with a stud 714 in a cam lever 715 free on the shaft 296. The cam lever 715 carries a roller 716, which cooperates with a camming groove 717 in a cam 718 secured on the shaft 301.

From the above it should be evident that, when the pin board control lever 590 is moved to Reset Automatic position, operation of the shaft 580 is controlled by the cam 718, the timing of which is given in space 10 of the chart, Fig. 35. In all other positions of the control lever 590, the camming groove 707 (Fig. 29) retains the notch 713 out of engagement with the stud 714.

When the pin board control lever 590 is moved out of Add position, the cam groove 632 (Fig. 31) rocks the notch 636 in the link 628 out of engagement with the stud 637 and retains said notch thus disengaged in all other positions of said control lever. When the pin board control lever 590 (Fig. 32) is moved either to Reset One at a Time position or to Reset Automatic position, a cam groove 719 in the left-hand face of the cam 633 (Fig. 32), in cooperation with a roller 720 carried by an arm 721 free on the stud 565, rocks said arm clockwise. The arm 721 is connected by a link 722 to a pitman 723, the upper end of which is pivotally connected to a crank 724 secured on the shaft 624.

Clockwise movement of the arm 721, under influence of the cam groove 719, rocks the pitman 723 in unison therewith to engage a notch 725 in the lower end thereof with a stud 726 in a cam lever 727 free on the shaft 296. The cam lever 727 carries a roller 728, which cooperates with a cam groove 729 in the left-hand face of the cam 641. The cam groove 729 controls the operation of the shaft 624 in Reset One at a Time operations and in Reset Automatic operations according to the time given in space 12 of the chart, Fig. 35. In Add and Neutral positions of the pin board control lever, the cam groove 719 (Fig. 32) retains the notch 725 out of engagement with the stud 726, as shown here.

When the control lever 590 (Fig. 30) is in Add or Neutral position, the camming groove 690 in the cam 691 retains the notch 692 out of engagement with the stud 693 to disconnect the crank 684 and the hook-shaped arm 682 (Fig. 19) from the cam 697. When the control lever 590 is in Reset One at a Time and Reset Automatic positions, the cam groove 690 engages the notch 692 with the stud 693 to connect the cam 697 to the crank 684 and the arm 682, and consequently, in reset operations, said cam controls the engaging and disengaging of the overdraft hook 599 (Fig. 24) with and from the notches 604 in the overdraft pins 525.

Reset One at a Time operations

Moving the pin board control lever 590 (Figs. 1 and 27) to Reset One at a Time position conditions the pin board mechanism to reset the overdraft and adding pins corresponding to the depressed keys 271 and 272, at the same time the corresponding storage set is being reset, as will now be explained.

Moving the pin board control lever 590 (Figs. 1, 27, and 28) to Reset One at a Time position causes the cam groove 586 in the segment 589 to retain the notch 593 of the link 584 in engagement with the stud 594, and, as a result, the cam groove 597 will control the in-and-out movement of the overdraft and adding hooks 599 and 605 (Figs. 15 and 24) in exactly the same manner as explained above for adding operations. Moving the pin board control lever to Reset One at a Time position causes the cam groove 632 (Fig. 31) to disengage the link 628 from the cam lever 638 and also causes the cam groove 719 (Fig. 32) in the cam 633 to engage the notch 725 in the pitman 723 with the stud 726 to cause the cam groove 729 in the cam 641 to control the movement of the shaft 624, which in this case controls the angular or rotary movement of the add selecting arm 531 and the hook 605 (Fig. 15).

Moving the pin board control lever 590 to Reset One at a Time position causes the cam slot 690 (Fig. 30) in the cam 691 to engage the notch 692 in the link 685 with the stud 693, so that the cam groove 696 in the cam 697 will control the movement of the arm 682 (Fig. 19), which, in Reset One at a Time operations, is connected by the stud 679 to the arm 623 so that rotary movement will be imparted to the overdraft selecting arm 530 and to the overdraft hook 599 (Fig. 24). By referring to spaces 12 and 13 of the chart, Fig. 35, it will be seen that the cam grooves 729 and 696 (Figs. 32 and 30) have exactly the same timing; consequently the identical rotary movement will be imparted to the overdraft and adding pin hooks 599 and 605 in Reset One at a Time operations.

After the storage device corresponding to the depressed keys 271 and 272 (Figs. 1 and 23) has been selected for actuation, and after the cam 598 (Fig. 28 and space 9, Fig. 35) has revolved 290 degrees, movement of said cam from 290 degrees to 300 degrees imparts a slight clockwise movement to the crank 583, the shaft 580, and the arms 579 and 582 (Figs. 24 and 15) to shift the overdraft and add hooks 599 and 605 outwardly a slight distance until the teeth 603 and 609 thereof are in alinement with the notches 604 and 610 in the displaced overdraft and add pins 525 and 526 corresponding to the depressed keys 271 and 272. After the teeth of the pin hooks are thus alined with the slots in the displaced pins, the cam grooves 696 and 729 (Figs. 30 and 32) and spaces 12 and 13 of the chart, Fig. 35), respectively, rock the shaft 624 and the arm 682 (Fig. 19) a slight distance counter-clockwise to engage the teeth of the add and overdraft hooks with the notches in the displaced overdraft and add pins. After the hooks are thus engaged with the pins, continued rotation of the cam 598 (Fig. 28 and space 9, Fig. 35) imparts additional clockwise movement to the shaft 580 to cause the hooks 599 and 605 (Figs. 15 and 24), which are engaged with the notches in the displaced pins, to restore said pins upwardly to normal position.

After the pins corresponding to the depressed keys 271 and 272 have been restored to normal position, continued rotation of the cam grooves 696 and 729 (Figs. 30 and 32 and spaces 12 and 13, Fig. 35) reverse the rotary movement of the selecting arms 530 and 531 (Figs. 15 and 24) to disengage the teeth of the overdraft and add hooks from the notches in the selected pins. Continued rotation of the cam 598 (Fig. 28) returns the shaft 580 counter-clockwise, which in turn returns the hooks 599 and 605 to their extreme inward or normal positions, as shown in Fig. 15, in which positions the teeth of the hooks 599 and 605 clear the lower ends of the displaced pins 525 and 526.

In Fig. 25, the overdraft hook 599 is shown in its three positions; namely, inward, intermediate, and outward. When said hook is in its inward position, as shown in full lines, the tooth 603 is beneath the lower end of displaced pins 525. When said hook is in its outward position, as shown in dot-and-dash lines, said tooth is in alinement with the notches 604 in undepressed pins, and when said hook is in its intermediate position, as also shown in dot-and-dash lines, said tooth is in alinement with the notches 604 in depressed pins. The same holds true for the hook 605 for the add pins 526 (Fig 15).

*Automatic reset operations*

In automatic reset operations, the displaced overdraft and add pins 525 and 526 (Figs. 23 and 26) are restored automatically and the storage devices corresponding to said displaced pins are simultaneously selected for engaging and disengaging movement, and, if the total control lever 92 (Fig. 1) is in Reset-1 position, the storage devices corresponding to the displaced pins will be automatically cleared during reset automatic operations.

Before the initiation of an automatic reset operation, it is necessary to depress the "9" keys in the rows 271 and 272 (Figs. 1 and 36) and to perform an idle operation of the machine with the total control lever 92 in Add position and the pin board control lever 590 in either Add position or Neutral position. This idle operation causes the pin board carriage 480 to be returned to its extreme left-hand position and retained there and causes the hooks 599 and 605 to be retained in their #9 positions, which conditions are necessary prior to the initiation of automatic reset operations, to insure that said hooks 599 and 605 do not interfere with the displaced pins. After this idle operation has been performed, the pin board control lever 590 is moved to Reset Automatic position, and the total control lever 92 is moved to Reset-1 position.

Moving the pin board control lever to Reset Automatic position, through mechanism to be described presently, shifts the arms 530 and 531 (Figs. 15, 24, and 25) outwardly to intermediate position, as shown in Fig. 24, to aline the teeth of the hooks 599 and 605 with the notches in the displaced overdraft and add pins. This outward movement of the arms 530 and 531 carries their respective segments 571 and 575 in unison therewith to move arcuate bails of said segments into the paths of the lower ends of the displaced pins.

Moving the pin board control lever to Reset Automatic position disconnects the shifting cam 489 (Figs. 23, 24, 34B, and 36) from the differential mechanism for the keys 271 and releases said cam to the action of its spring 501, which in turn causes said cam to urge the pin board carriage 480 toward the right.

Mechanism rendered effective by movement of the pin board control lever to Reset Automatic position is provided for preventing right-hand shifting movement of the pin board carriage under influence of the spring 501 (Figs. 23 and 36) until the arms 530 and 531 and the hooks 599 and 605 supported thereby (Figs. 15 and 24) are in their extreme downward positions, as shown here. This is to prevent lateral shifting of the pin board carriage when the hooks are in an intermediate position, as would be possible after all the pins have been restored in any vertical row and the pin board has thus been freed for shifting movement under influence of the spring 501 when the alining pawl 503 (Fig. 33 and space 15, Fig. 35) is disengaged at the beginning of the next automatic resetting operation. In this case, it is possible that displaced pins in the left-hand rows may be moved into the paths of the hooks 599 and 605 before said hooks are returned to their extreme downward positions and thereby cause damage to the pin board mechanism.

When the arms 530 and 531 and their corresponding hooks are moved to their extreme downward position in the first reset automatic operation, the mechanism referred to above for preventing the shifting of the pin board carriage under influence of the spring 501 is rendered inoperative. Therefore, when the alining pawl 503 (Fig. 33) is disengaged in said first reset automatic operation, the pin board carriage 480 is released to the action of the spring 501, which immediately shifts said carriage toward the right until the first displaced pins strike the bail of their corresponding segment 571 or 575. This alines the hooks 599 and 605 with the notches in the displaced pins, so that said pins may be reset, as will be described presently.

The mechanisms outlined in general above will now be described in detail.

Referring to Figs. 27 and 34B, moving the pin board control lever 590 to Reset Automatic position causes a cam slot 733 in the segment 589, in cooperation with a roller 734 carried by an arm 735 free on the stud 565, to rock said arm counter-clockwise. The arm 735 is connected by a link 736 to a bell crank 737 free on the stud 688, and, therefore, counter-clockwise movement of said arm 735 is transmitted to said bell crank 737. Counter-clockwise movement of the bell crank 737, by means of a link 738 connecting said bell crank to a crank 739 secured on the shaft 512, rocks said crank and said shaft clockwise. Clockwise movement of the shaft 512 (Figs. 23, 34B, and 36) moves the arms 511 and 550 in unison therewith to shift the plates 508 and 548 forwardly or toward the left, as viewed here, to rock the links 506 and 541 counter-clockwise to move the shoulders 514 and 539 out of the path of the studs 515 and 521 in the arms 516 and 538.

Simultaneously with the shifting of the shoulders 514 and 539 out of the paths of their respective studs 515 and 521, studs 740 and 741, carried by arms 742 and 743, are shifted beneath the forward ends of their respective latch operating pawls 744 and 745. The arms 742 and 743 are pivotally mounted on their respective links 506 and 541, said arms being urged counter-clockwise by their respective springs into engagement with bent-over ears on extensions of said links 506 and 541. This forms a flexible connection between the arms 742 and 743 and their respective links 506 and 541, so that the studs 740 and 741 may by-pass the forward ends of the latch operating pawls 744 and 745, if necessary. The latch operating pawls 744 and 745 are pivoted at 746 to their respective differential arms 339 and 288, and said pawls are pivotally connected by their respective links 747 and 748 to the corresponding latches 338 and 287.

After the studs 740 and 741 (Figs. 23, 34B, and 36) have been positioned in accordance with the displaced pins 525 or 526, in automatic reset operations, operation of the differential mechanisms for the keys 271 and 272 causes the forward ends of the pawls 744 and 745 to engage said studs 740 and 741 to rock the latches 336 and 287 counter-clockwise to position the differential mechanisms for said keys 271 and 272 in accordance with the displaced pins 525 or 526 to select the sets of storage wheels corresponding thereto so that they may be reset, as will be explained more in detail later.

Moving the pin board control lever 590 (Fig. 28) to Reset Automatic position causes the cam groove 588 in the segment 589 to rock the link 584 counter-clockwise to disengage the notch 593 thereon from the stud 594 to render the cam groove 597 ineffective to control the operation of the shaft 580 in automatic reset operations. Likewise, moving the control lever 590 (Fig. 29) to Reset Automatic position causes the cam groove 707 to shift the link 711 clockwise to engage the notch 713 thereon with the stud 714, in the manner explained earlier herein. It will be noticed that the notch 713 is normally slightly below the stud 714; consequently, when the link 711 is shifted clockwise, the camming action between said stud 714 and the angular upper edge of said slot shifts said link upwardly to impart a slight clockwise movement to the shaft 580 to aline the teeth of the hooks 599 and 605 (Figs. 15 and 24) with the notches in the displaced pins 525 and 526, and to move the bails of the segments 571 and 575 into the paths of said displaced pins.

Moving the pin board control lever 590 to Reset Automatic position (Figs. 31 and 32) causes the cam grooves 632 in the segment 633 to disengage the notch 636 in the link 628 from the stud 637, and simultaneously causes the cam groove 719 in the segment 633 to engage the notch 725 in the pitman 723 with the stud 726, so that the cam groove 729 will control the movement of the shaft 624 in automatic reset operations, the same as in Reset One at a Time operations. Movement of the pin board control lever to Reset Automatic position causes the cam slot 690 (Fig. 30) in the segment 691 to engage the notch 692 with the stud 693, so that the cam groove 696 will control the movement of the crank 684 and the hook-shaped arm 682 (Fig. 19) to in turn control the engaging and disengaging of the overdraft hook 599 (Fig. 24) with notches in the displaced pins, the same as in Reset One at a Time operations.

Control of pin board shifting cam

Mechanism rendered effective by movement of the pin board control lever to Reset Automatic position is provided for disengaging the pin board shifting cam 489 (Fig. 36) from the cam lever 493 in order that said cam will be freed to the action of the spring 501. Such mechanism will now be described.

The link 711 (Figs. 29, 34B, and 36) carries at its lower end a stud 756, which engages a slot in an arm 757 secured on one end of a shaft 758 journaled in the frames 50 and 51. Also secured on the shaft 758 is an arm 759 pivotally connected to the lower end of the link 751. It will be recalled that the upper end of the link 751 carries the connecting stud 750, which, in cooperation with the slots 749 and 752, normally connects the arm 753 and the cam lever 493 for unitary movement.

When the pin board control lever 590 (Figs. 1, 27, 29, and 36) is in any of its positions except Reset Automatic position, the stud 750 remains in its upper position as shown here, to form an operating connection between the cam lever 493 and the arm 753, to restore the pin board shifting cam and the pin board framework to initial position, as explained earlier. Moving the pin board control lever 590 to Reset Automatic position causes the cam groove 707 in the segment 634 to shift the link 711 clockwise to rock the arm 757, the shaft 758, and the arm 759 counter-clockwise to shift the link 751 downwardly to move the stud 750 to its downward positon into a clearance portion of the slot 752, so that, when rocking movement is imparted to the cam lever 493, such movement will not be transmitted to the arm 753, and consequently the pin board shifting cam 489 will not be returned to initial position in each Reset Automatic operation, but will be constantly urged in a clockwise direction by the spring 501.

Mechanism to prevent lateral shift of pin board

Mechanism, rendered effective by movement of the pin board control lever 590 to Reset Automatic position, is provided for preventing shifting of the pin board carriage from one row of pins to the next, under influence of the spring 501, until the pin selecting arms 530 and 531 (Figs. 15 and 24) for the overdraft and add pins are in their extreme downward positions, to overcome the possibility of the lower ends of the displaced pins stumbling on their corresponding hooks 599 and/or 605, as explained before.

The mechanism for preventing lateral shifting of the pin board in automatic reset operations includes a projection 761 (Figs. 23, 34B, and 24) on the segment 558 for the overdraft pins 525, said projection cooperating with a finger of a bell crank 762 free on a stud 763 secured in the frame 50. The bell crank 762 has an extension, which terminates in a retaining tooth 764, said finger and said extension being urged counterclockwise by a spring 765 to urge the tooth 764 into engagement with any one of a series of retaining notches 766 corresponding to the ten different lateral positions of the pin board carriage 460, which positons in turn correspond to the ten substantially vertical rows of pins. The retaining notches 766 are cut in a comb 767 secured to the extension 485 of the pin board framework 480 (see also Fig. 26). Free on the stud 763 is a sleeve 772 having secured on one end thereof an arm 773 connected by a link 769 to an upward extension 770 of the cam arm 709 (Fig. 29). Secured on the other end of the sleeve 772 is a crank 768 having a stud 771 normally engaged by the bell crank 762, under influence of the spring 765.

When the pin board control lever 590 is not in Reset Automatic positon, the cam groove 707 in the segment 634 retains the arm 709 in its counter-clockwise position. This in turn retains the arm 773 and the crank 768 in their clockwise postions, causing the stud 771, in cooperation with the bell crank 762, to retain the tooth 764 out of engagement with the notches 766 in the comb 767, thereby rendering said retaining mechanism ineffective.

Moving the pin board control lever 590 to Reset Automatic position causes the cam groove 707 (Fig. 29) to rock the arm 709 and the extension 770 clockwise, which movement in turn rocks the arm 773 and the crank 768 (Fig. 24) counterclockwise to retract the stud 771 from the extension of the bell crank 762 to release said bell crank to the action of the spring 765, which spring is tensioned to urge the tooth 764 into engagement with the notches 766.

As previously explained, prior to moving the pin board control lever 590 to Reset Automatic position, it is necessary to perform an idle operation of the machine with said lever in Neutral position and with the No. 9 keys 271 and 272 depressed, to cause the pin board carriage 480 to be returned to and retained in its extreme lefthand or No. 9 position, and to cause the segments 558 and 553, the arms 530 and 531, and their corresponding hooks 599 and 605 to be located in their No. 9 positions, to insure that said hooks will not interfere with any displaced pins.

In the first automatic reset operation, the segments 558 and 553 and their corresponding arms 530 and 531 (Figs. 23 and 24) are first moved from No. 9 position to extreme down position, causing the projection 761 to engage the finger of the bell crank 762 to rock said bell crank clockwise against the action of the spring 765, to disengage the retaining tooth 764 from the notches 766. Inasmuch as the alining pawl 503 (Fig. 33 and space 15, Fig. 35) has previously been disengaged, the disengaging of the tooth 764 releases the pin board shifting cam 489 to the action of the spring 501, which immediately shifts the pin board carriage 480 (Fig. 34B) toward the right until the first displaced pin 525 or 526 strikes the corresponding bail of the segment 571 or 575 to aline said pin with the corresponding hook 599 or 605. Return or positioning movement of the segments 558 and 553 causes the hook 599 or 605 to engage the notch 604 or 610 in the corresponding displaced pin 525 or 526 to position said segments in accordance with the value of the displaced pin.

The lateral positioning of the pin board carriage 480 and the differential positioning of the arms 530 and 531 by the displaced pin cause the studs 740 and 741 (Figs. 23 and 36), in cooperation with their corresponding pawls 744 and 745, to disengage the corresponding latches 338 and 287 from their driving segments 340 and 292, to position the differential mechanisms for the keys 271 and 272 in accordance with the value of the displaced pin. The differential mechanisms for the keys 271 and 272 then cause the storage device corresponding to the displaced pin to be selected for engagement with and disengagement from the auxiliary actuators 269, so that the amount in said storage device will be cleared therefrom and said storage device consequently left in a zeroized condition.

The springs 600 and 606 (Figs. 15, 24, and 25) for the hooks 599 and 605 and the centering spring 561 for the segment 558 are stronger than the latch spring 290 (Fig. 23) and overcome the action of said latch spring 290 in the breaking of the latch 287 in reset automatic operations. This insures the accurate and proper positioning of the differential mechanism for the keys 272 under influence of the displaced pins 525 and 526 in reset automatic operations. Furthermore, the ears 602 and 608 limit the rocking movement of the hooks 599 and 605 relative to the arms 530 and 531, to further insure that the differential mechanism for the keys 272 is properly positioned in reset automatic operations.

After the segments 558 and 553 (Figs. 23, 24, and 33 and space 15, Fig. 35) have been positioned by the displaced pins 525 or 526, the aliners 618 and 619 are engaged with the teeth in said segments and rock said segments a slight distance counter-clockwise to disengage the hooks 599 and 605 from the notches in the displaced pins 525 or 526. Near the end of the first cycle of operation, the cam grooves 717, 696, and 729 (Figs. 29, 30, and 32 and spaces 10, 13, and 12, Fig. 35) control the in-and-out movement and the rotary movement of the hooks 599 and 605, in the manner explained previously, to cause said hooks to engage the notches in the displaced pins, push said pins outwardly to undisplaced position, disengage said hooks from said notches, and return said hooks inwardly to normal position.

At the beginning of each succeeding automatic reset operation, when the aliners 618 and 619 are withdrawn, the segments 558 and 553, in their initial movement from the position in which they were left in the preceding operation, are first rocked clockwise under influence of spring 564 until they are arrested by the next pin which is depressed, or, if no pin is depressed, until the stud 545 contacts arm 544, at which time the arm 544 moves the segments 558 and 553 to their extreme downward positions at this time, the projection 761 rocks the tooth 764 out of engagement with the notches 766 to again release the pin board carriage to the action of the spring 501. If all the pins in the vertical particular row have been reset, said carriage immediately moves toward the right until the next displaced pin contacts the bail on the corresponding segment 571 or 575. Of course, if all the pins have not been returned upwardly in the particular row, the bail on the segment 571 or 575 prevents shifting of the carriage 480 under influence of the spring 501.

The retaining mechanism described immediately above prevents shifting of the pin board framework, when the hooks 599 and 605 are in an intermediate position, which may result in said hooks being moved into the path of displaced pins, and, as the construction of said hooks will not permit them to by-pass such displaced pins, damage to the pin board mechanism is likely to be the result.

It is to be understood that in automatic reset operations it is unnecessary to use the keys 271 and 272 (Fig. 1) to select the various storage devices for resetting, as in this case the displaced pins select said storage devices for resetting in the manner explained above.

The segment 558 (Fig. 24) retains the tooth 764 disengaged from the tooth spaces in the comb 767 a sufficient length of time to permit the spring 501 to shift the pin board carriage from its extreme left-hand position to its extreme right-hand position, if necessary. After the carriage has been moved to its new position, return movement clockwise of the segment 558 permits the spring 765 to engage the tooth 764 with the corresponding notch 766 to secure the pin board carriage in set position until the segment 558 is again moved to its extreme counter-clockwise position in the succeeding operation.

Summarizing briefly, the pin board control lever 590 (Figs. 1 and 27) has four positions—namely, "Add," "Neutral," "Reset One at a Time," and "Reset Automatic," for controlling the functioning of the pin displacing and restoring mechanisms, and, in addition, in Reset Automatic operations, causes the storage devices corresponding to the displaced overdraft and adding pins to be selected for resetting.

When the pin board control lever 590 is in Add position, the mechanism shown in Fig. 28 and space 9, Fig. 35, controls the movement of the shaft 580, which in turn controls the in-and-out movement of the hook selecting arms 530 and 531 (Figs. 15 and 24) and their corresponding hooks 599 and 605. The above-mentioned inand-out movement of the arms 530 and 531 occurs after the pin board 480 has been positioned laterally under influence of the keys 271 (Fig. 23) and after said arms 530 and 531 have been positioned angularly or circumferentially under influence of the keys 272 to select the pins 525 and 526 corresponding to said depressed keys 271 and 272.

Likewise, when the pin board control lever 590 is in Add position, the mechanism shown in Fig. 31 and space 11, Fig. 35, controls the movement of the shaft 624, which shaft in turn controls the rotary or engaging and disengaging movement of the add-selecting arm 531 (Fig. 15) to cause the tooth 609 of the hook 605 to properly engage the notch 610 in the selected add pin 526 to cause said pin to be displaced. When the balance totalizer is in a positive condition, the arm 623, which imparts rotary or engaging and disengaging movement to the overdraft segment 558 (Figs. 19 and 24), is connected by the stud 679 to the hook-shaped arm 682, said hook-shaped arm being in turn connected by the hub 683 to the mechanism shown in Fig. 30, which, when the pin board control lever 590 is in Add position, is inoperative. Therefore it is obvious that, when the balance totalizer is in a positive condition, the overdraft pin 525 corresponding to the depressed keys 271 and 272 will not be displaced.

When the balance totalizer changes from a positive condition to a negative or overdrawn condition, the mechanism shown in Fig. 18 functions to shift the stud 679 (Figs. 19 and 34B) downwardly to connect the arm 623 to the arm 699, which latter arm is secured on the shaft 624, and in this case the mechanism shown in Fig. 31 not only will cause the add pin 526 corresponding to the depressed keys 271 and 272 to be displaced, but likewise will cause the corresponding overdraft pin 525 to be displaced simultaneously. The operator can tell when an overdraft exists by observing the indicator 731 (Fig. 23) through the aperture 732.

When the pin board control lever 590 is in Neutral position, the mechanism for displacing and restoring the pins 525 and 526 is rendered inoperative.

When the pin board control lever 590 is moved to Reset One at a Time position, the mechanism shown in Fig. 28 is rendered effective to control the movement of the shaft 590, which in turn controls the in-and-out movement of the selecting arms 530 and 531 in the manner explained before.

Likewise, in Reset One at a Time operations, the mechanism shown in Fig. 32 is rendered effective to control the movement of the shaft 624, which in turn controls the rotary or engaging and disengaging movement of the add-selecting arm 531 and the add hook 605, to cause the displaced add pins 526, corresponding to the depressed keys 271 and 272, to be restored upwardly to normal position, in the manner explained hereinbefore.

In Reset One at a Time operations, the stud 679 is in engagement with the hook-shaped arm 682, to connect the arm 623 to the mechanism shown in Fig. 30, which mechanism is rendered operative by movement of the lever 590 to Reset One at a Time position, and, as a result, rotary or engaging and disengaging movement of the overdraft arm 530 and the overdraft hook 599 (Fig. 30 and space 13, Fig. 35) will be controlled by the cam 697. This causes the displaced overdraft pins 525 corresponding to the depressed keys 271 and 272 to be restored upwardly to normal position, the same as the above-mentioned add pins.

Moving the pin board control lever 590 to Reset Automatic position causes the mechanism shown in Fig. 29 to impart a preliminary movement to the shaft 590 and at the same time operatively connects said shaft to the cam 718, to cause the overdraft and add hooks 599 and 605 to be moved upwardly to a position where the teeth of said hooks will be in alinement with the notches 604 and 610 in the displaced overdraft and add pins. Movement of said pin board control lever 590 to Reset Automatic position, by means of the mechanism shown in Figs. 23, 29, and 36, disconnects the pin board shifting cam 489 (Figs. 34B and 36) from its operating mechanism and releases said cam to the action of the spring 501, which constantly urges the pin board in a right-hand direction. It will be remembered that, prior to reset automatic operations, it is necessary to perform an idle operation of the machine with the proper keys 271 and 272 depressed, to insure that the pin board carriage 480 is in its left-hand position and that the selecting arms 530 and 531 are in their downward or counter-clockwise positions. The preliminary manual movement of the shaft 590 in reset automatic operations likewise moves the segments 571 and 575 (Figs. 15 and 24) upwardly to move the arcuate bails on said segments into the paths of the stems of the displaced overdraft and add pins. In reset automatic operations, the mechanisms shown in Figs. 30 and 32 are effective, as in reset one at a time operations, to cause the proper rotary movement to be imparted to the selecting arms 530 and 531, to reset the displaced pins.

In reset automatic operations, initial movement counter-clockwise or downwardly of the overdraft segment 558 (Fig. 24) causes the projection 761 thereon to disengage the tooth 764 from the alining notch 766 in the comb 767, to release the pin board carriage 480 to the action of the spring 501, which moves said carriage in a right-hand direction until the bail of the segments 571 or 575 contacts the stem of a displaced overdraft or add pin 525 or 526. This positions the pin board carriage laterally with relation to the selecting arms 530 and/or 531. As the operation of the machine progresses, return movement of the arms 530 and 531 causes the hooks carried thereby to engage the slots in the displaced pins to position said arms in accordance with the value of said pins.

Movement of the pin board control lever 590 to Reset Automatic position, through the mechanism shown in Fig. 27, shifts the control links 506 and 541 from normal position, as shown in Figs. 23 and 36, to reset automatic position, and, as a result, the differential mechanisms for the keys 271 and 272 are positioned in accordance with the lateral position of the pin board carriage and the angular position of the arms 530 and/or 531, which, as explained above, is determined by the displaced pins 525 and 526. This causes the storage devices corresponding to the displaced pins to be selected for resetting, inasmuch as the total control lever 92 is (Fig. 1) always moved to Reset No. 1 position when the pin board control lever 590 is moved to Reset Automatic position. After the pin selecting arms 530 and/or 531 have been positioned by the displaced pins, the mechanism shown in Figs. 29, 30, and 32 functions in the manner explained earlier herein, to cause the displaced overdraft and add pins to be restored upwardly to normal position.

In connection with automatic reset operations, it is believed advisable to repeat that the machine does not cycle continuously while all the displaced pins are being restored, but the starting bar 91 (Fig. 1) must be depressed for each resetting operation. The operator can tell when all the pins 525 and 526 are reset by looking through the transparent closure 774 (Fig. 23), which gives access to the pin board compartment.

By referring to Fig. 26, it will be recalled that the overdraft and adding pins are numbered so that they may be readily identified with respect to their corresponding storage devices. The overdraft and add pins 525 and 526 (Figs. 15 and 24), have notches near the upper ends thereof for use in restoring said pins manually, if for any reason it becomes necessary or desirable.

It is believed that a thorough understanding of the mode of operation of the machine embodying the present invention will have been obtained from a careful perusal of the preceding specification, and that further elaboration on a particular use of said machine in connection with a system peculiar to a certain business enterprise is unnecessary and undesirable, as the versatility and flexibility of said machine make it adaptable for use in connection with the systems of substantially all business enterprises where it is desirable and/or expedient to record a large number of individual totals.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the character described, having a plurality of storage devices for storing independent amounts, and a balance totalizer for computing amounts to be entered in the storage devices, the combination of a plurality of indicating means, one associated with each storage device, to indicate which of the storage devices have a positive amount entered therein; a plurality of indicating means, one associated with each storage device, to indicate which of the storage devices has a negative amount entered therein; means to select any one of the storage devices for actuation by the balance totalizer; means actuated by said selecting means to normally select the positive amount indicating means associated with the selected storage device; means, effective when the balance totalizer changes from a positive condition to a negative condition, to cause said selecting means to also select the negative amount indicating means; and operating means to operate the selected indicator means.

2. In a machine of the class described, the combination of a plurality of displaceable and restorable indicating pins; means engageable with the pins to displace and restore said pins; means to position the engageable means in relation to the pins, to select a certain pin; means to impart engaging and disengaging movement to the engageable means; means to impart displacing and restoring movement to the engageable means; and means to control the two imparting means to cause the selected pin to be displaced or restored, whichever is desirable.

3. In a machine of the class described, the combination of a plurality of indicating pins movable from a normal position to a displaced position and vice versa; means engageable with the pins to move said pins from normal position to displaced position and vice versa; means to position the moving means in relation to the pins, to select the desired one of said pins; means to impart a certain movement to the moving means to properly engage and disengage said moving means with and from the selected pin; means to impart another movement to the moving means to displace or restore the selected pin; and means, including a manipulative device and instrumentalities operated thereby, to control the two imparting means.

4. In a machine of the character described, having a shiftable carriage, the combination of a plurality of indicating pins supported by the carriage, said pins movable from a normal position to a displaced position and vice versa; means engageable with the pins to displace and restore said pins; means to position the carriage laterally to aline the selected pin with the displacing and restoring means; means to position the displacing and restoring means in operative alinement with the selected pin; means to engage and disengage the displacing and restoring means with and from the selected pin; means to impart displacing and restoring movement to the displacing and restoring means to displace or restore the selected pin; and means to control the engaging and disengaging means and the imparting means to cause the selected pin to be displaced or restored.

5. In a machine of the character described, having a shiftable carriage, the combination of a plurality of rows of indicating pins supported by the carriage, said pins movable from normal position to displaced position and vice versa; means engageable with the pins to displace and restore said pins; means to position the carriage, to locate the row of pins containing the selected pin opposite the displacing and restoring means; means to position the displacing and restoring means in operative alinement with the selected pin in the selected row; means to engage and disengage the displacing and restoring means with and from the selected pin; means to impart displacing and restoring movement to the displacing and restoring means; and means, including a manipulative device and mechanisms associated therewith, to control the engaging and disengaging means and the imparting means, to cause the selected pin to be displaced or restored, as the case may be.

6. In a machine of the character described, having a shiftable carriage, the combination of a plurality of rows of pins supported by the carriage, said pins adapted to be displaced to indicate the happening of an event; two rows of pin selecting keys; means engageable with the pins to displace and restore said pins; means controlled by one row of keys to position the carriage to locate the desired row of pins in operating relationship with the displacing and restoring means; means controlled by the other row of keys to position the displacing and restoring means in operating relationship with the desired pin in said desired row; means to engage and disengage the displacing and restoring means with and from the selected pin; means to impart displacing and/or restoring movement to the displacing and restoring means; and means, including a manipulative device and instrumentalities associated therewith, to control the engaging and disengaging means and the imparting means, to cause the selected pin to be displaced or restored.

7. In a machine of the character described, having a plurality of storage device lines, each supporting a plurality of storage devices, and a balance totalizer for computing amounts to be stored in said storage devices, the combination of two rows of storage device selecting keys; means controlled by one row of keys to select the proper storage device line; means controlled by the other row of keys to select the proper storage device on the selected line for actuation by the balance totalizer; a shiftable carriage; a plurality of pins supported by the carriage, each of said pins corresponding to one of the storage devices, said pins adapted to be displaced to indicate that an amount has been stored in the corresponding storage devices; means engageable with the pins to displace and restore said pins; means controlled by said one row of keys to position the displacing and restoring means in accordance with the selected storage device line; means controlled by said other row of keys to position the carriage, to place the pin corresponding to the selected storage device in operative alinement with the displacing and restoring means; means to engage and disengage the displacing and restoring means with and from the selected pin; means to impart displacing and restoring movement to the displacing and restoring means; and means to control the engaging and disengaging means and the imparting means to cause the selected pin to be displaced or restored, whichever is desirable.

8. In a machine of the character described, having a plurality of lines of storage sets, each line supporting a plurality of storage sets, and having a balance totalizer for computing amounts to be stored in the storage sets, the combination of two rows of storage set selecting keys; means controlled by one row of keys to select the proper storage set line; means controlled by the other row of keys to select the proper storage set on the selected line for actuation by the balance totalizer; a shiftable carriage; two sets of pins supported by the carriage, each set having a pin corresponding to each of the storage sets; means engageable with the one set of pins; means engageable with the other set of pins; actuating means to actuate the engageable means to displace said pins when the engageable means is in engaged position; means controlled by the one row of keys to position the engageable means for both sets of pins in accordance with the selected storage set line; means controlled by the other row of keys to position the carriage in accordance with the selected storage set on the selected line; means effective in adding or subtracting operations to impart engaging movement to the actuating means for the engageable means for the one set of pins to displace a pin of said one set of pins to thereby indicate that a certain storage device has been active; and means rendered effective when the balance totalizer is overdrawn to cause engaging movement to be imparted to the actuating means for the engageable means for the other set of pins, to displace a pin of said other set of pins to thereby indicate that the selected storage set contains a negative amount.

9. In a machine of the character described, having a plurality of storage set lines, each line having a plurality of storage sets thereon, and a balance totalizer for computing amounts to be stored in the storage sets, the combination of a row of keys to select the different storage lines; a row of keys to select the different storage sets on each line for actuation by the balance totalizer; a postionable carriage; two sets of pins mounted in the carriage, each set having pins corresponding to the different storage sets; separate means for each set of pins, and engageable therewith to displace and restore said pins; means controlled by the first row of keys to position both of the displacing and restoring means in accordance with the depressed key; means controlled by the second row of keys to position the carriage in accordance with the depressed key, to select the pin corresponding to the selected storage set; means to impart displacing and restoring movement to both of the displacing and restoring means; means to impart engaging and disengaging movement to one of the displacing and restoring means; means to impart engaging and disengaging movement to the other displacing and restoring means; a positionable member for controlling all the imparting means; means effective when the member is in one position to cause the first and second imparting means to displace the pin in one of the sets corresponding to the selected storage set to indicate that said storage set has been active; means operative when the member is in said one position and rendered effective, when the balance totalizer is overdrawn, to cause the first and third imparting means to displace the pin in the other set of pins corresponding to the selected storage set, to indicate that said storage set has a negative amount therein; and means effective when the member is in another position to cause the three imparting means to restore the pins in both sets, corresponding to the selected storage set, to indicate that said storage set has been cleared.

10. In a machine of the class described, the combination of two rows of keys; a horizontally shiftable carriage; a plurality of pins mounted in substantially vertical rows in the carriage, said pins adapted to be displaced to indicate a transaction; means engageable with the pins to displace said pins; a differential device controlled by one of the rows of keys for controlling the positioning of the carriage to bring the vertical row of pins corresponding to the depressed key, in said row, in operative alinement with the displacing and restoring means; a differential device controlled by the other row of keys for controlling the positioning of the displacing means to select the pins in the selected vertical row corresponding to the depressed key in said latter row; means, effective after the pin corresponding to the depressed keys has been selected, to impart displacing movement to the displacing means; and means, operating in conjunction with the above imparting means, to engage and disengage the displacing means with and from the selected pin, to cause said pin to be displaced.

11. In a machine of the character described, having a plurality of lines of storage elements, each line having a plurality of sets of storage elements thereon, and having a balance totalizer to compute amounts to be entered in the storage elements, the combination of key-controlled means to select the different storage lines; key-controlled means to select the different sets of storage elements on the lines; a horizontally shiftable carriage; a plurality of rows of displaceable pins mounted in the carriage, said rows of pins corresponding to the different sets of storage elements on each of the lines; means engageable with the pins to displace said pins; means controlled by the second key-controlled means to position the carriage, to aline the row of pins, corresponding to the selected storage set, with the displacing means; means controlled by the first key-controlled means, to position the displacing means in operative alinement with the pin in the selected row corresponding to the selected storage line; means to impart engaging movement to the displacing means; and means to impart displacing movement to the displacing means, said two imparting means being so synchronized in operation as to cause the pin corresponding to the selected storage set to be displaced.

12. In a machine of the class described, having a plurality of storage lines, each line having a plurality of sets of storage elements thereon, and a balance totalizer to compute amounts to be stored in the storage elements, said balance totalizer operatively connectable to said storage elements for the transferring of amounts between said totalizer and said elements, the combination of two banks of storage element selecting keys; means, including a differential device controlled by one of the banks of keys, to select the different storage sets on each of the lines; means, including a differential device controlled by the other bank of keys, to select the different storage lines; a shiftable carriage; a plurality of rows of displaceable pins mounted in the carriage, said rows of pins corresponding to the different storage sets on each of the lines; means engageable with the pins to displace said pins; means operated by the first differential device to position the carriage to operatively aline the row of pins corresponding to the selected storage set with the displacing means; means operated by the second differential device to position the displacing means in operative alinement with the pin in the selected row, corresponding to the selected storage line; means to impart engaging movement to the displacing means; and means to impart displacing movement to the displacing means, said two imparting means being so synchronized in operation as to cause the pin, corresponding to the selected set of storage elements on the selected line, to be displaced.

13. In a machine of the character described, having a plurality of storage lines, each line in turn supporting a plurality of sets of storage elements, said machine having a balance totalizer to compute amounts to be entered in the storage elements, said balance totalizer operatively connectable to said storage elements for the transferring of amounts between said totalizer and said storage elements, the combination of two banks of storage element selecting keys; means, including a differential device controlled by one of the banks of keys, to select the different storage sets on each of the lines; means, including a differential device controlled by the other bank of keys, to select the different storage lines; a shiftable carriage; two sets of displaceable pins mounted in the carriage, each set comprising a pin corresponding to each of the sets of storage elements, said pins arranged in rows corresponding to the different storage sets on each of the lines; displacing means for each set of pins, said displacing means engageable with the pins; means operated by the first differential device to position the carriage, to operatively aline the row of pins in each of the sets of pins, corresponding to the selected storage set, with their corresponding displacing means; means operated by the second differential device to simultaneously position the two displacing means in operative alinement with the pins in the selected rows, corresponding to the selected storage line; means to impart displacing movement to the two displacing means; means, normally effective, to impart engaging movement to one of the displacing means to cause the selected pin in one set to be displaced; and means, rendered effective when the balance totalizer is overdrawn, to cause the second imparting means to impart engaging movement to the other displacing means to cause the selected pin in the other set to be displaced, said displaced pins serving to identify the storage sets having amounts therein, and whether the amounts are positive or negative.

14. In a machine of the class described, having a plurality of storage lines, each line supporting a plurality of storage sets thereon, said machine having a balance totalizer for computing amounts to be stored in the storage sets, said balance totalizer operatively connectable to said storage sets for the transferring of amounts to be computed and stored, the combination of two rows of keys to select the different storage lines and the different storage sets on said lines; a differential device for each row of keys and controlled by said keys to select the different storage lines and the different storage sets on said lines for operative connection to the balance totalizer; a horizontally shiftable carriage; a plurality of pins mounted in the carriage, said pins corresponding to the different storage sets and adapted to be displaced when an amount is entered in the corresponding storage set, and adapted to be restored when the corresponding storage set is cleared, to indicate the condition of said storage set; means engageable with the pins to displace or restore said pins; means controlled by the differential devices for positioning the carriage and the displacing and restoring means in accordance with the value of the depressed keys, to select the pin corresponding to the selected storage set; means to impart displacing and restoring movement to the displacing and restoring means; means to impart engaging and disengaging movement to said displacing and restoring means; a positionable member, effective when in one position to control the two imparting means to cause the pins corresponding to the selected storage sets to be displaced, and effective when in another position to control the two imparting means to cause the pins displaced in former operations to be restored; and means rendered effective by the positionable member when in said other position to shift the control of the positioning of the differential devices from the keys to the displaced pins, to select the storage sets corresponding to the displaced pins for operative connection to the balance totalizer.

15. In a machine of the character described, having a balance totalizer and a plurality of storage sets for storing amounts computed in the balance totalizer, said storage sets adapted to be operatively connected to the balance totalizer for the transferring of amounts to be computed and stored, the combination of a plurality of pins corresponding to the different storage sets and adapted to be displaced to indicate that an amount has been entered in the corresponding storage set; key-positioned differential means to select any of the storage sets for operative connection with the balance totalizer; a positionable control member; means controlled by the control member when in one position to cause the differential means to select the pin corresponding to the selected storage set for displacement simultaneously with the selection of said storage set; and means controlled by the control member when in another position to cause the pins displaced in previous operations to control the positioning of the differential means to select the storage sets corresponding to said displaced pins for operative connection to the balance totalizer.

16. In a machine of the character described having a balance totalizer and means to enter amounts therein, the combination of a plurality of storage lines; a plurality of storage sets on each line, for the storing of amounts computed in the balance totalizer; means to operatively connect the different storage sets to the balance totalizer for the transferring of amounts to be computed and stored; two rows of storage set selecting keys; a differential device for each row of keys, one of said devices controlled by a depressed key of one row to select a storage line, and the other one of said devices controlled by a depressed key of the other row to select a storage set from the selected storage line for operative connection to the balance totalizer; a plurality of displaceable pins corresponding to the different storage sets; a positionable control member; and means controlled by the differential devices, and effective when the control member is in one position, to select the pin corresponding to the selected storage set for displacement, said means effective when the control member is in another position to cause pins displaced in former operations to control the positioning of the differential devices, to cause the storage sets corresponding to said displaced pins to be selected for operative connection to the balance totalizer.

17. In a machine of the character described, having a plurality of storage sets for the storing of individual totals, and means to compute totals to be stored in said storage sets, the combination of a plurality of pins corresponding to the storage sets, said pins arranged in a plurality of groups and adapted to be displaced to indicate which of the storage sets have totals therein; means to select the various storage sets for operative connection to the computing means for the transfer of totals therebetween; notches in the pins; means engageable with the notches to displace the pins; said groups of pins normally out of the operating range of the displacing means; means controlled by the selecting means to bring the different pins within the operating range of the displacing means; means controlled by the selecting means to position the displacing means to select the pin corresponding to the selected storage set; means effective after the displacing means has been positioned to impart certain movements thereto to properly engage and disengage said displacing means with and from the notch in the selected pin; and means to impart displacing movement to the displacing means to cause the selected pin, when the notch therein is engaged with the displacing means, to be displaced to indicate that the corresponding storage set has a total therein.

18. In a machine of the class described, having a plurality of storage sets for the storing of individual totals and means to compute totals to be stored in the storage sets, the combination of means to select the various storage sets for operative connection to the computing means for the transfer of totals therebetween; a shiftable carriage; a plurality of pins carried by the carriage, said pins corresponding to the various storage sets, said pins adapted to be displaced to indicate that the corresponding storage sets have totals therein, and adapted to be restored when the totals are cleared from the corresponding storage sets; means to displace or restore the pins; means controlled by the selecting means to move the carriage and the displacing and restoring means in relation to each other to bring the selected pins into operative alinement with the displacing and restoring means; means to actuate the displacing and restoring means to cause the selected pins to be displaced; and means effective in clearing operations to control the selecting means, the carriage moving means, the displacing and restoring means, and the actuating means to reverse the procedure outlined above to cause the displaced pins to position the carriage and the displacing and restoring means to select the corresponding storage sets for operative connection to the computing means and to cause the displaced pins to be restored.

19. In a machine of the class described, the combination of a shiftable carriage; a plurality of groups of displaceable pins supported by the carriage; means to displace the pins to indicate the happening of a certain event, said means also adapted to restore the pins to indicate the happening of another event; means including a cam to shift the carriage; means effective in certain types of operations to positively drive the cam in one direction to shift the carriage to an initial position; yieldable means to retain the cam in contact with the driving means to cause said driving means to lead said cam and the carriage from initial position relatively to the displacing and restoring means; selectively controlled means cooperating with the cam, while said cam is being led, to position the carriage to place the desired groups of pins in operative relationship with the displacing and restoring means; selectively controlled means to position the displacing and restoring means in relation to the pins, to select the desired pin in the desired group for displacement; means to actuate the displacing and restoring means to cause the selected pin to be displaced; and means effective in other types of operations to control the driving means, the displacing means, and the actuating means, to cause the displaced pins to control the positioning of the carriage and the displacing and restoring means, and to cause said displacing and restoring means to restore said displaced pins.

20. In a machine of the character described, having a plurality of storage devices and means to compute amounts to be entered in said storage devices, the combination of means to select the storage devices for operative connection to the computing means for the transfer of amounts therebetween; a shiftable carriage; a plurality of indicating pins carried by said carriage, said pins corresponding to the various storage devices; means to displace the pins; means including a cam to shift the carriage; means to move the cam and the displacing means in relation to each other; means controlled by the selecting means to interrupt the relative movements of the carriage and the displacing means to select the pin corresponding to the selected storage device; and means to actuate the displacing means to cause the selected pin to be displaced, to indicate that the corresponding storage device has an amount therein.

21. In a machine of the character described, having a plurality of storage devices, and means to compute amounts to be stored in said storage devices, the combination of means to select the storage devices for operative connection to the computing means for the transferring of amounts therebetween; a shiftable carriage; a plurality of pins carried by said carriage, said pins corresponding to the various storage devices; means to displace and restore the pins; means to move the carriage and the displacing and restoring means in relation to each other; a positionable control member; means rendered effective when the control member is in one position, and controlled by the selecting means to control the movement of said carriage and said displacing and restoring means to select the pin corresponding to the selected storage device; means to actuate the displacing and restoring means to cause the selected pin to be displaced, to indicate that the corresponding storage device has an amount stored therein; means effective when the control member is in another position to cause the displaced pin, in cooperation with the carriage and the displacing and restoring means, to control the selecting means to cause the storage device corresponding to said displaced pin to be selected for operative connection to the computing means; and means effective when the control member is in said latter position to control the operation of the actuating means to cause the displaced pin to be restored.

22. In a machine of the character described, having a plurality of storage devices, and means to compute amounts to be stored in said storage devices, the combination of means to select the storage devices for operative connection to the computing means for the transferring of amounts therebetween; a shiftable carriage; means to shift the carriage; yieldable means to urge the carriage in one direction; a plurality of pins carried by said carriage, said pins corresponding to the various storage devices and adapted to be displaced to indicate that said corresponding storage devices have amounts therein, and adapted to be restored to indicate that said corresponding storage devices have been cleared; means to displace and restore the pins; a stop mechanism carried by the displacing and restoring means; a positionable control member having an adding position and a resetting position; means rendered effective when the control member is in adding position and controlled by the selecting means to control the movement of the carriage and the displacing and restoring means to select the pin corresponding to the selected storage device; means to actuate the displacing and restoring means to cause the selected pin to be displaced, to indicate that the corresponding storage device has an amount therein; means effective when the control member is moved to resetting position to disconnect the carriage from the shifting means to release said carriage to the action of the yieldable means; means rendered effective by movement of the control member to resetting position to move the displacing and restoring means and the stopping means into the paths of the displaced pins; means rendered effective by movement of the control member to resetting position to normally hold the carriage against movement under influence of the yieldable means, said holding means adapted to be rendered ineffective by movement of the displacing and restoring means to an extreme position out of the path of said pins, whereupon the displaced pins, in cooperation with the stopping means and the displacing and restoring means, control the positioning of the carriage and said displacing and restoring means, which in turn control the selecting means to select the storage devices corresponding to said displaced pins for operative connection to the computing means; and means effective when the control member is in said resetting position to alter the control of the actuating means to cause the displaced pins to be restored, to indicate that the corresponding storage devices have been cleared.

WILLIAM H. ROBERTSON.